(12) United States Patent
Connor

(10) Patent No.: US 10,466,741 B2
(45) Date of Patent: Nov. 5, 2019

(54) DUAL-DISPLAY SMART WATCH WITH PROXIMAL AND DISTAL (ANALOG AND ELECTRONIC) DISPLAYS

(71) Applicant: Robert A. Connor, St. Paul, MN (US)

(72) Inventor: Robert A. Connor, St. Paul, MN (US)

(73) Assignee: Medibotics, St. Paul, MN (US)

( * ) Notice: Subject to any disclaimer, the term of this patent is extended or adjusted under 35 U.S.C. 154(b) by 19 days.

(21) Appl. No.: 15/882,255

(22) Filed: Jan. 29, 2018

(65) Prior Publication Data
US 2018/0150101 A1    May 31, 2018

Related U.S. Application Data

(63) Continuation-in-part of application No. 15/212,235, filed on Jul. 17, 2016, which is a continuation-in-part of application No. 14/623,337, filed on Feb. 16, 2015, now Pat. No. 9,582,035.

(60) Provisional application No. 61/944,090, filed on Feb. 25, 2014, provisional application No. 61/948,124, filed on Mar. 5, 2014, provisional application No. 62/100,217, filed on Jan. 6, 2015, provisional application No. 62/106,856, filed on Jan. 23, 2015, provisional application No. 62/111,163, filed on Feb. 3, 2015, provisional application No. 62/113,423, filed on Feb. 7, 2015, provisional application No. 62/115,691, filed on Feb. 13, 2015, provisional application No. 62/202,385, filed on Aug. 7, 2015, provisional application No. 62/275,876, filed on Jan. 7, 2016, provisional application No. 62/316,798, filed on Apr. 1, 2016, provisional application No. 62/351,447, filed on Jun. 17, 2016, provisional application No. 62/354,385, filed on Jun. 24, 2016,
(Continued)

(51) Int. Cl.
*G06F 1/16* (2006.01)
*G06F 3/01* (2006.01)

(52) U.S. Cl.
CPC .............. *G06F 1/163* (2013.01); *G06F 3/014* (2013.01); *G06F 3/017* (2013.01)

(58) Field of Classification Search
CPC .......... G06F 1/163; G06F 1/16; G06F 1/1694; G06F 3/014; G06F 3/017; G06F 1/1637; G06F 1/1601; G06F 1/3218
See application file for complete search history.

(56) References Cited

U.S. PATENT DOCUMENTS

| 4,627,739 A | 12/1986 | Shingo et al. |
| 6,216,490 B1 | 4/2001 | Radley-Smith |

(Continued)

FOREIGN PATENT DOCUMENTS

EP    0335054 A1 * 10/1989    .............. G04B 19/23

*Primary Examiner* — Dimary S Lopez Cruz
*Assistant Examiner* — Ingrid D Wright

(57) ABSTRACT

This invention is a dual-display smart watch with a proximal dorsal display and a distal dorsal display. In an example, the proximal and distal displays can both be electronic displays. In an example, one display can be an analog watch face with mechanically-moving watch hands and the other display can be an electronic display. The displays can show different types of information such as: the time; notifications or messages; steps, heart rate, blood pressure, glucose level, or other biometric information; temperature, weather, location, directions, or other environmental information; and pictures, icons, or other digital images.

8 Claims, 25 Drawing Sheets

Related U.S. Application Data provisional application No. 62/553,618, filed on Sep. 1, 2017.

(56) References Cited

U.S. PATENT DOCUMENTS

| | | | |
|---|---|---|---|
| 6,857,775 B1 | 2/2005 | Wilson | |
| 6,883,961 B1* | 4/2005 | Ray | G04B 37/0058 368/281 |
| D548,113 S | 8/2007 | Burton | |
| 7,285,090 B2 | 10/2007 | Stivoric et al. | |
| 7,450,107 B2 | 11/2008 | Radley-Smith | |
| 7,460,085 B2 | 12/2008 | Ishii | |
| 7,506,269 B2 | 3/2009 | Lang | |
| 7,654,732 B2 | 2/2010 | Burton et al. | |
| 8,851,372 B2 | 10/2014 | Zhou et al. | |
| 9,582,035 B2 | 2/2017 | Connor | |
| 2004/0203414 A1 | 1/2004 | Satou et al. | |
| 2006/0007059 A1 | 1/2006 | Bell | |
| 2010/0049004 A1 | 2/2010 | Edman et al. | |
| 2010/0227642 A1 | 9/2010 | Kim et al. | |
| 2011/0187681 A1 | 8/2011 | Kim et al. | |
| 2013/0120459 A1 | 5/2013 | Dickinson et al. | |
| 2013/0222137 A1 | 8/2013 | Alameh et al. | |
| 2014/0116086 A1* | 5/2014 | Casaccio | A44C 5/0053 63/5.1 |
| 2014/0132481 A1 | 5/2014 | Bell et al. | |
| 2014/0160078 A1 | 6/2014 | Seo et al. | |
| 2014/0329561 A1 | 11/2014 | Kim et al. | |
| 2015/0078144 A1* | 3/2015 | Gong | G04C 17/0041 368/228 |
| 2016/0070410 A1 | 3/2016 | Lin et al. | |
| 2016/0091980 A1 | 3/2016 | Baranski et al. | |
| 2016/0116940 A1 | 4/2016 | Jones et al. | |
| 2016/0192428 A1 | 6/2016 | Friedman et al. | |
| 2016/0192526 A1 | 6/2016 | Gao et al. | |
| 2016/0192716 A1 | 7/2016 | Lee | |
| 2016/0349790 A1 | 12/2016 | Connor | |

* cited by examiner

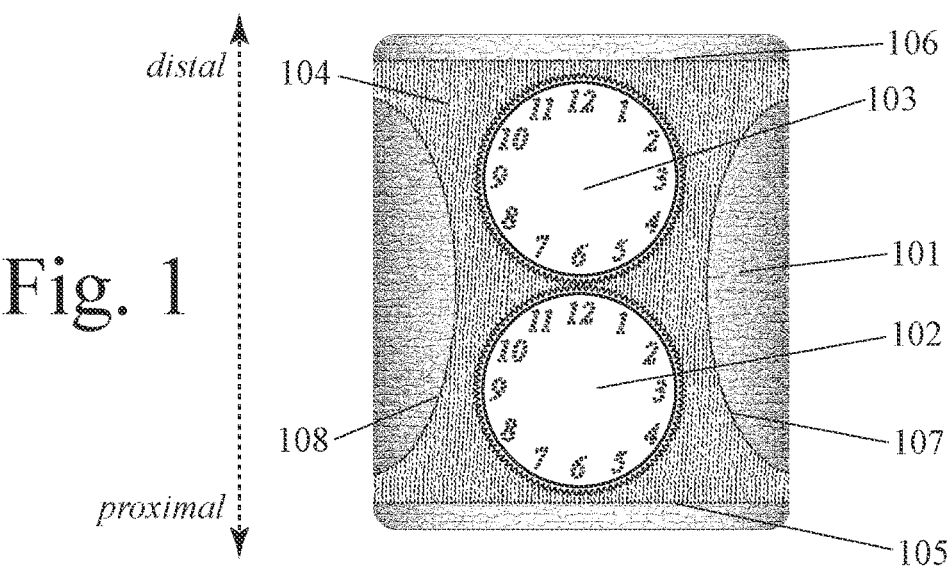
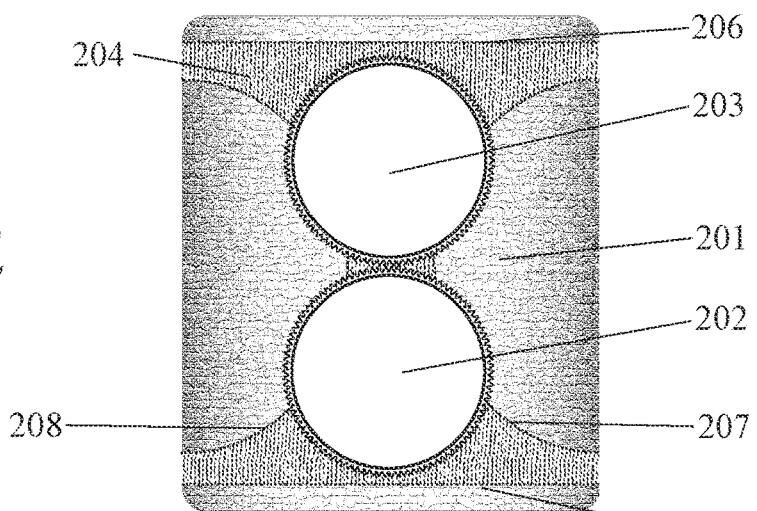
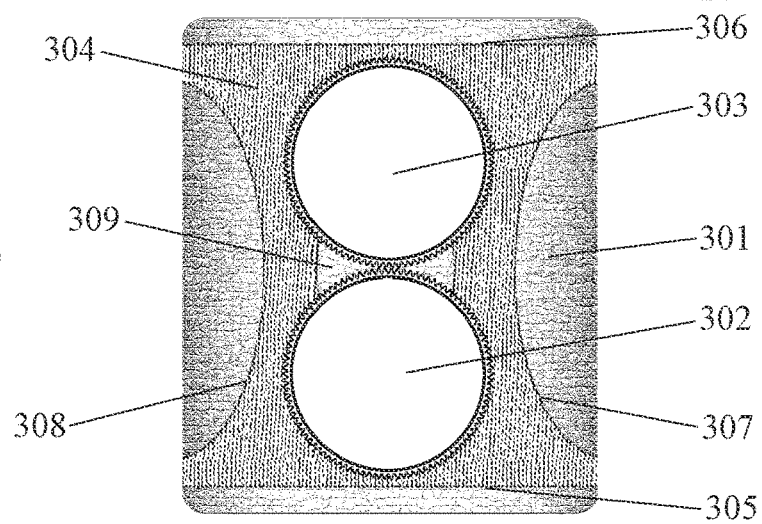

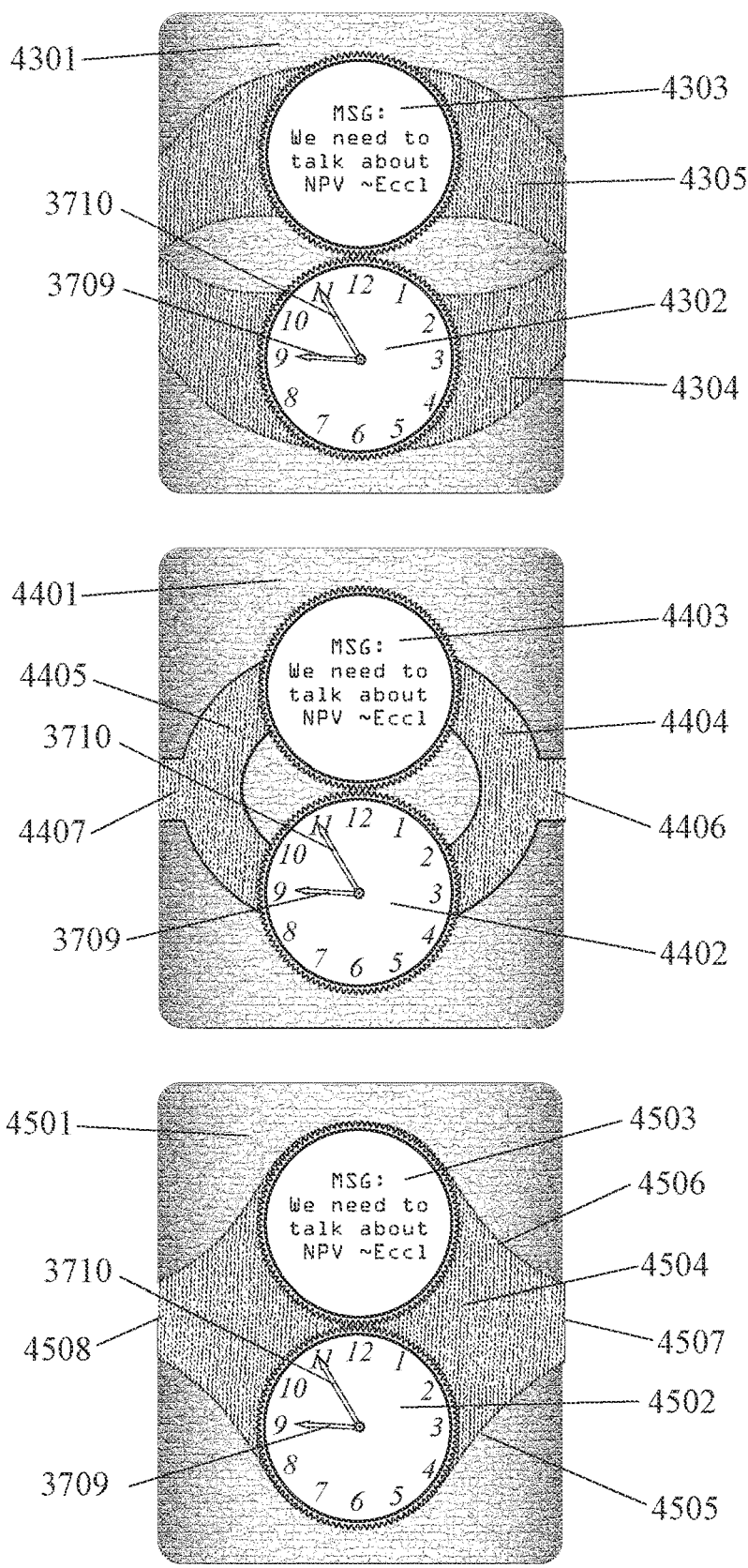

DUAL-DISPLAY SMART WATCH WITH PROXIMAL AND DISTAL (ANALOG AND ELECTRONIC) DISPLAYS

CROSS-REFERENCE TO RELATED APPLICATIONS

This application:

(A) is a continuation-in-part of U.S. patent application Ser. No. 15/212,235 entitled "Wearable Computer Display Devices for the Forearm, Wrist, and/or Hand" by Robert A. Connor with a filing date of Jul. 17, 2016 which:

(1) was a continuation-in-part of U.S. patent application Ser. No. 14/623,337 entitled "Wearable Computing Devices and Methods for the Wrist and/or Forearm" by Robert A. Connor with a filing date of Feb. 16, 2015 which: (a) claimed the priority benefit of U.S. Provisional Patent Application No. 61/944,090 entitled "Wearable Computing Device for the Wrist and/or Arm" by Robert A. Connor with a filing date of Feb. 25, 2014; (b) claimed the priority benefit of U.S. Provisional Patent Application No. 61/948,124 entitled "Wearable Computing Device for the Wrist and/or Arm" by Robert A. Connor with a filing date of Mar. 5, 2014; (c) claimed the priority benefit of U.S. Provisional Patent Application No. 62/100,217 entitled "Forearm Wearable Device with Distal-to-Proximal Flexibly-Connected Display Modules" by Robert A. Connor with a filing date of Jan. 6, 2015; (d) claimed the priority benefit of U.S. Provisional Patent Application No. 62/106,856 entitled "Forearm Wearable Computing Device with Proximal and Distal Arcuate Bands" by Robert A. Connor with a filing date of Jan. 23, 2015; (e) claimed the priority benefit of U.S. Provisional Patent Application No. 62/111,163 entitled "Forearm-Wearable Computing Device with Large Display Area" by Robert A. Connor with a filing date of Feb. 3, 2015; (f) claimed the priority benefit of U.S. Provisional Patent Application No. 62/113,423 entitled "Sensor-Informed Modification of the Interface Modality Between a Human and a Wearable Computing Device" by Robert A. Connor with a filing date of Feb. 7, 2015; (g) claimed the priority benefit of and U.S. Provisional Patent Application No. 62/115,691 entitled "Adjustment of Wearable Computer-to-Human Interface Based on Environmental and/or Physiological Sensors" by Robert A. Connor with a filing date of Feb. 13, 2015;

(2) claimed the priority benefit of U.S. Provisional Patent Application No. 62/202,385 entitled "Wearable Device for the Arm with Dual Arcuate Displays" by Robert A. Connor with a filing date of Aug. 7, 2015;

(3) claimed the priority benefit of U.S. Provisional Patent Application No. 62/275,876 entitled "CuffThink™ Computer Display that is Removably-Attached to a Garment Cuff or Sleeve" by Robert A. Connor with a filing date of Jan. 7, 2016;

(4) claimed the priority benefit of U.S. Provisional Patent Application No. 62/316,798 entitled "CuffThink™ Computer Display that is Removably-Attached to a Garment Cuff or Sleeve" by Robert A. Connor with a filing date of Apr. 1, 2016;

(5) claimed the priority benefit of U.S. Provisional Patent Application No. 62/351,447 entitled "Return of the Wearable Device for the Arm with Dual Arcuate Displays" by Robert A. Connor with a filing date of Jun. 17, 2016; and (6) claimed the priority benefit of U.S. Provisional Patent Application No. 62/354,385 entitled "Computer Display for the Arm that is Visible Whether or Not One is Wearing Clothing with a Long Sleeve" by Robert A. Connor with a filing date of Jun. 24, 2016; and (B) claims the priority benefit of U.S. Provisional Patent Application No. 62/553,618 entitled "Smart Watch with Dual Displays" by Robert A. Connor with a filing date of Sep. 1, 2017.

The entire contents of these related applications are incorporated herein by reference.

FEDERALLY SPONSORED RESEARCH

Not Applicable

SEQUENCE LISTING OR PROGRAM

Not Applicable

BACKGROUND

Field of Invention

This invention relates to wearable computing devices such as smart watches.

Introduction

Handheld computing devices have become ubiquitous. There is now growing interest in the development of wearable computing devices for the wrist and/or forearm which may supplement or even replace handheld computing devices. There are specific challenges which are more relevant to wearable computing devices for the wrist and/or forearm than they were for handheld computing devices. One key challenge is that the wrist provides relatively little space for a visual computer interface. Some prior art seeks to address this problem by extending one or more computer displays circumferentially around the wrist. However, this is limited because one can only see a few displays around the circumference from a given perspective. A person can rotate their wrist to see more displays, but this can be awkward. This invention addresses this challenge with advantageous configurations for dual-display smart watches with proximal and distal displays, some of which include both analog and electronic displays.

Review of the Relevant Art

U.S. Pat. No. 4,627,739 (Shingo et al., Dec. 9, 1986, "Bracelet Type Wrist Watch") appears to disclose a bracelet type wrist watch composed of a curved body with a watch embedded therein and a coil spring covering the curved body. U.S. Pat. No. 6,216,490 (Radley-Smith, Apr. 17, 2001, "Electronic Information Display Bracelet") appears to disclose a bracelet comprising at least one electronic display unit, wherein each display unit has a plurality of display elements arranged in a sequence lying along the length of the bracelet and/or in a sequence lying substantially around the display perimeter. U.S. Pat. No. 6,857,775 (Wilson, Feb. 22, 2005, "Timepiece with Integral Molded Wristband") appears to disclose a bracelet-style watch having a case, a wristband formed integral with the case, and three separating elements forming a space between the timepiece and the wrist. U.S. Pat. No. 7,285,090 (Stivoric et al., Oct. 23, 2007, "Apparatus for Detecting, Receiving, Deriving and Displaying Human Physiological and Contextual Information") appears to disclose a monitoring apparatus that includes a sensor device and an I/O device in communication with the sensor device that generates derived data using the data from the sensor device.

U.S. Pat. No. 7,450,107 (Radley-Smith, Nov. 11, 2008, "Bracelet with Information Display and Inputting Capability") appears to disclose a bracelet with information display and inputting capability comprising twelve segments hinged together to allow the bracelet to be folded around a wrist. U.S. Pat. No. 7,460,085 (Ishii, Dec. 2, 2008, "Display Device, Method of Controlling Display Device, Control Program, and Recording Medium") appears to disclose a display device with a frame having a ring shape and mounted on a user and a display unit along the frame over its circumference. U.S. Pat. No. 7,506,269 (Lang, Mar. 17, 2009, "Bezel Interface for Small Computing Devices") appears to disclose a display screen and a bezel encircling the screen, wherein the bezel is moves relative to the screen in one or more axes. U.S. Pat. No. 7,654,732 (Burton et al., Feb. 2, 2010, "Timepiece Incorporating Wristband Contact Elements") appears to disclose a wristband which extends outward from a case and defines an aperture.

U.S. Pat. No. 8,851,372 (Zhou et al., Oct. 7, 2014, "Wearable Personal Digital Device with Changeable Bendable Battery and Expandable Display Used as Standalone Electronic Payment Card") appears to disclose a wearable digital device whose display space is enlarged via a flip up portion, detachable portion, or bendable display. U.S. Pat. No. 9,582,035 (Connor, Feb. 28, 2017, "Wearable Computing Devices and Methods for the Wrist and/or Forearm") appears to disclose wearable devices for the wrist and/or forearm including a bifurcating attachment member and/or proximal and distal display members. U.S. Pat. D548113 (Burton, Aug. 7, 2007, "Watch") appears to disclose an ornamental design for a watch with a double strap.

U.S. Patent Application Pub. 20040203414 (Satou et al., Jan. 14, 2004, "Wearable Electronic Device") appears to disclose a wearable electronic device in which sound radiation and sound reception operations of an electroacoustic converter are performed reliably. U.S. Patent Application Pub. 20060007059 (Bell, Jan. 12, 2006, "Flexible Display Screen Arrangements and Applications Thereof") appears to disclose a flexible, electronic display screen mechanism which can emit, reflect, or otherwise control light such that a viewer may see graphical shapes, text based characters, or time varying images on the screen. U.S. Patent Application Pub. 20100049004 (Edman et al., Feb. 25, 2010, "Metabolic Energy Monitoring System") appears to disclose a metabolic energy monitoring system having one or more physiological measurement platforms and displays enabling the calculation and display of energy balance, kilocalorie energy expenditure, and kilocalorie intake.

U.S. Patent Application Pub. 20100227642 (Kim et al., Sep. 9, 2010, "Mobile Terminal Having Sub-Device") appears to disclose a mobile terminal with a sub-device that is attached thereto or detached therefrom to remotely control the operation and state of the terminal. U.S. Patent Application Pub. 20110187681 (Kim et al., Aug. 4, 2011, "Apparatus for Screen Location Control of Flexible Display") appears to disclose an apparatus to control an image output position of a flexible display moving a position of an image output area in a screen area when the flexible display is rotated. U.S. Patent Application Pub. 20130120459 (Dickinson et al., May 16, 2013, "Display Device, Corresponding Systems, and Methods for Orienting Output on a Display") appears to disclose a display that provides visual output having a presentation orientation.

U.S. Patent Application Pub. 20130222137 (Alameh et al., Aug. 29, 2013, "Method for Adapting a Mobile Communication Device's Function to Monitored Activity and a User's Profile") appears to disclose a method for adapting a mobile communication device's function corresponding to monitored activity and a user's profile. U.S. Patent Application Pub. 20140132481 (Bell et al., May 15, 2014, "Mobile Devices with Plural Displays") appears to disclose mobile devices having a main display on the front side of a body and a secondary display on one of the four lateral sides of the body. U.S. Patent Application Pub. 20140160078 (Seo et al., Jun. 12, 2014, "Mobile Device of Bangle Type, Control Method Thereof, and UI Display Method") appears to disclose a mobile device including a bangle, a display mounted in the body, a motion sensor configured to detect a motion, a storage configured to store control information which is differently set according to a motion state, and, when a motion is detected by the motion sensor, a controller configured to change a screen of the display according to control information corresponding to the detected motion.

U.S. Patent Application Pub. 20140329561 (Kim et al., Nov. 6, 2014, "Mobile Terminal and Method for Controlling the Same") appears to disclose a mobile terminal including a sub-device that is attached thereto or detached therefrom to remotely control the operation and state of the terminal. U.S. Patent Application Pub. 20160070410 (Lin et al., Mar. 10, 2016, "Display Apparatus, Electronic Apparatus, Hand-Wearing Apparatus and Control System") appears to disclose a display apparatus, an electronic apparatus, a hand-wearing apparatus, and a control system. U.S. Patent Application Pub. 20160091980 (Baranski et al., Mar. 31, 2016, "Motion and Gesture Input from a Wearable Device") appears to disclose a device that detects a user's motion and gesture input through the movement of one or more of the user's hand, arm, wrist, and fingers, for example, to provide commands to the device or to other devices.

U.S. Patent Application Pub. 20160116940 (Jones et al., Apr. 28, 2016, "Band for a Wearable Device") appears to disclose bands for wearable devices which include a support structure with an antenna. U.S. Patent Application Pub. 20160192428 (Friedman et al., Jun. 30, 2016, "Systems, Apparatus, and Methods for Programmatically Associating Nearby Users") appears to disclose systems, apparatus, methods, and non-transitory media for programmatically associating nearby users. U.S. Patent Application Pub. 20160192526 (Gao et al., Jun. 30, 2016, "Electronic Device and Method for Controlling Power Supply of Electronic Device") appears to disclose an electronic device with a first body and a second body which are detachably connected, wherein the electronic device is fixed to the operation body via the fixing apparatus and the fixing apparatus and the frame form a ring-shaped space.

U.S. Patent Application Pub. 20160192716 (Lee, Jul. 7, 2016, "Apparatus for Selectively Attaching Physiological Sensor Pod to Different Types of Wearable Apparel, and Wearable Apparel Including the Same") appears to disclose a physiologic sensor pod which attaches to clothing, wherein the sensor pod includes a housing with a top surface, a bottom surface, a peripheral surface, and a groove extending around the peripheral surface. U.S. Patent Application Pub. 20160349790 (Connor, Dec. 1, 2016, "Wearable Computer Display Devices for the Forearm, Wrist, and/or Hand") appears to disclose a wearable display device for the wrist and/or forearm with an upper distal-to-proximal extension, one or more forearm-extending computer displays, and a gap or opening below the upper distal-to-proximal extension into which a garment sleeve can be inserted.

SUMMARY OF THE INVENTION

One key challenge associated with wearable devices for the wrist is that the wrist provides relatively little space for a visual computer interface. This invention addresses this challenge with advantageous designs for dual-display smart watches with proximal and distal displays, some of which include both analog and electronic displays. In an example, this invention can be embodied in a dual-display smart watch with: a proximal display which is worn on the dorsal half-circumference of a person's wrist or forearm and has a centroid which is a first distance from the person's elbow; and a distal display which is worn on the dorsal half-circumference of the person's wrist or forearm and has a centroid which is a second distance from the person's elbow, wherein the second distance is greater than the first distance.

In an example, the proximal and distal displays can both be selected from the group consisting of: electronic display, computer display, digital display, and electronic touch screen. In an example, one display can be an analog watch face which displays the time via mechanically-moving watch hands and the other display can be selected from the group consisting of: electronic display, computer display, digital display, and electronic touch screen. In an example, proximal and distal displays can show different types of information selected from the group consisting of: the time; notifications or messages; steps, heart rate, blood pressure, glucose level, or other biometric information; temperature, weather, location, directions, or other environmental information; and pictures, icons, or other digital images.

BRIEF DESCRIPTION OF THE FIGURES

FIG. #1 shows a dual-display watch with a dorsal band perimeter with concave left and right sides.

FIG. #2 shows a dual-display watch with a dorsal band perimeter shaped like an "I-Beam."

Figure 4:
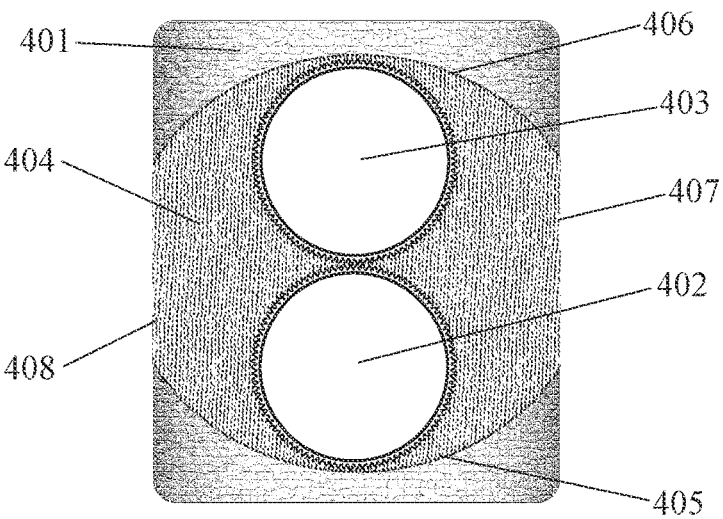
Figure 5:
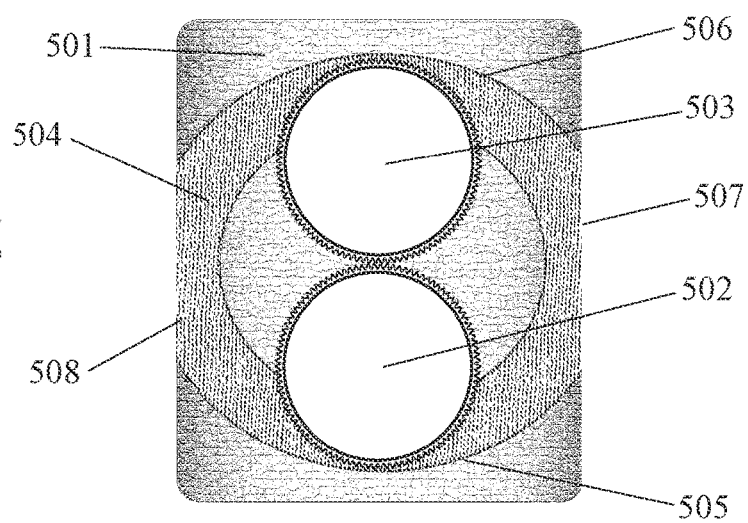
Figure 6:
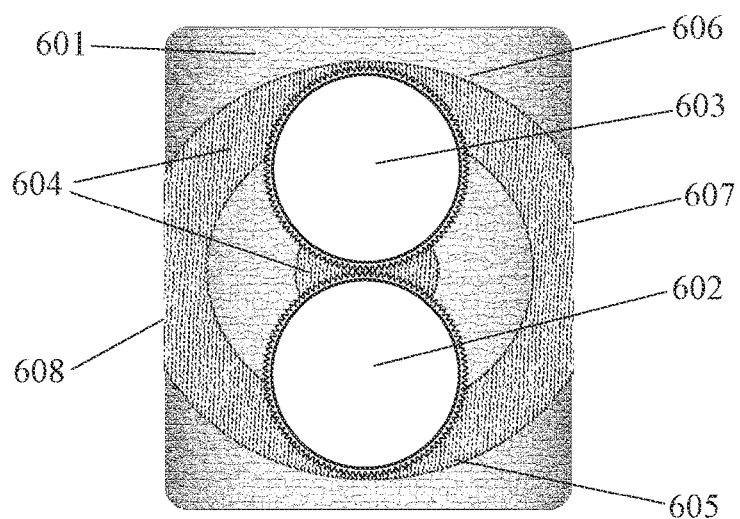
Figure 7:
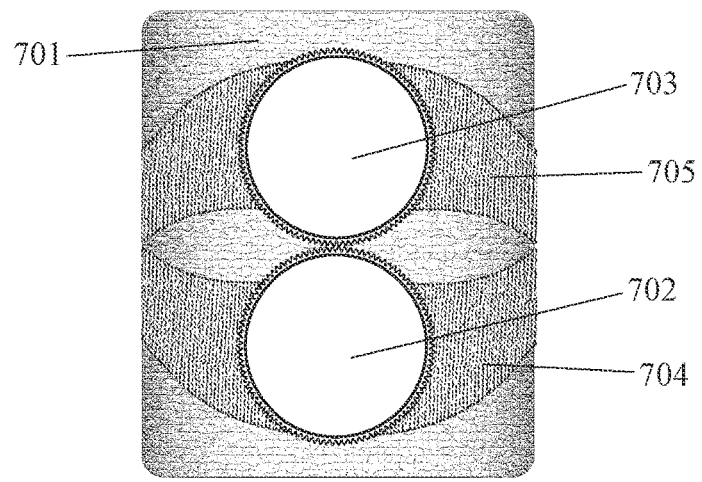
Figure 8:
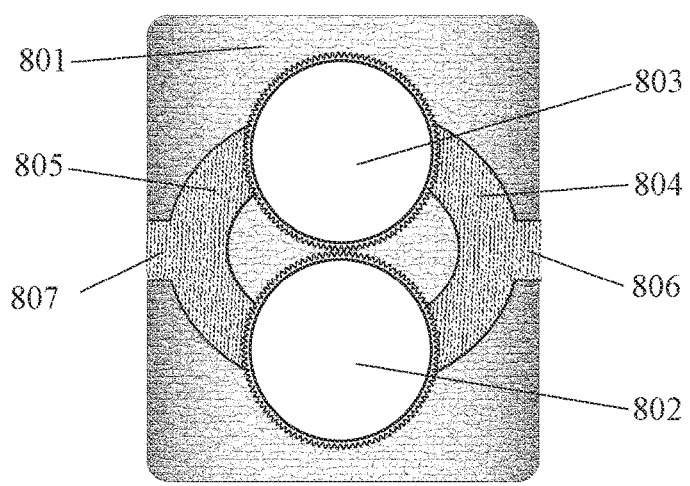
Figure 9:
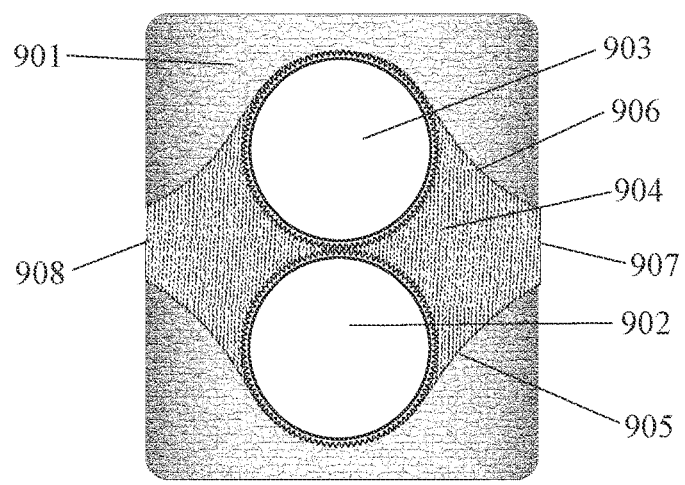
Figure 10:
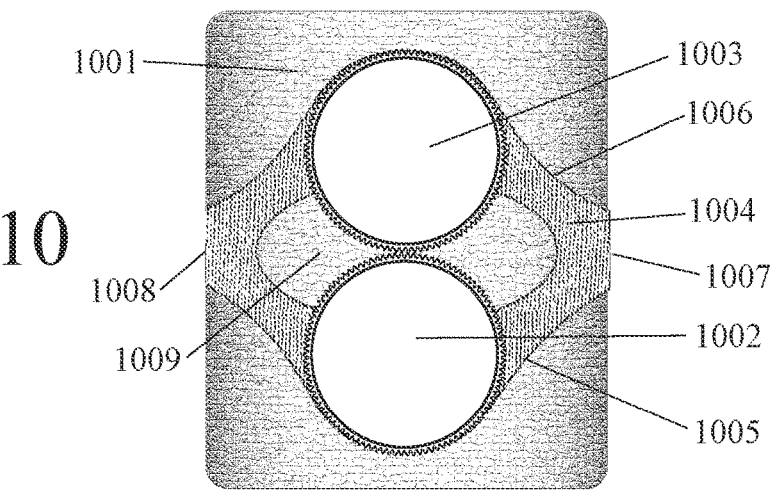
Figure 11:
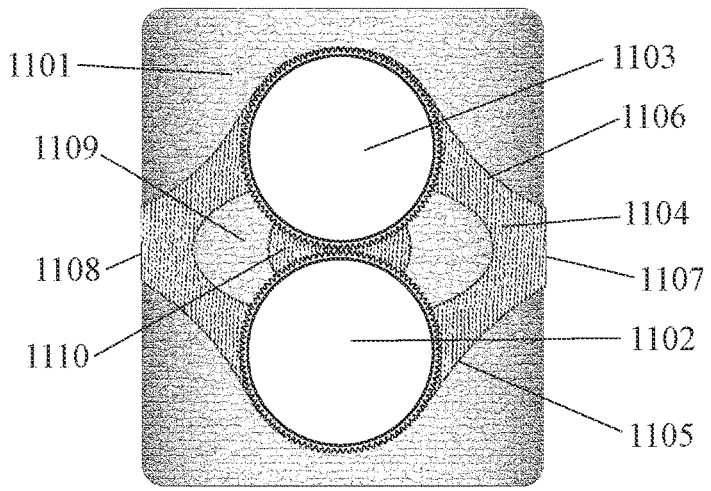
Figure 12:
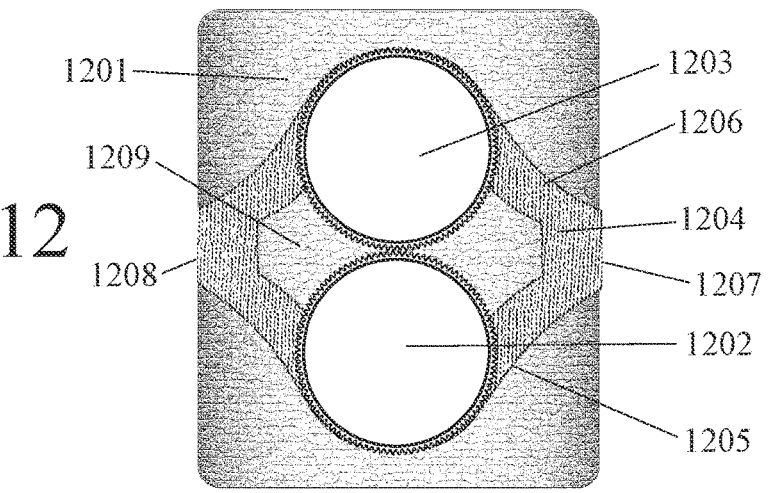
Figure 13:
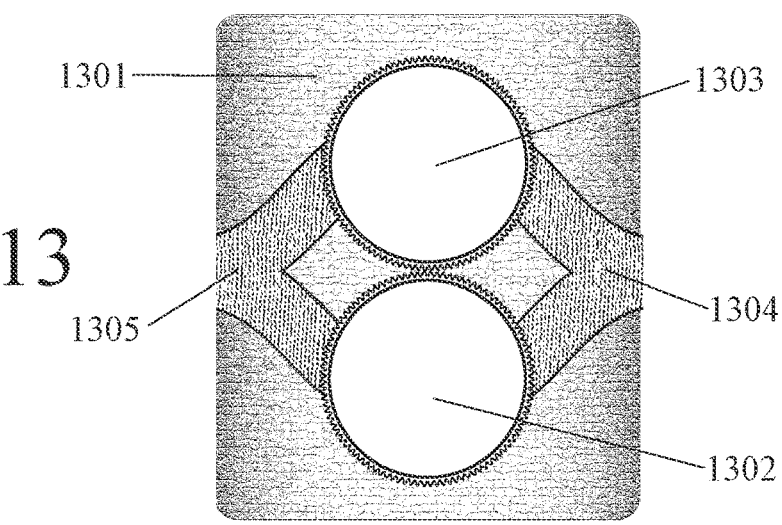
Figure 14:
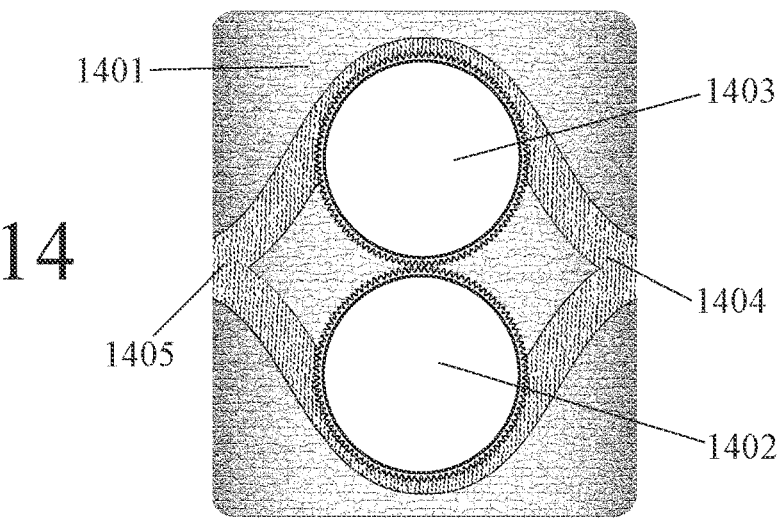
Figure 15:
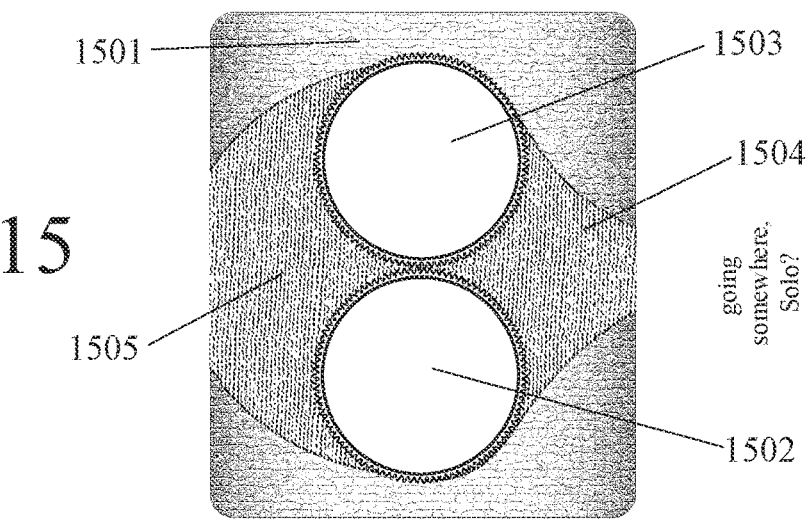
Figure 16:
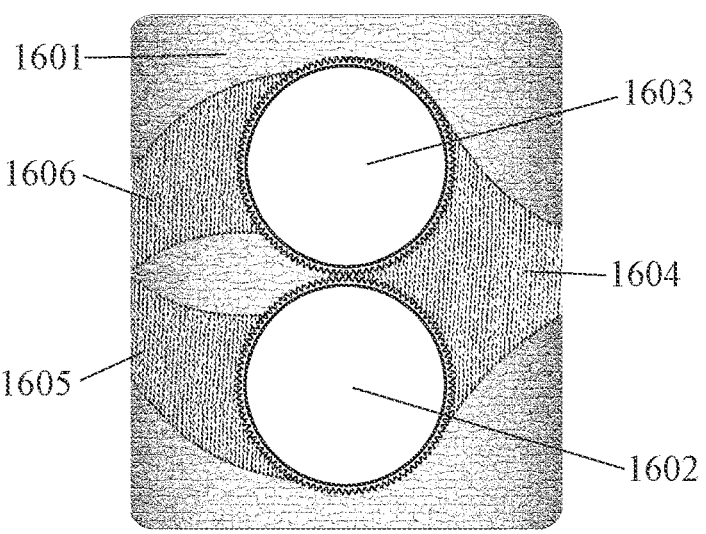
Figure 17:
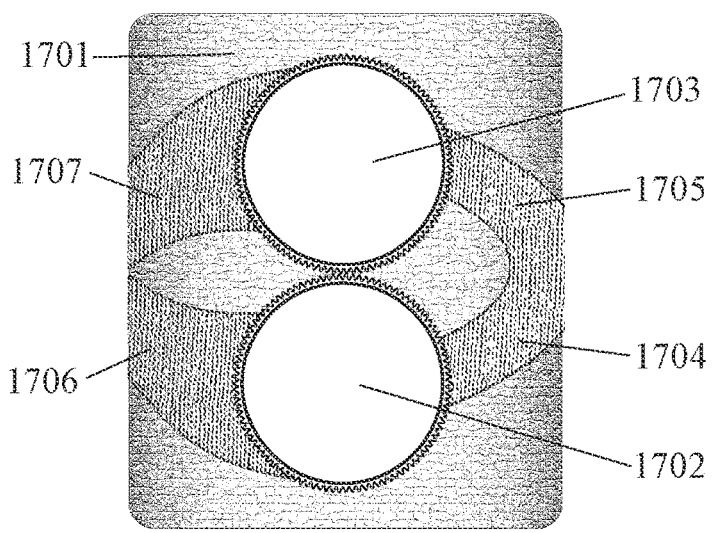
Figure 18:
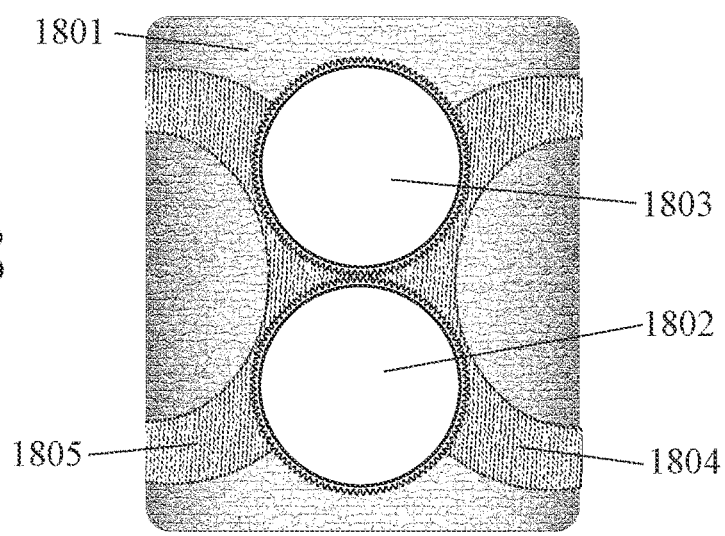
Figure 19:
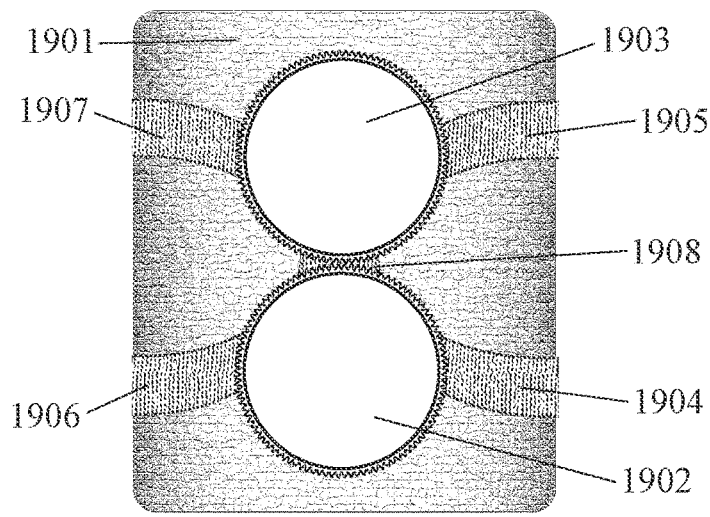
Figure 20:
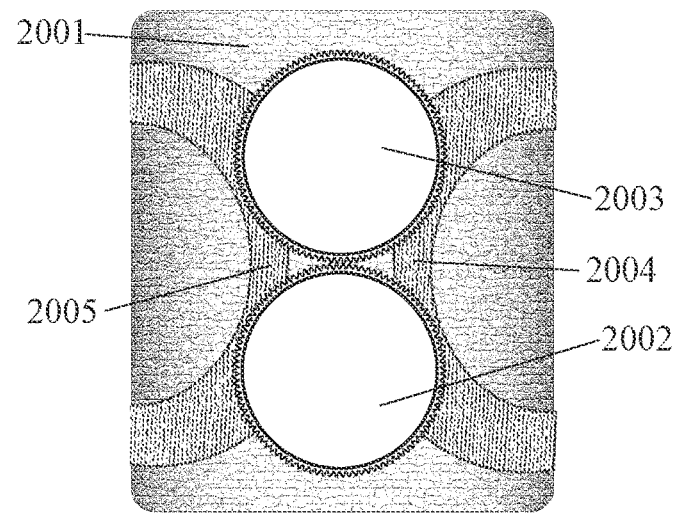
Figure 21:
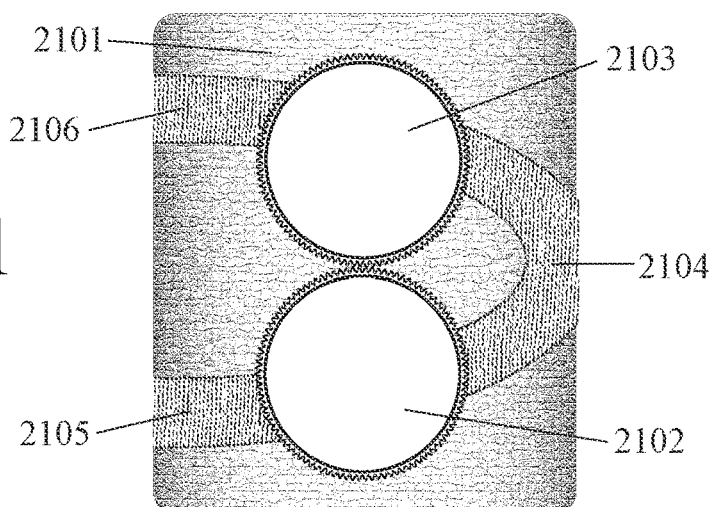
Figure 22:
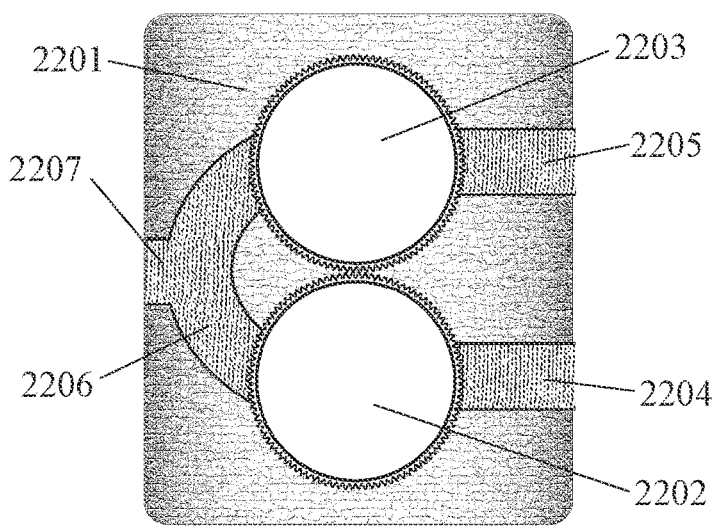
Figure 23:
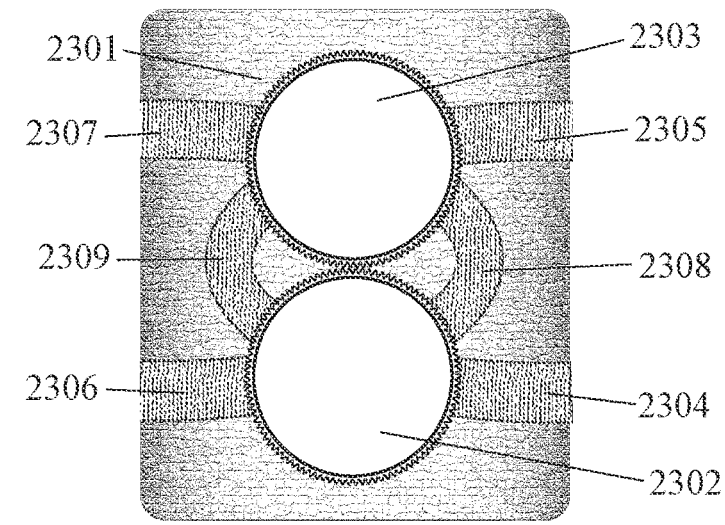
Figure 24:
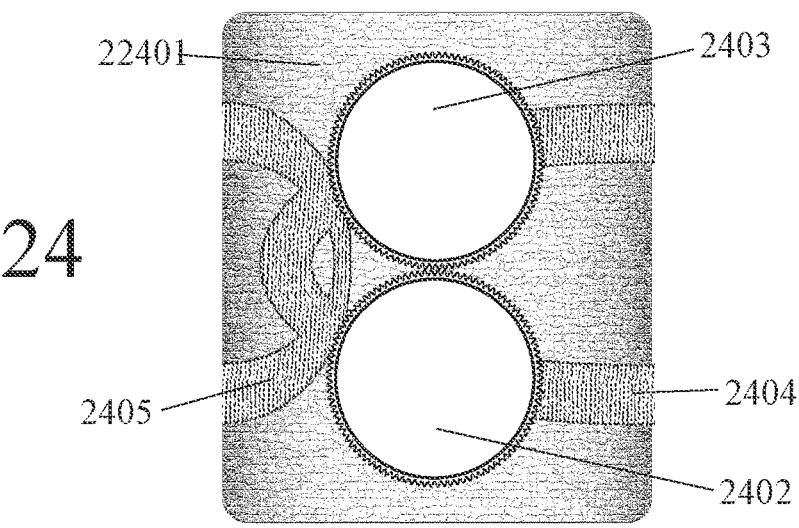
Figure 25:
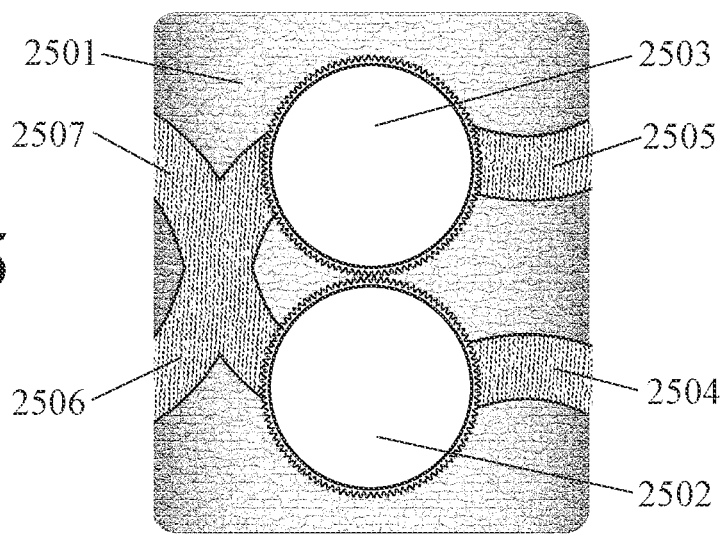
Figure 26:
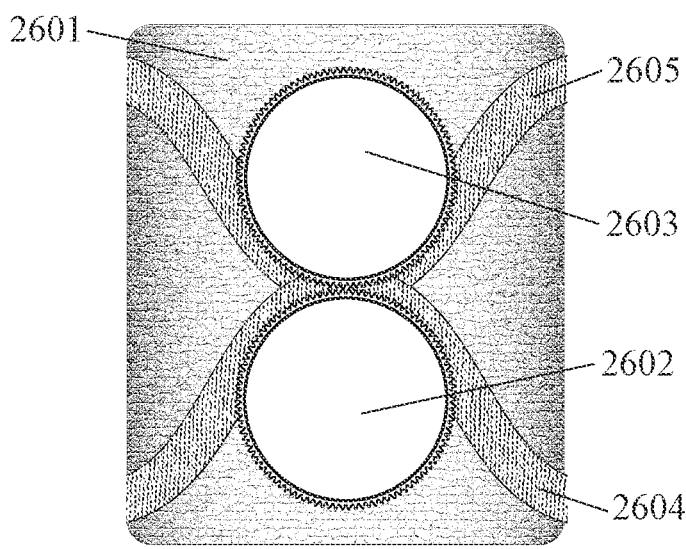
Figure 27:
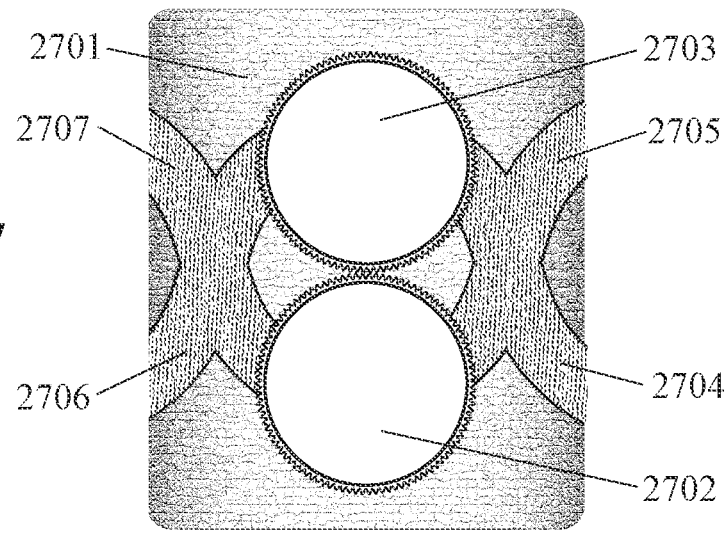
Figure 28:
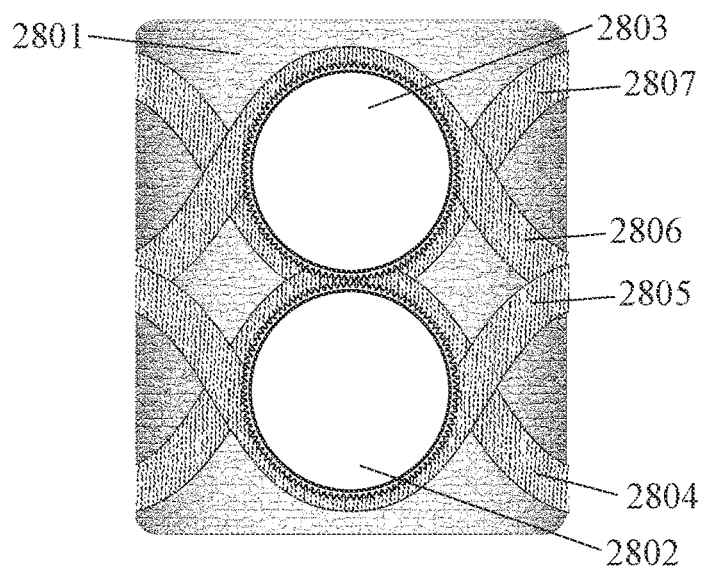
Figure 29:
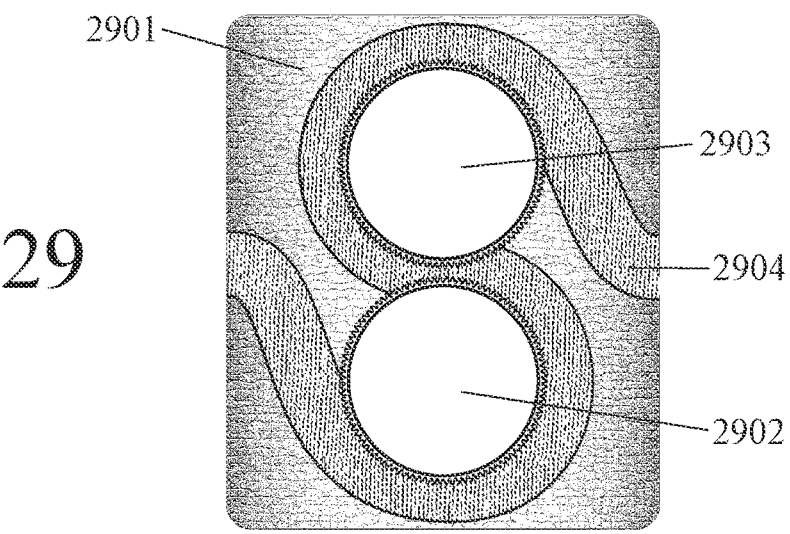
Figure 30:
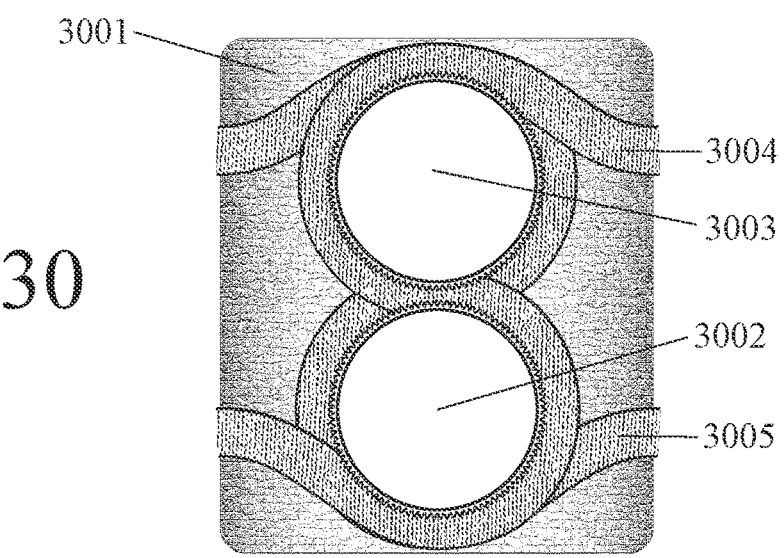
Figure 31:
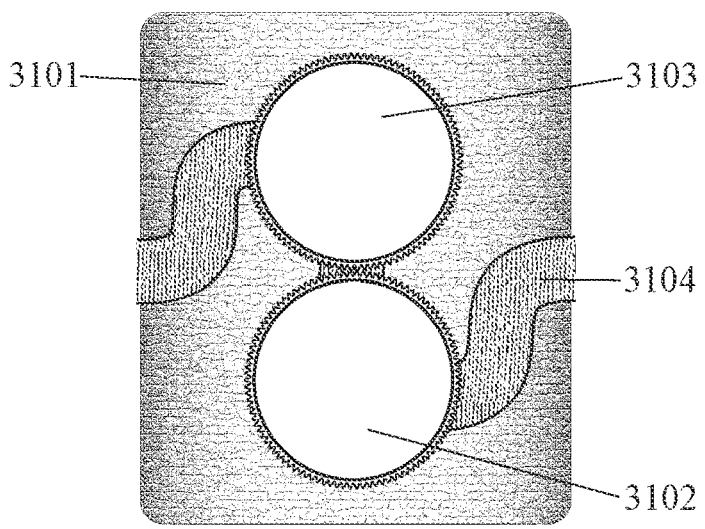
Figure 32:
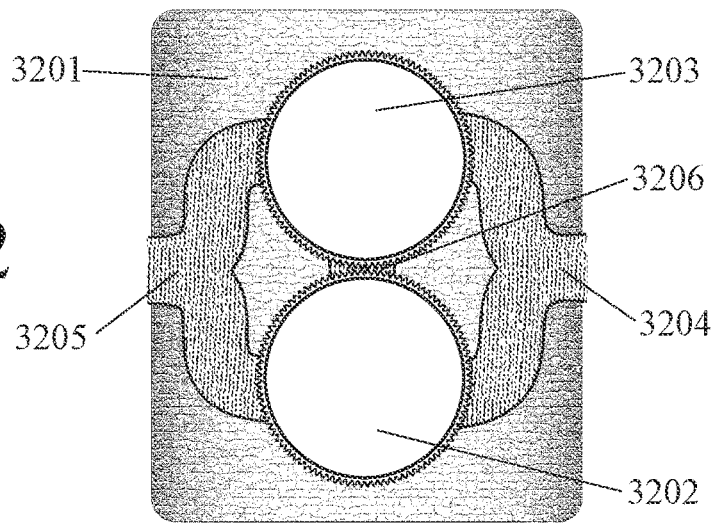
Figure 33:
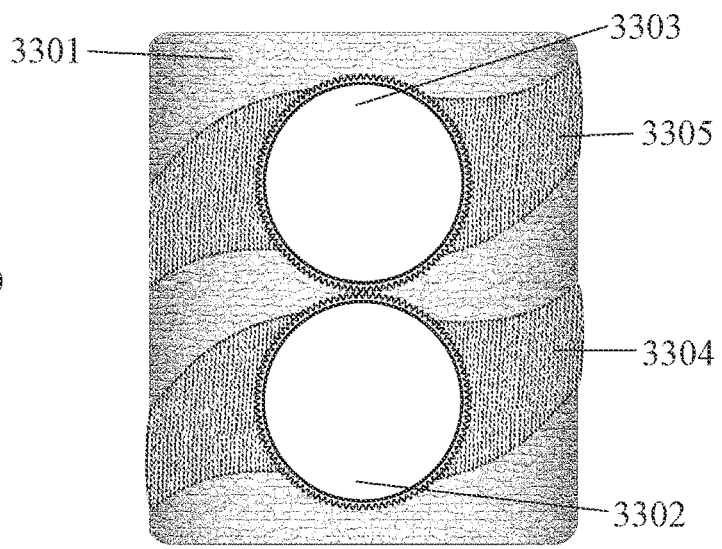
Figure 34:
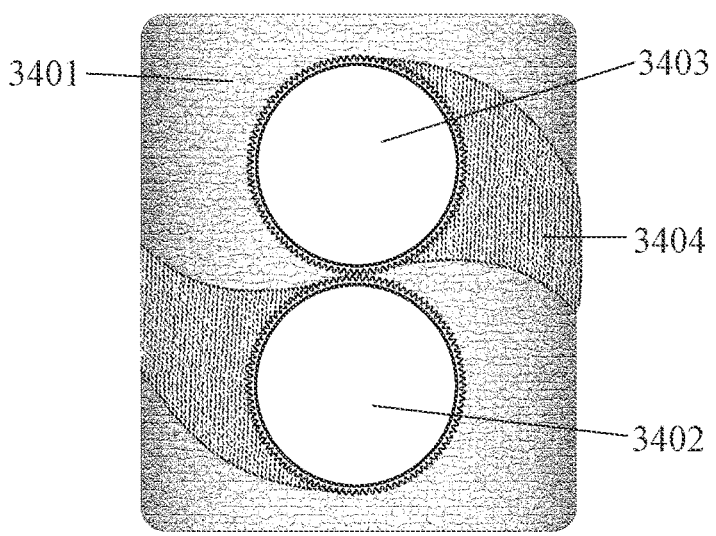
Figure 35:
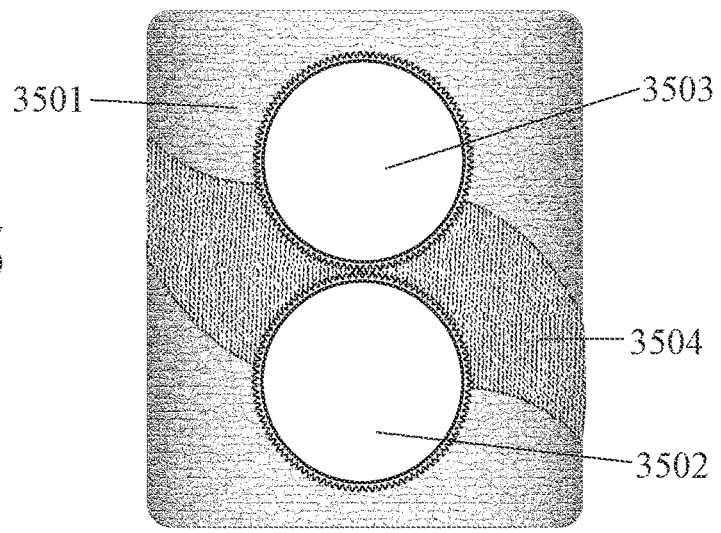
Figure 36:
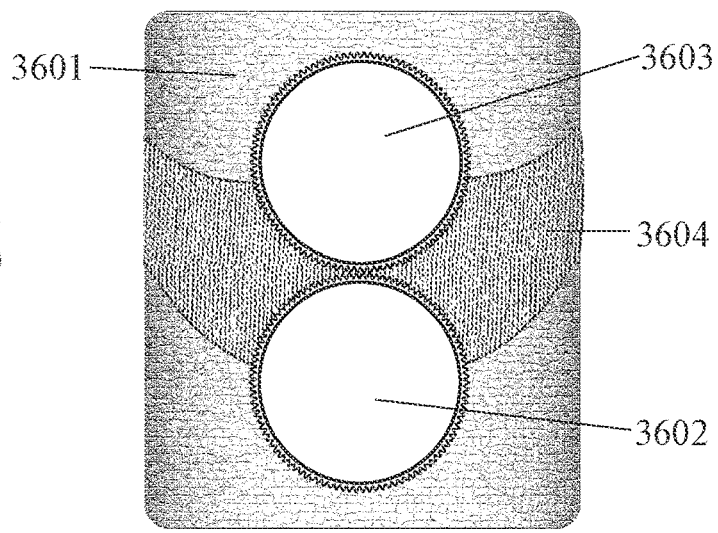
Figure 37:
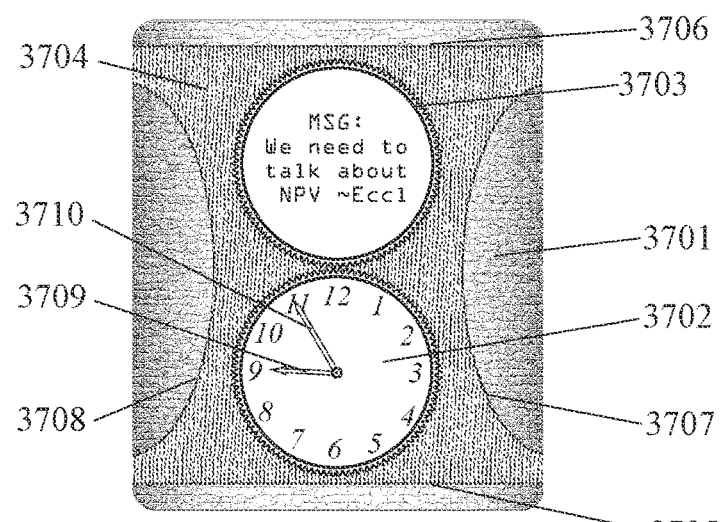
Figure 38:
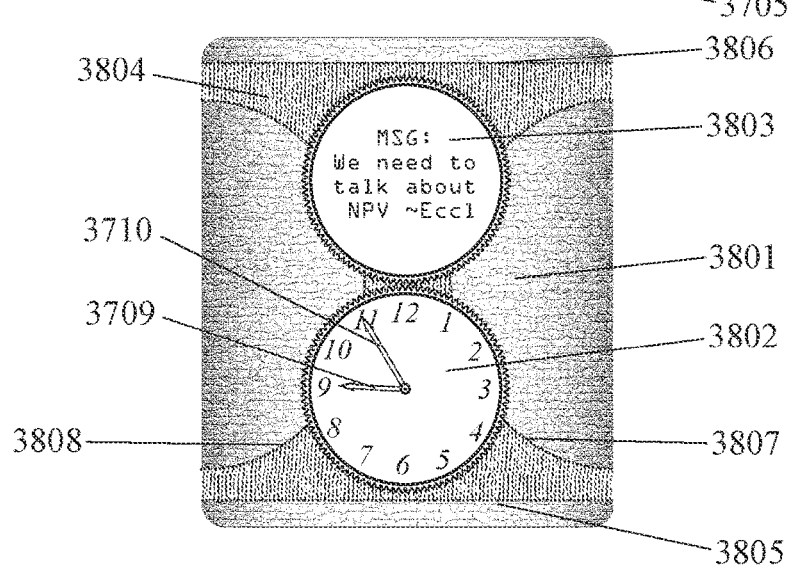
Figure 39:
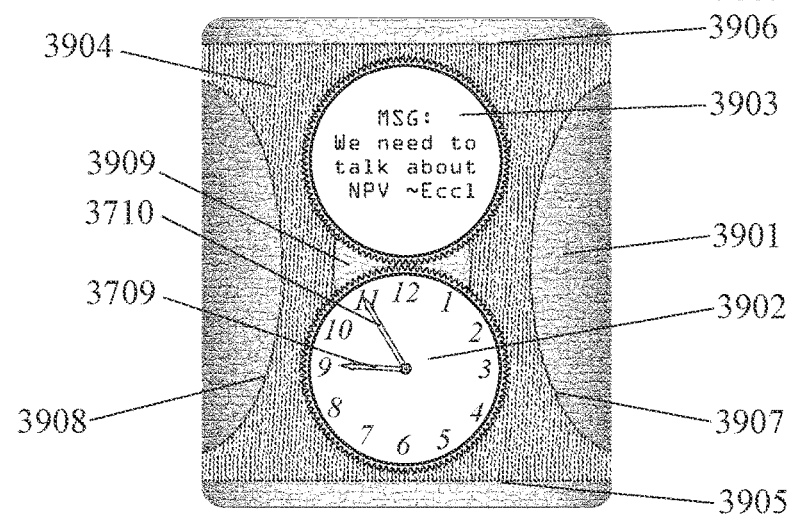
Figure 40:
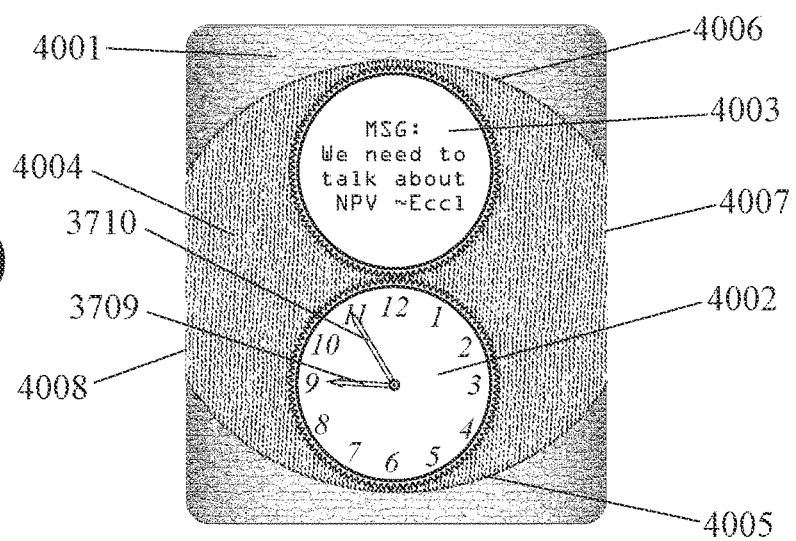
Figure 41:
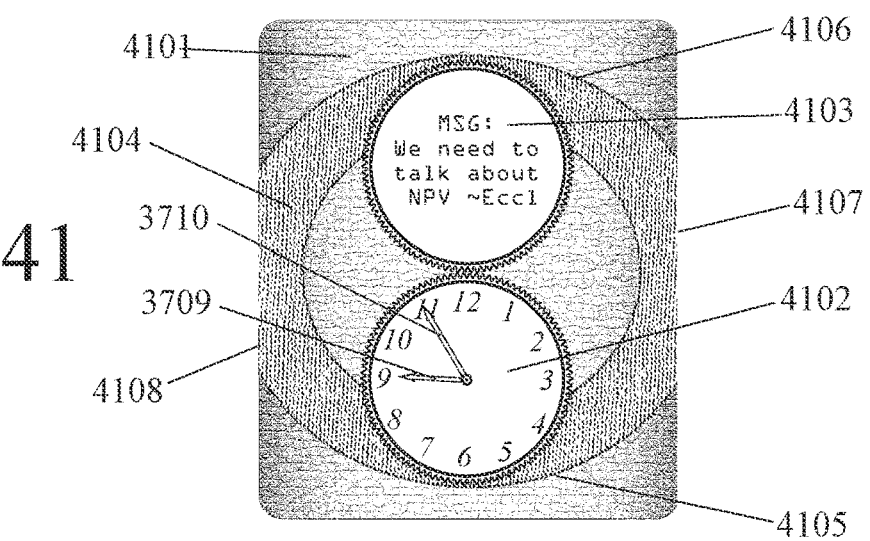
Figure 42:
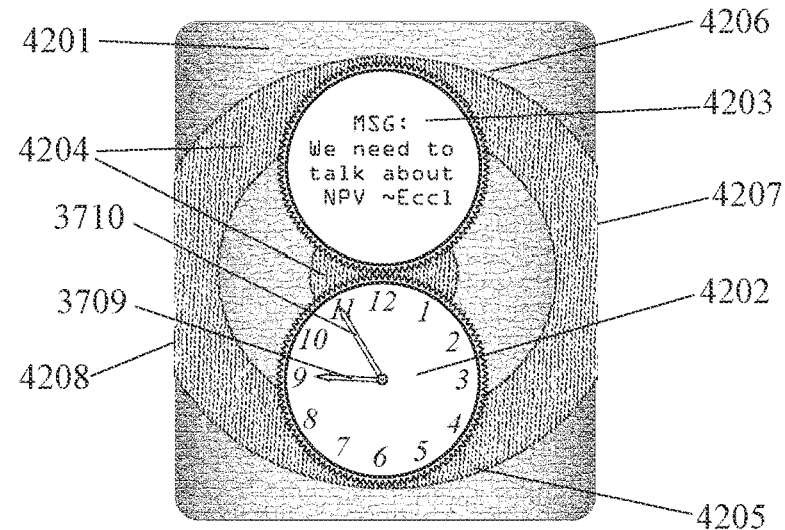
Figure 46:
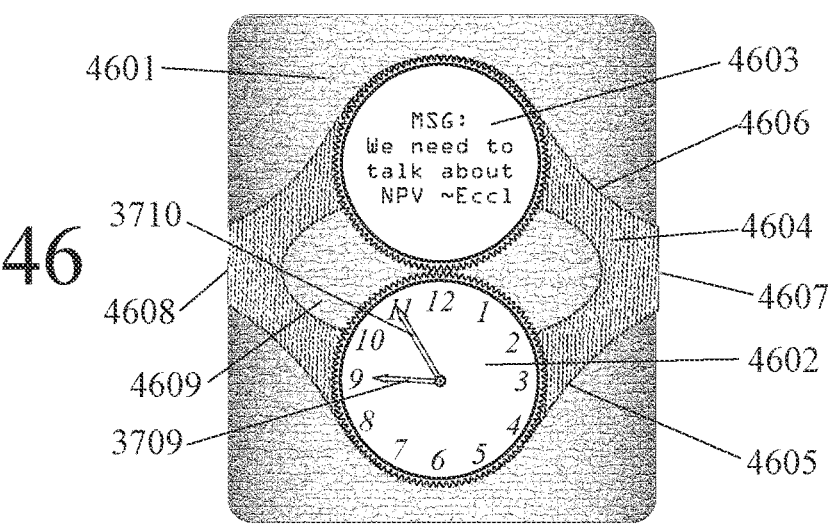
Figure 47:
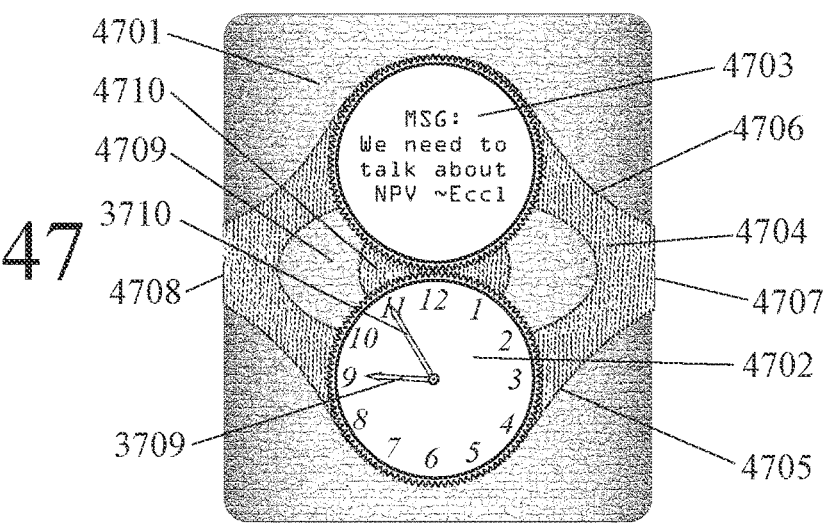
Figure 48:
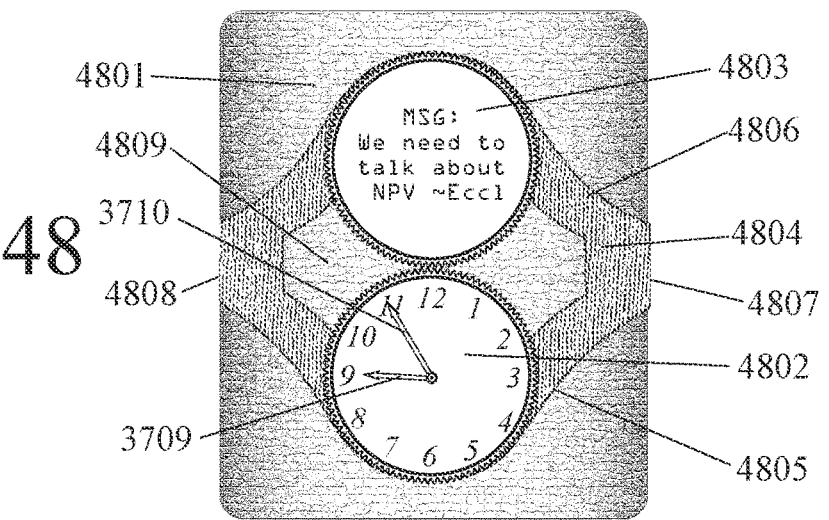
Figure 49:
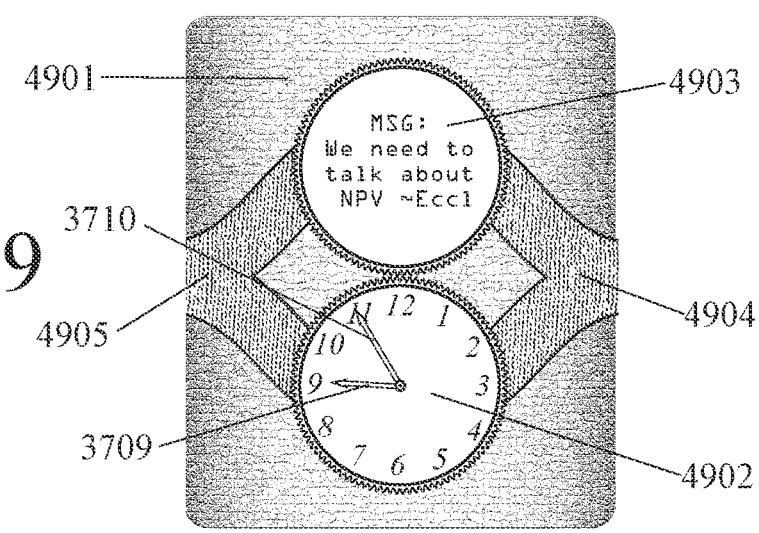
Figure 50:
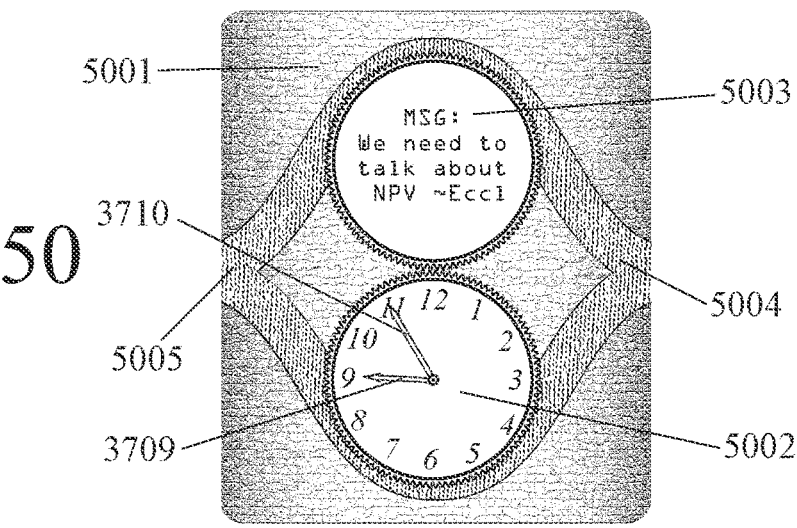
Figure 51:
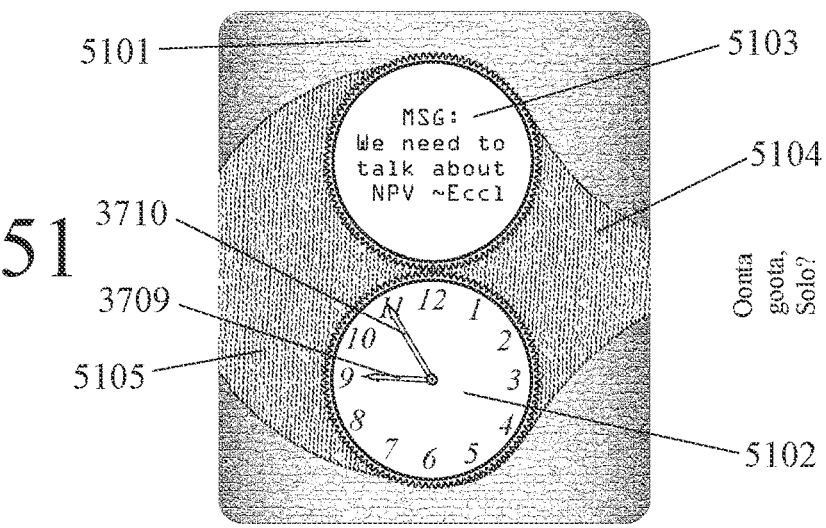
Figure 52:
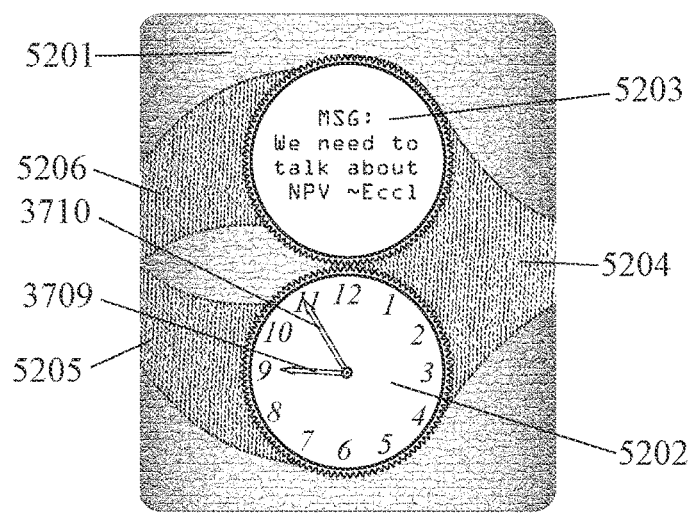
Figure 53:
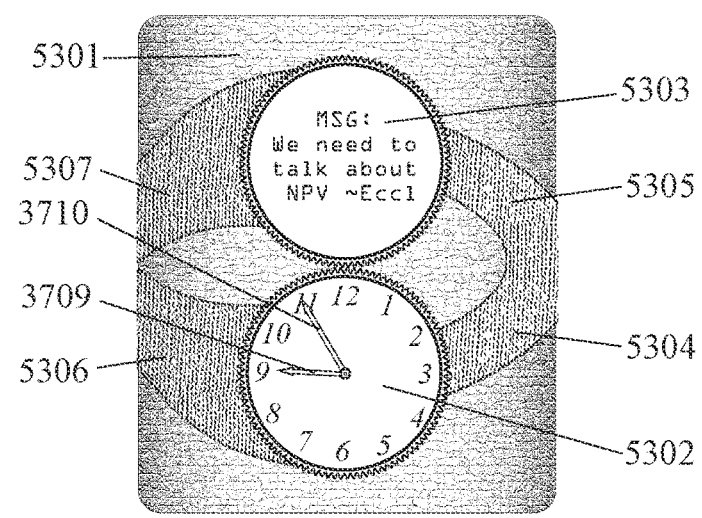
Figure 54:
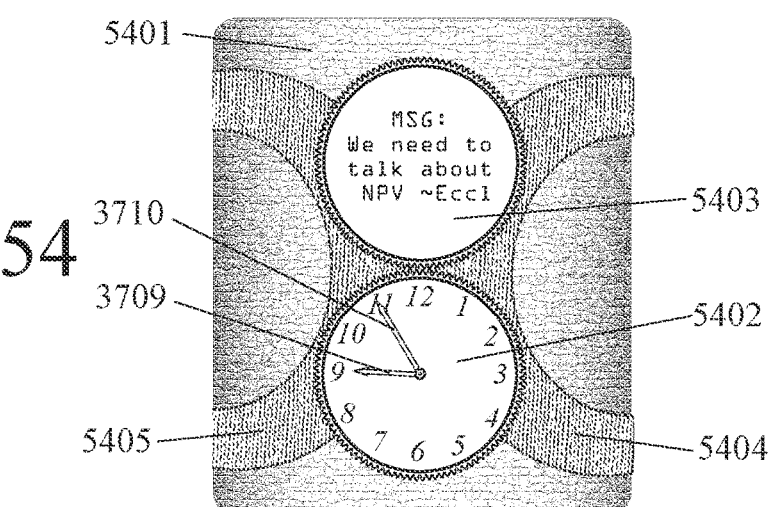
Figure 55:
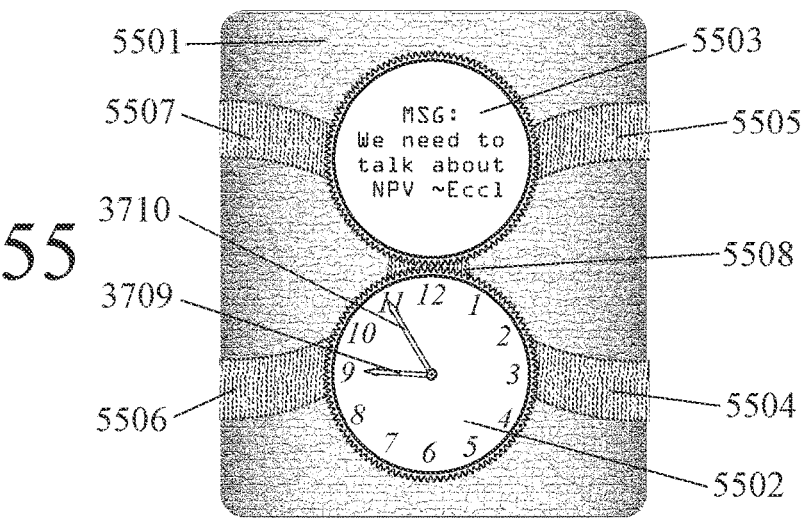
Figure 56:
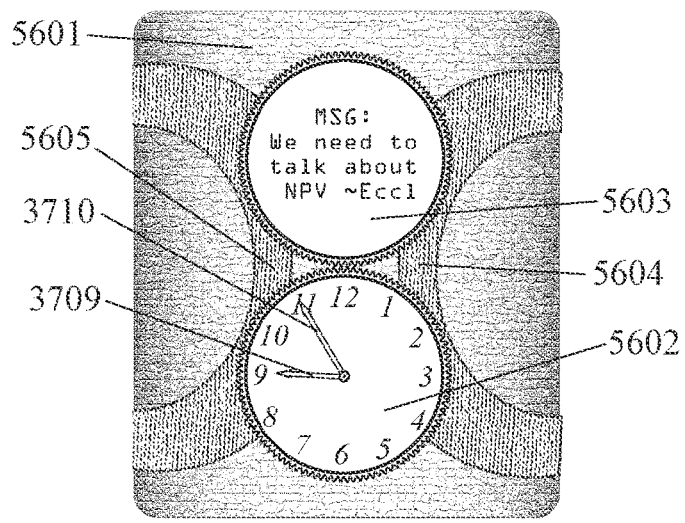
Figure 57:
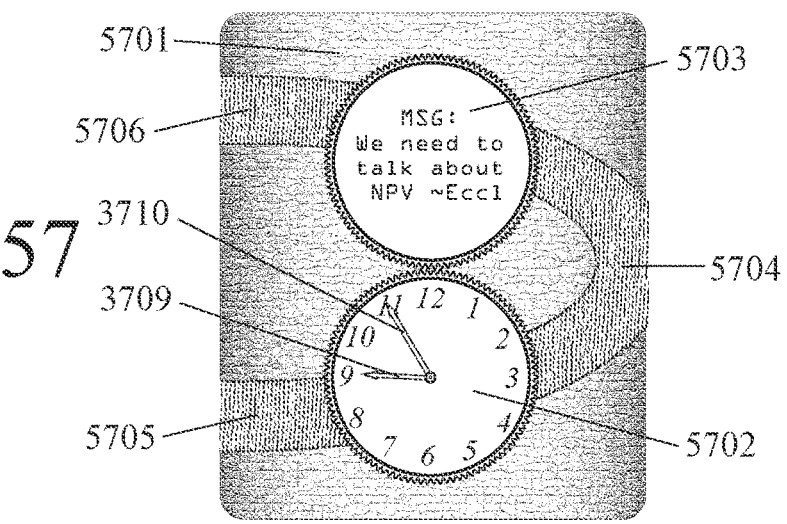
Figure 58:
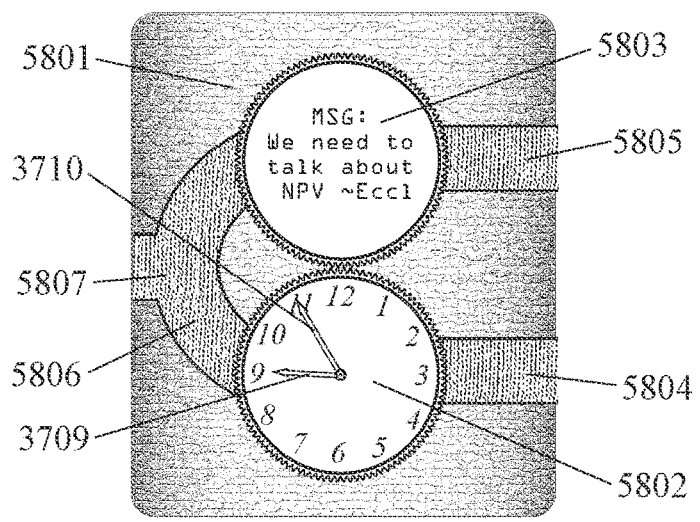
Figure 59:
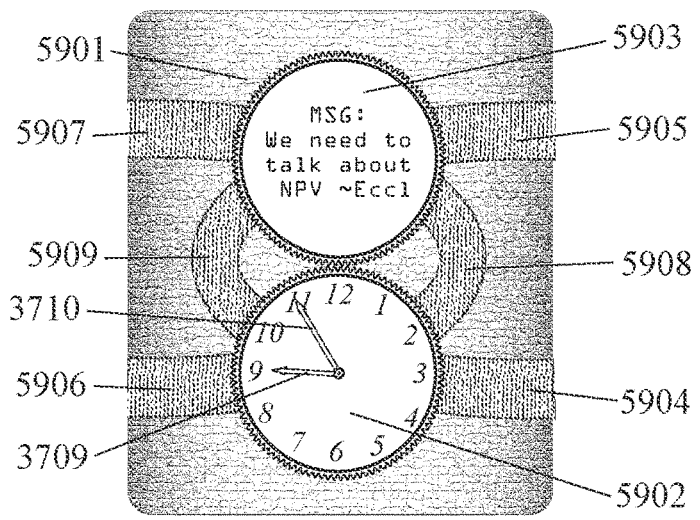
Figure 60:
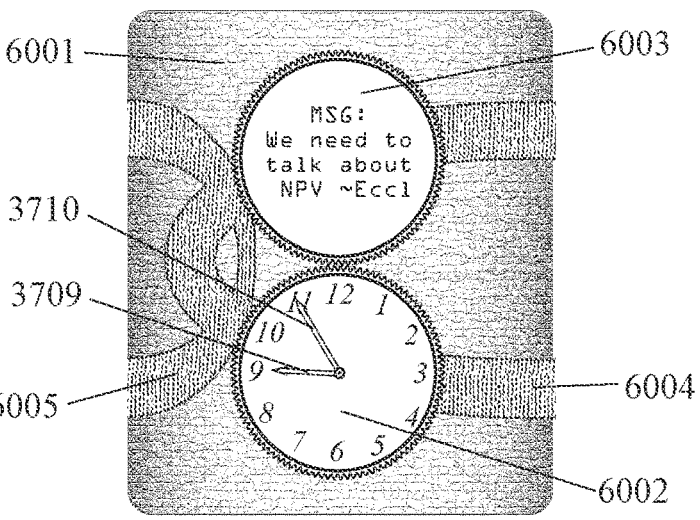
Figure 61:
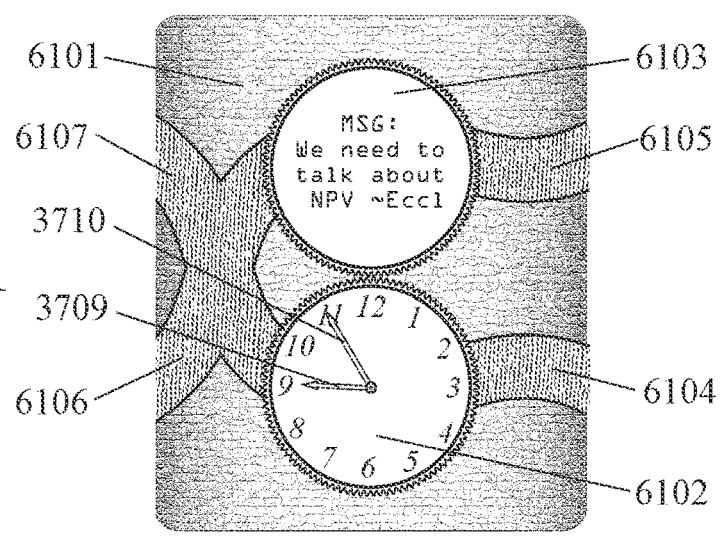
Figure 62:
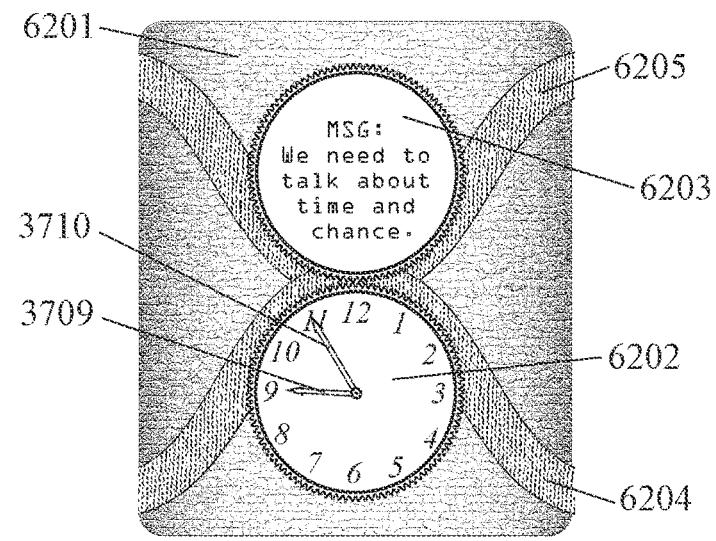
Figure 63:
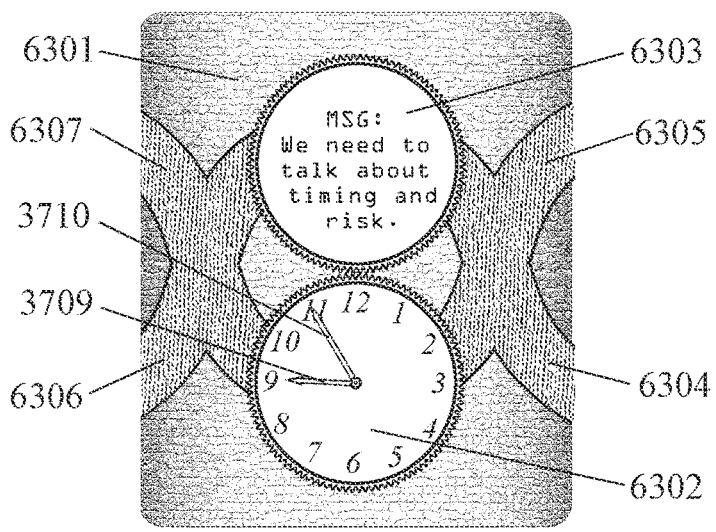
Figure 64:
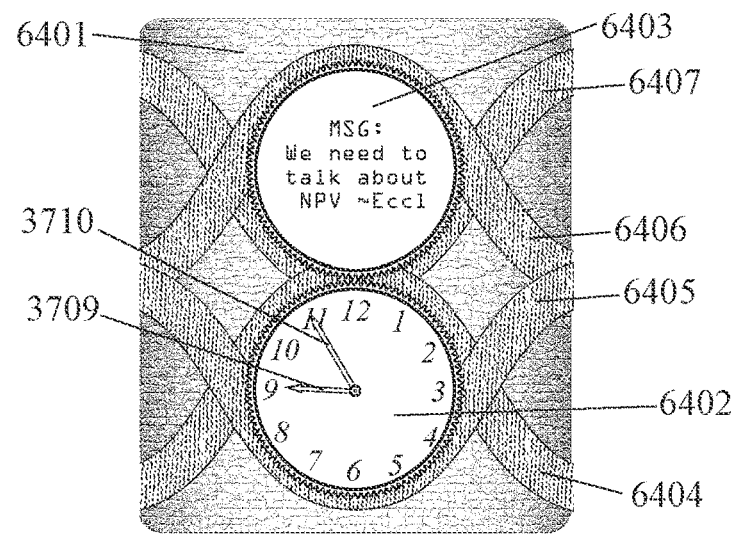
Figure 65:
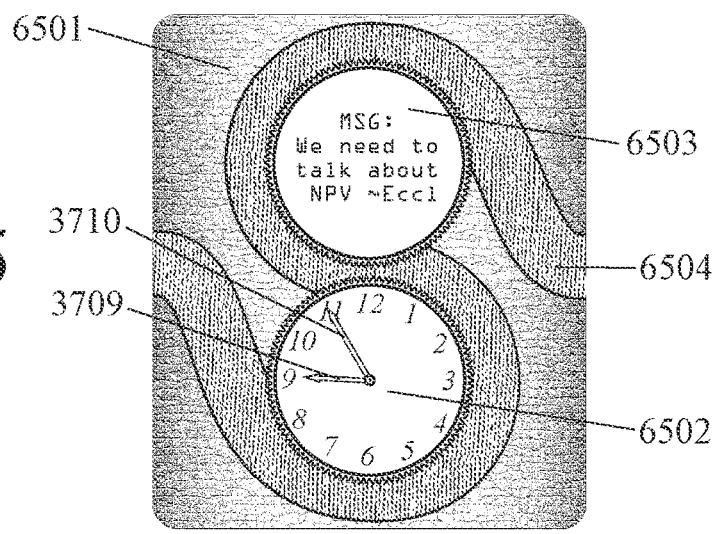
Figure 66:
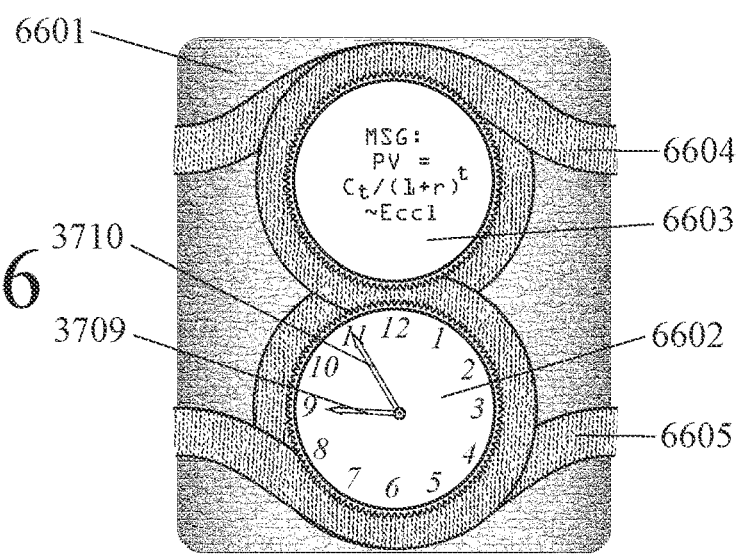
Figure 67:
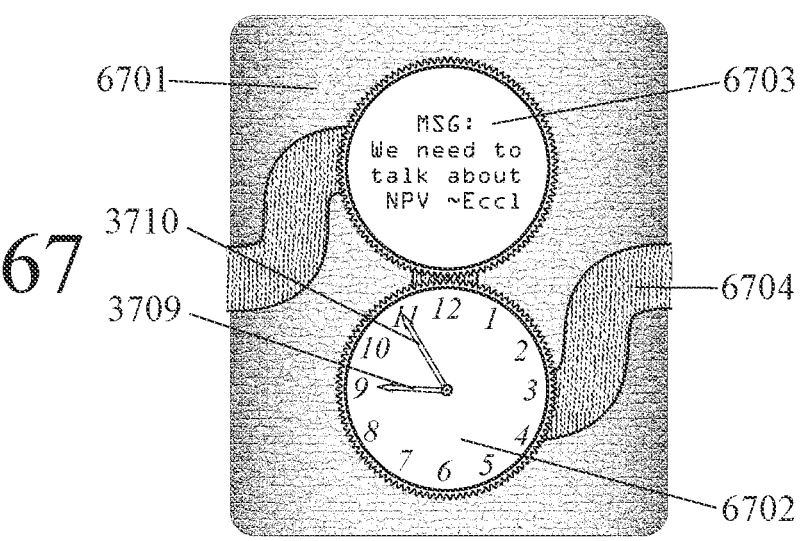
Figure 68:
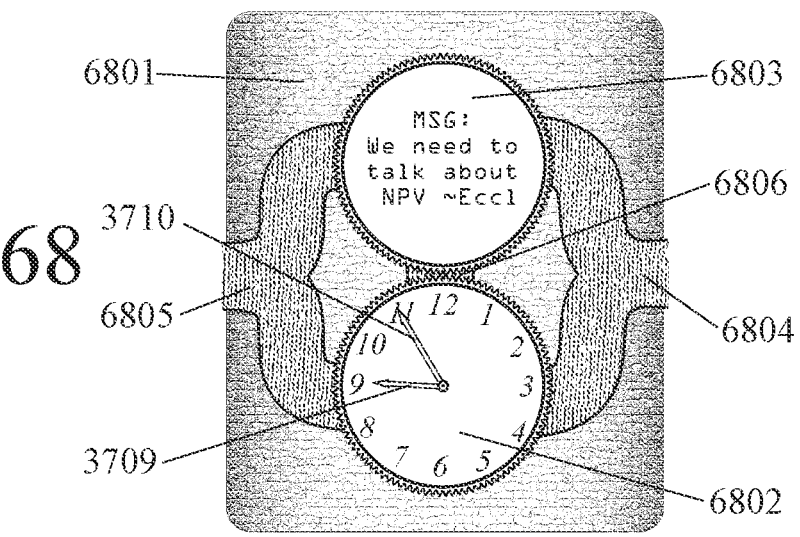
Figure 69:
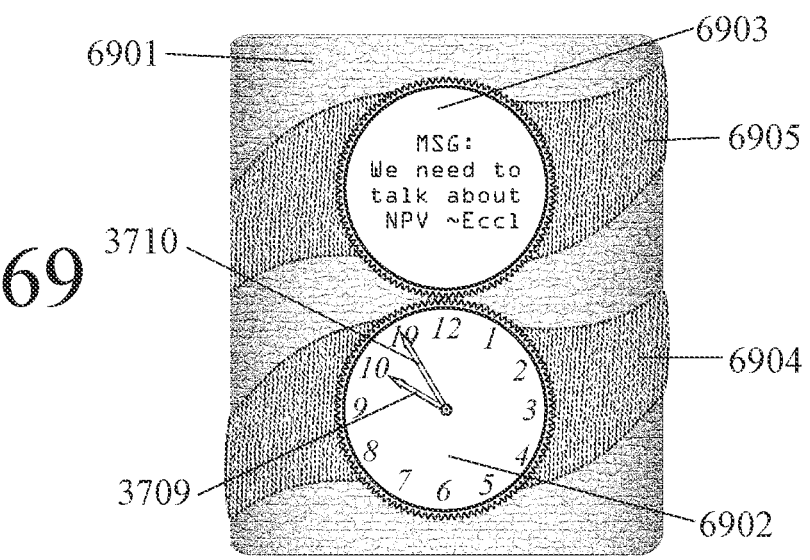
Figure 70:
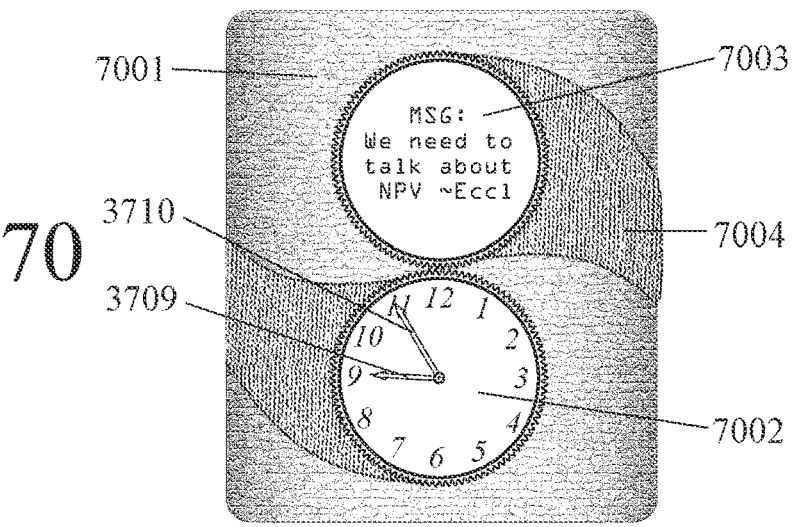
Figure 71:
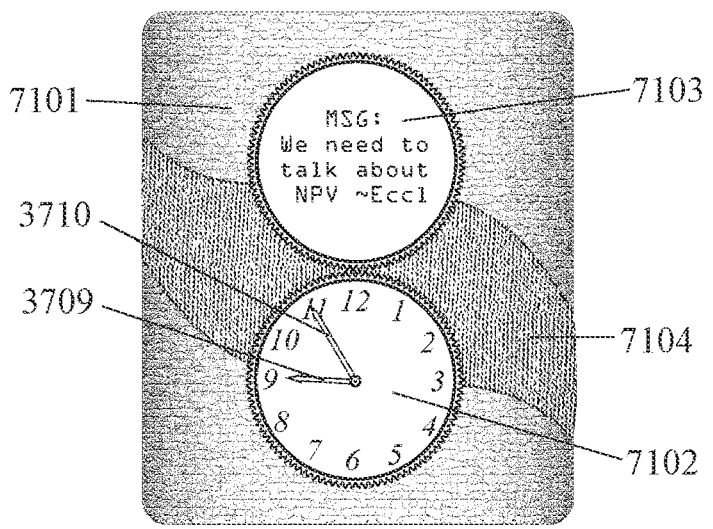
Figure 72:
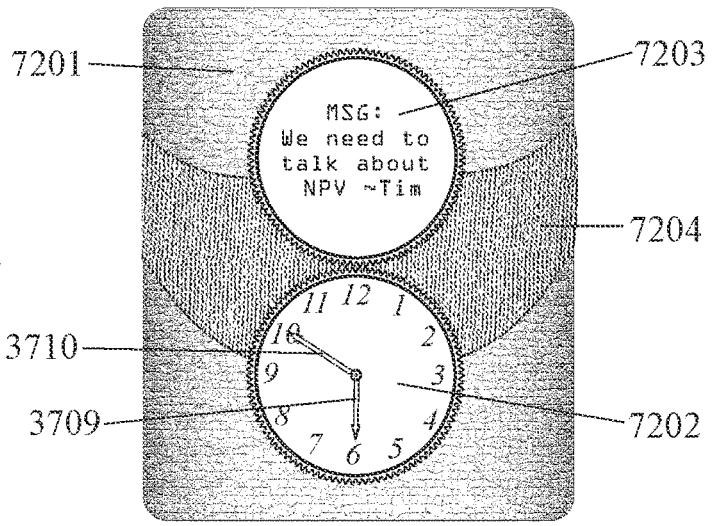
Figure 73:
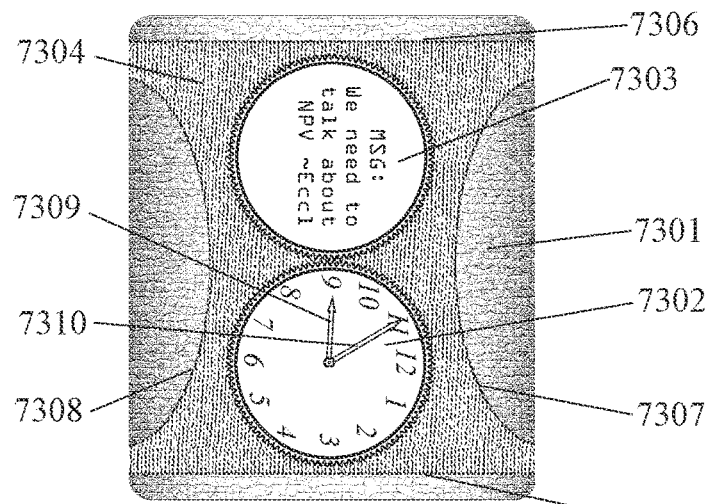
Figure 74:
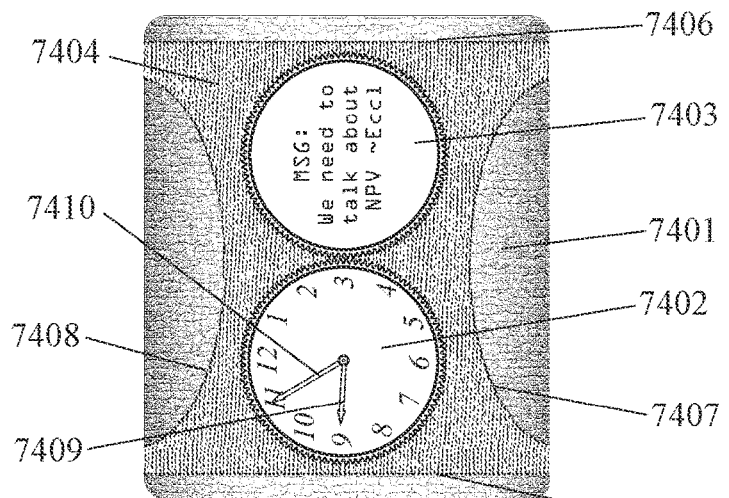
Figure 75:
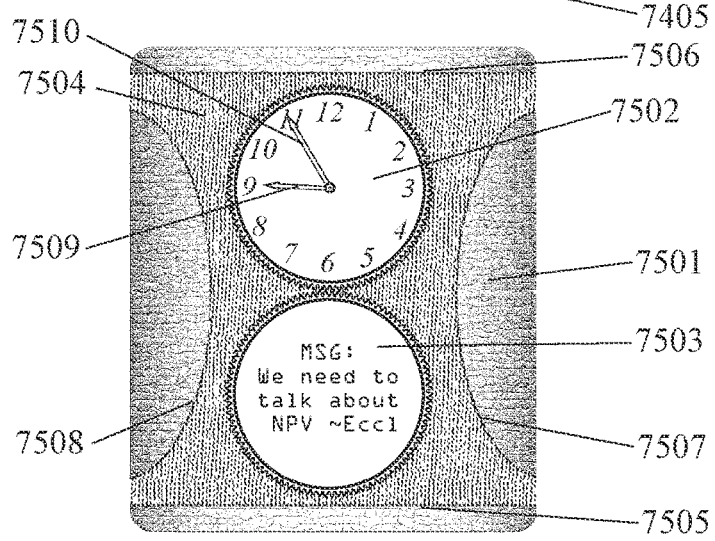

FIG. #3 shows a dual-display watch with a dorsal band perimeter shaped like a concave lens with a central hole.

FIG. #4 shows a dual-display watch with a dorsal band perimeter shaped like a circle or ellipse.

FIG. #5 shows a dual-display watch with a dorsal band perimeter shaped like a ring.

FIG. #6 shows a dual-display watch with a dorsal band perimeter shaped like a bull's eye target.

FIG. #7 shows a dual-display watch with dorsal proximal and distal convex bands.

FIG. #8 shows a dual-display watch with dorsal right and left side partial-rings with stubs.

FIG. #9 shows a dual-display watch with a dorsal band with sinusoidal proximal and distal edges.

FIG. #10 shows a dual-display watch with a dorsal band with sinusoidal proximal and distal edges and a central hole.

FIG. #11 shows a dual-display watch with a dorsal band with sinusoidal edges, a central hole, and a central band within the hole.

FIG. #12 shows a dual-display watch with a dorsal band with sinusoidal edges and a central hole with multiple vertexes.

FIG. #13 shows a dual-display watch with a dorsal band perimeter with thick right side and left side bifurcations.

FIG. #14 shows a dual-display watch with a dorsal band perimeter with thin right side and left side bifurcations.

FIG. #15 shows a dual-display watch with a dorsal band perimeter with a concave right side and convex left side.

FIG. #16 shows a dual-display watch with a dorsal band perimeter with two left side bands and one right side band.

FIG. #17 shows a dual-display watch with a dorsal band perimeter with two thick left-side bands and two thin right-side bands.

FIG. #18 shows a dual-display watch with a dorsal band perimeter with connected thick symmetric "C" shapes on its right and left sides.

FIG. #19 shows a dual-display watch with a dorsal band perimeter with connected thin symmetric "C" shapes on its right and left sides.

FIG. #20 shows a dual-display watch with a dorsal band perimeter with separate symmetric "C" shapes on its right and left sides.

FIG. #21 shows a dual-display watch with a dorsal band perimeter which looks like a laterally-oriented arch.

FIG. #22 shows a dual-display watch with a dorsal band perimeter which looks like a laterally-oriented arch with a top stub.

FIG. #23 shows a dual-display watch with a dorsal band perimeter which looks like two overlapping laterally-oriented arches.

FIG. #24 shows a dual-display watch with a dorsal band perimeter which looks like asymmetric laterally-oriented arches.

FIG. #25 shows a dual-display watch with two undulating bands which intersect on the dorsal left side.

FIG. #26 shows a dual-display watch with dorsal proximal and distal sinusoidal bands which converge centrally.

FIG. #27 shows a dual-display watch with dorsal proximal and distal sinusoidal bands which intersect on the left and right sides.

FIG. #28 shows a dual-display watch with four pair-wise intersecting dorsal sinusoidal bands.

FIG. #29 shows a dual-display watch with a serpentine dorsal band.

FIG. #30 shows a dual-display watch with two intersecting serpentine dorsal bands.

FIG. #31 shows a dual-display watch with a band that looks like a drain trap and is really quite ugly.

FIG. #32 shows a dual-display watch with a dorsal band perimeter that looks like two symmetric whale tails.

FIG. #33 shows a dual-display watch with helical proximal and distal bands.

FIG. #34 shows a dual-display watch with single helical band.

FIG. #35 shows a dual-display watch with a watch band which curves in different directions on left and right sides.

FIG. #36 shows a dual-display watch with a watch band with a convex proximal edge and a concave distal edge.

FIG. #37 shows a dual (analog and electronic) display watch with a dorsal band perimeter with concave left and right sides.

FIG. #38 shows a dual (analog and electronic) display watch with a dorsal band perimeter shaped like an "I-Beam."

FIG. #39 shows a dual (analog and electronic) display watch with a dorsal band perimeter shaped like a concave lens with a central hole.

FIG. #40 shows a dual (analog and electronic) display watch with a dorsal band perimeter shaped like a circle or ellipse.

FIG. #41 shows a dual (analog and electronic) display watch with a dorsal band perimeter shaped like a ring.

FIG. #42 shows a dual (analog and electronic) display watch with a dorsal band perimeter shaped like a bull's eye target.

FIG. #43 shows a dual (analog and electronic) display watch with dorsal proximal and distal convex bands.

FIG. #44 shows a dual (analog and electronic) display watch with dorsal right and left side partial-rings with stubs.

FIG. #45 shows a dual (analog and electronic) display watch with a dorsal band with sinusoidal proximal and distal edges.

FIG. #46 shows a dual (analog and electronic) display watch with a dorsal band with sinusoidal proximal and distal edges and a central hole.

FIG. #47 shows a dual (analog and electronic) display watch with a dorsal band with sinusoidal edges, a central hole, and a central band within the hole.

FIG. #48 shows a dual (analog and electronic) display watch with a dorsal band with sinusoidal edges and a central hole with multiple vertexes.

FIG. #49 shows a dual (analog and electronic) display watch with a dorsal band perimeter with thick right side and left side bifurcations.

FIG. #50 shows a dual (analog and electronic) display watch with a dorsal band perimeter with thin right side and left side bifurcations.

FIG. #51 shows a dual (analog and electronic) display watch with a dorsal band perimeter with a concave right side and convex left side.

FIG. #52 shows a dual (analog and electronic) display watch with a dorsal band perimeter with two left side bands and one right side band.

FIG. #53 shows a dual (analog and electronic) display watch with a dorsal band perimeter with two thick left-side bands and two thin right-side bands.

FIG. #54 shows a dual (analog and electronic) display watch with a dorsal band perimeter with connected thick symmetric "C" shapes on its right and left sides.

FIG. #55 shows a dual (analog and electronic) display watch with a dorsal band perimeter with connected thin symmetric "C" shapes on its right and left sides.

FIG. #56 shows a dual (analog and electronic) display watch with a dorsal band perimeter with separate symmetric "C" shapes on its right and left sides.

FIG. #57 shows a dual (analog and electronic) display watch with a dorsal band perimeter which looks like a laterally-oriented arch.

FIG. #58 shows a dual (analog and electronic) display watch with a dorsal band perimeter which looks like a laterally-oriented arch with a top stub.

FIG. #59 shows a dual (analog and electronic) display watch with a dorsal band perimeter which looks like two overlapping laterally-oriented arches.

FIG. #60 shows a dual (analog and electronic) display watch with a dorsal band perimeter which looks like asymmetric laterally-oriented arches.

FIG. #61 shows a dual (analog and electronic) display watch with two undulating bands which intersect on the dorsal left side.

FIG. #62 shows a dual (analog and electronic) display watch with dorsal proximal and distal sinusoidal bands which converge centrally.

FIG. #63 shows a dual (analog and electronic) display watch with dorsal proximal and distal sinusoidal bands which intersect on the left and right sides.

FIG. #64 shows a dual (analog and electronic) display watch with four pair-wise intersecting dorsal sinusoidal bands.

FIG. #65 shows a dual (analog and electronic) display watch with a serpentine dorsal band.

FIG. #66 shows a dual (analog and electronic) display watch with two intersecting serpentine dorsal bands.

FIG. #67 shows a dual (analog and electronic) display watch with a band that looks like a drain trap and is really quite ugly.

FIG. #68 shows a dual (analog and electronic) display watch with a dorsal band perimeter that looks like two symmetric whale tails.

FIG. #69 shows a dual (analog and electronic) display watch with helical proximal and distal bands.

FIG. #70 shows a dual (analog and electronic) display watch with single helical band.

FIG. #71 shows a dual (analog and electronic) display watch with a watch band which curves in different directions on left and right sides.

FIG. #72 shows a dual (analog and electronic) display watch with a watch band with a convex proximal edge and a concave distal edge.

FIG. #73 shows a dual (analog and electronic) display watch with a dorsal band perimeter with concave left and right sides.

FIG. #74 shows a dual (analog and electronic) display watch with a dorsal band perimeter with concave left and right sides.

FIG. #75 shows a dual (analog and electronic) display watch with a dorsal band perimeter with concave left and right sides.

DETAILED DESCRIPTION OF THE FIGURES

FIG. #1 shows an example of how this invention can be embodied in a smart watch with dual displays comprising: (a) a proximal display 102 which is worn on the dorsal half-circumference of a person's wrist or forearm 101 and has a centroid which is a first distance from the person's elbow; (b) a distal display 103 which is worn on the dorsal half-circumference of the person's wrist or forearm 101 and has a centroid which is a second distance from the person's elbow, wherein the second distance is greater than the first distance; and (c) a band 104 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter has a straight proximal side 105, a straight distal side 106, a concave (left-curved) right side 107, and a concave (right-curved) left side 108.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the dorsal band perimeter has a shape which looks like a concave lens, but with thick vertexes which connect to two bands which extend onto the ventral half-circumference of the person's wrist or forearm. In this example, the dorsal band perimeter has a shape which also looks like a rectangle with longitudinally-symmetric concave cut-outs from its right and left sides. In this example, the concave cut-outs are conic sections. In an alternative example, the proximal and distal edges of the dorsal band perimeter could be concave instead of straight. In an alternative example, the proximal and distal edges of the dorsal band perimeter could be convex instead of straight.

In this example, the proximal edge of the dorsal band perimeter is more proximal than the proximal edge of the proximal display and the distal edge of the dorsal band perimeter is more distal than the distal edge of the distal display. In this example, the left-most portion of the right edge of the dorsal band perimeter is farther right than the right edges of the displays and the right-most portion of the left edge of the dorsal band perimeter is farther left than the left edges of the displays. In this example, the proximal and distal portions of the dorsal band perimeter laterally span the entire dorsal half-circumference of the person's wrist or forearm, but the middle portion of the dorsal band perimeter laterally spans between 40% and 80% of the dorsal half-circumference.

In this example, a display has a circular shape. In an example, a display can have an oval, elliptical, or rounded-quadrilateral shape. In this example, proximal and distal displays are the same size. In this example, the centroids of proximal and distal displays are aligned along the same proximal-to-distal axis of the band.

The ventral half-circumference of the person's wrist or forearm is not shown in this figure, but the band can be assumed to extend onto the ventral half-circumference. In an example, the band can extend onto the ventral half-circumference in the form of two band segments which remain separate from each other on the ventral half-circumference. In an example, the band can extend onto the ventral half-circumference in the form of two band segments which merge together on the ventral half-circumference. In an example, the band can extend onto the ventral half-circumference in the form of one or more band segments with ends which attach to each other by one or more mechanisms selected from the group consisting of: buckle, clasp, clip, pin, hook, snap, and hook-and-eye fabric. In an example, the band can be flexible, stretchable, and/or expandable. Relevant example variations discussed in other places in this disclosure or in priority-linked disclosures can also be applied to this example.

FIG. #1 also shows some locational frameworks which are used herein. For example, FIG. #1 shows a proximal-to-distal axis which is used for locational reference herein. Proximal on a person's wrist or forearm is defined as being closer to (the centroid of) the person's elbow and distal on a person's wrist or forearm is defined as being farther from (the centroid of) the person's elbow. FIG. #1 also shows clock positions around the circumferences of displays which can be used for locational reference. The "12 o'clock position" on a display is defined herein as the most distal position on the circumference of that display. Other clock positions are also shown relative to this 12 o'clock position.

A watch face need not have this orientation. For example, a watch face on a display can be rotated 90-degrees in either direction, depending on whether it is worn on a person's right arm or left arm. The 12 o'clock position is defined as most distal for greater precision herein because it eliminates the uncertainty of whether the arm on which a watch is worn is the right arm or left arm.

The term "dorsal" is used herein with respect to a surface of a person's wrist or forearm comes from medical and anatomical applications. The dorsal surface is sometimes colloquially referred to as the "top" of a person's wrist or forearm, but this assumes that the person's hand is facing palm-down. The term "dorsal" is used herein for greater precision because it eliminates the uncertainty of whether the person's hand is facing palm down or palm up.

FIG. #2 shows an example of how this invention can be embodied in a smart watch with dual displays comprising: (a) a proximal display 202 which is worn on the dorsal half-circumference of a person's wrist or forearm 201 and has a centroid which is a first distance from the person's elbow; (b) a distal display 203 which is worn on the dorsal half-circumference of the person's wrist or forearm 201 and has a centroid which is a second distance from the person's elbow, wherein the second distance is greater than the first distance; and (c) a band 204 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter has a straight proximal side 205, a straight distal side 206, a concave (left-curved) right side 207 interrupted (or overlapped) by the displays, and a concave (right-curved) left side 208 interrupted (or overlapped) by the displays.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the dorsal band perimeter has a shape which looks like the cross-section of a metal "I-Beam." In this example, the dorsal band perimeter has a shape which also looks like a rectangle with longitudinally-symmetric concave cut-outs from its right and left sides, wherein the cut-outs are interrupted (or overlapped) by the displays. In this example, the concave cut-outs are conic sections. In an alternative example, the proximal and distal edges of the dorsal band perimeter could be concave instead of straight. In an alternative example, the proximal and distal edges of the dorsal band perimeter could be convex instead of straight.

In this example, the proximal edge of the dorsal band perimeter is more proximal than the proximal edge of the proximal display and the distal edge of the dorsal band perimeter is more distal than the distal edge of the distal display. In this example, the left-most portion of the right edge of the dorsal band perimeter is farther left than the right edges of the displays and the right-most portion of the left edge of the dorsal band perimeter is farther right than the left edges of the displays. In this example, the proximal and distal portions of the dorsal band perimeter laterally span the entire dorsal half-circumference of the person's wrist or forearm, but the middle portion of the dorsal band perimeter laterally spans between 10% and 50% of the dorsal half-circumference. Relevant example variations discussed in other places in this disclosure or in priority-linked disclosures can also be applied to this example.

FIG. #3 shows an example of how this invention can be embodied in a smart watch with dual displays comprising: (a) a proximal display 302 which is worn on the dorsal half-circumference of a person's wrist or forearm 301 and has a centroid which is a first distance from the person's elbow; (b) a distal display 303 which is worn on the dorsal half-circumference of the person's wrist or forearm 301 and has a centroid which is a second distance from the person's elbow, wherein the second distance is greater than the first distance; and (c) a band 304 which holds the proximal and distal displays; wherein the dorsal band perimeter is the perimeter of the portion of the band which spans the dorsal half-circumference of the person's wrist or forearm as seen from a top-down perspective (e.g. perpendicular to the center of the dorsal half-circumference); wherein the dorsal band perimeter has a straight proximal side 305, a straight distal side 306, a concave (left-curved) right side 307 interrupted (or overlapped) by the displays, and a concave (right-curved) left side 308 interrupted (or overlapped) by the displays; and wherein there is at least one hole 309 in the portion of the band which spans the dorsal half-circumference of the person's wrist or forearm.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the dorsal band perimeter has a shape which looks like a concave lens, but with thick vertexes which connect to two bands which extend onto the ventral half-circumference of the person's wrist or forearm. In this example, the dorsal band perimeter has a shape which also looks like a rectangle with longitudinally-symmetric concave cut-outs from its right and left sides. In this example, the concave cut-outs are conic sections. In an alternative example, the proximal and distal edges of the dorsal band perimeter could be concave instead of straight. In an alternative example, the proximal and distal edges of the dorsal band perimeter could be convex instead of straight. In an example, the at least one hole in the band can be centrally located between the displays.

In this example, the proximal edge of the dorsal band perimeter is more proximal than the proximal edge of the proximal display and the distal edge of the dorsal band perimeter is more distal than the distal edge of the distal display. In this example, the left-most portion of the right edge of the dorsal band perimeter is farther left than the right edges of the displays and the right-most portion of the left edge of the dorsal band perimeter is farther right than the left edges of the displays. In this example, the proximal and distal portions of the dorsal band perimeter laterally spans the entire dorsal half-circumference of the person's wrist or forearm, but the middle portion of the dorsal band perimeter laterally spans between 10% and 50% of the dorsal half-circumference. Relevant example variations discussed in other places in this disclosure or in priority-linked disclosures can also be applied to this example.

FIG. #4 shows an example of how this invention can be embodied in a smart watch with dual displays comprising: (a) a proximal display 402 which is worn on the dorsal half-circumference of a person's wrist or forearm 401 and has a centroid which is a first distance from the person's elbow; (b) a distal display 403 which is worn on the dorsal half-circumference of the person's wrist or forearm 401 and has a centroid which is a second distance from the person's elbow, wherein the second distance is greater than the first distance; and (c) a band 404 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter is shaped like a circle (or ellipse).

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the dorsal band perimeter is shaped like a circle (or ellipse) wherein a portion of its right side appears to be "sliced off" (along a right-side proximal-to-distal line) and a portion of its left side appears to be "sliced off" (along a left-side proximal-to-distal line). Please remember that the dorsal band perimeter is defined as the perimeter of the band on the dorsal half-circumference as seen from a perpendicular top-down perspective. The right and left sides of the circle (or ellipse) may actually extend around onto the ventral half-circumference of the person's wrist or forearm, but appear to be "sliced off" because they are not visible from this top-down perspective. In this example, the right-side proximal-to-distal line of the apparent "slicing" is parallel to the left-side proximal-to-distal line of the apparent "slicing."

In this example, the dorsal band perimeter has a convex proximal edge 405, a convex distal edge 406, a straight right edge 407, and a straight left edge 408. In this example, the middle portion of the dorsal band perimeter laterally spans the entire dorsal half-circumference of the person's wrist or forearm, but the proximal and distal portions of the dorsal band perimeter do not span the entire dorsal half-circumference. Relevant example variations discussed in other places in this disclosure or in priority-linked disclosures can also be applied to this example.

FIG. #5 shows an example of how this invention can be embodied in a smart watch with dual displays comprising: (a) a proximal display 502 which is worn on the dorsal half-circumference of a person's wrist or forearm 501 and has a centroid which is a first distance from the person's elbow; (b) a distal display 503 which is worn on the dorsal half-circumference of the person's wrist or forearm 501 and has a centroid which is a second distance from the person's elbow, wherein the second distance is greater than the first distance; and (c) a band 504 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter is shaped like a proximal-to-dorsal ring which is interrupted (or overlapped) by the displays.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the dorsal band perimeter is shaped like a proximal-to-dorsal ring wherein a portion of its right side appears to be "sliced off" (along a right-side proximal-to-distal line) and a portion of its left side appears to be "sliced off" (along a left-side proximal-to-distal line). Please remember that the dorsal band perimeter is defined as the perimeter of the band on the dorsal half-circumference as seen from a perpendicular top-down perspective. The right and left sides of the ring may actually extend around onto the ventral half-circumference of the person's wrist or forearm, but appear to be "sliced off" because they are not visible from this top-down perspective. In this example, the right-side proximal-to-distal line of the apparent "slicing" is parallel to the left-side proximal-to-distal line of the apparent "slicing."

In this example, the dorsal band perimeter has a convex proximal side 505, a convex distal side 506, a straight right side 507, and a straight left side 508. In this example, the proximal display connects to (or overlaps) the ring between the 2 o'clock and 10 o'clock positions on the display's circumference and the distal display connects to (or overlaps) the ring between the 8 o'clock and 4 o'clock positions on the display's circumference. In this example, the middle portion of the dorsal band perimeter laterally spans the entire dorsal half-circumference of the person's wrist or forearm, but the proximal and distal portions of the dorsal band perimeter do not span the entire dorsal half-circumference. Relevant example variations discussed in other places in this disclosure or in priority-linked disclosures can also be applied to this example.

FIG. #6 shows an example of how this invention can be embodied in a smart watch with dual displays comprising: (a) a proximal display 602 which is worn on the dorsal half-circumference of a person's wrist or forearm 601 and has a centroid which is a first distance from the person's elbow; (b) a distal display 603 which is worn on the dorsal half-circumference of the person's wrist or forearm 601 and has a centroid which is a second distance from the person's elbow, wherein the second distance is greater than the first distance; and (c) a band 604 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter is shaped like a bull's eye target which is interrupted (or overlapped) by the displays.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the dorsal band perimeter is shaped like bull's eye target comprising an outer ring and an inner circle. In this example, a portion of the right side of the outer ring appears to be "sliced off" (along a right-side proximal-to-distal line) and a portion of the left side of the outer rings appears to be "sliced off" (along a left-side proximal-to-distal line). Please remember that the dorsal band perimeter is defined as the perimeter of the band on the dorsal half-circumference as seen from a perpendicular top-down perspective. The right and left sides of the outer ring may actually extend around onto the ventral half-circumference of the person's wrist or forearm, but appear to be "sliced off" because they are not visible from this top-down perspective. In this example, the right-side proximal-to-distal line of the apparent "slicing" is parallel to the left-side proximal-to-distal line of the apparent "slicing."

In this example, the dorsal band perimeter has a convex proximal side 605, a convex distal side 606, a straight right side 607, and a straight left side 608. In this example, the proximal display connects to (or overlaps) the ring between the 2 o'clock and 10 o'clock positions on the display's circumference and the distal display connects to (or overlaps) the ring between the 8 o'clock and 4 o'clock positions on the display's circumference. In this example, the proximal display connects to (or overlaps) the inner circle between the 4 o'clock and 8 o'clock positions on the display's circumference and the distal display connects to (or overlaps) the inner circle between the 10 o'clock and 2 o'clock positions on the display's circumference. In this example, the middle portion of the outer ring laterally spans the entire dorsal half-circumference of the person's wrist or forearm, but the proximal and distal portions of the outer ring do not span the entire dorsal half-circumference. Relevant example variations discussed in other places in this disclosure or in priority-linked disclosures can also be applied to this example.

FIG. #7 shows an example of how this invention can be embodied in a smart watch with dual displays comprising: (a) a proximal display 702 which is worn on the dorsal half-circumference of a person's wrist or forearm 701 and has a centroid which is a first distance from the person's elbow; (b) a distal display 703 which is worn on the dorsal half-circumference of the person's wrist or forearm 701 and has a centroid which is a second distance from the person's elbow, wherein the second distance is greater than the first distance; and (c) a proximal band 704 which spans the dorsal half-circumference of the person's wrist or forearm, wherein the proximal band is worn at a third average distance from the person's elbow, wherein the proximal band holds the proximal display, and wherein the proximal side of the proximal band is convex (i.e. curved in a proximal direction) as it spans the dorsal half-circumference of the person's wrist or fore arm; and (d) a distal band 705 which spans the dorsal half-circumference of the person's wrist or forearm, wherein the distal band is worn at a fourth average distance from the person's elbow, wherein the fourth distance is greater than the third distance, wherein the distal band holds the distal display, and wherein the distal side of the distal band is convex (i.e. curved in a distal direction) as it spans the dorsal half-circumference of the person's wrist or fore arm.

In an example, the proximal display and the distal display can be selected from the group consisting of: electronic display, computer display, digital display, and electronic touch screen. In an example, the proximal display and/or the distal display can display information selected from the group consisting of: the time; notifications or messages;

steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, the right side of the proximal display can connect to (or overlap) the (right side segment of the) proximal band clockwise between the 12 o'clock and 6 o'clock positions on the display's circumference and the left right side of the proximal display can connect to (or overlap) the (left side segment of the) proximal band clockwise between the 6 o'clock and 12 o'clock positions on the display's circumference. In an example, the right side of the distal display can connect to (or overlap) the (right side segment of the) distal band clockwise between the 12 o'clock and 6 o'clock positions on the display's circumference and the left right side of the distal display can connect to (or overlap) the (left side segment of the) distal band clockwise between the 6 o'clock and 12 o'clock positions on the display's circumference.

In an example, the right side of the proximal display can connect to (or overlap) the (right side segment of the) proximal band clockwise between the 1 o'clock and 5 o'clock positions on the display's circumference and the left right side of the proximal display can connect to (or overlap) the (left side segment of the) proximal band clockwise between the 7 o'clock and 11 o'clock positions on the display's circumference. In an example, the right side of the distal display can connect to (or overlap) the (right side segment of the) distal band clockwise between the 1 o'clock and 5 o'clock positions on the display's circumference and the left right side of the distal display can connect to (or overlap) the (left side segment of the) distal band clockwise between the 7 o'clock and 11 o'clock positions on the display's circumference. In an example, the 12 o'clock position can be defined as the most distal position on a display.

In an example, proximal and distal bands can remain separate around the entire circumference of a person's wrist or forearm. In an example, proximal and distal bands can merge on the right and/or left sides of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #8 shows an example of how this invention can be embodied in a smart watch with dual displays comprising: (a) a proximal display 802 which is worn on the dorsal half-circumference of a person's wrist or forearm 801 and has a centroid which is a first distance from the person's elbow; (b) a distal display 803 which is worn on the dorsal half-circumference of the person's wrist or forearm 801 and has a centroid which is a second distance from the person's elbow, wherein the second distance is greater than the first distance; and (c) a band which further comprises: a right proximal-to-distal partial ring portion 804 which is connected to the right sides of the proximal and distal displays, a left proximal-to-distal partial ring portion 805 which is connected to the left sides of the proximal and distal displays, a right lateral band segment 806 which is connected to the right side of the right proximal-to-distal partial ring portion, and a left lateral band segment 807 which is connected to the left side of the left proximal-to-distal partial ring portion.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, the right side of the proximal display can connect to (or overlap) the right proximal-to-distal ring portion of the band clockwise between the 12 o'clock and 6 o'clock positions or between the 1 o'clock and 5 o'clock positions of the display's circumference. In an example, the right side of the distal display can connect to (or overlap) the right proximal-to-distal ring portion of the band clockwise between the 12 o'clock and 6 o'clock positions or between the 1 o'clock and 5 o'clock positions of the display's circumference.

In an example, the left side of the proximal display can connect to (or overlap) the left proximal-to-distal ring portion of the band clockwise between the 6 o'clock and 12 o'clock positions or between the 7 o'clock and 11 o'clock positions of the display's circumference. In an example, the left side of the distal display can connect to (or overlap) the left proximal-to-distal ring portion of the band clockwise between the 6 o'clock and 12 o'clock positions or between the 7 o'clock and 11 o'clock positions of the display's circumference. Relevant example variations discussed in other places in this disclosure or in priority-linked disclosures can also be applied to this example.

FIG. #9 shows an example of how this invention can be embodied in a smart watch with dual displays comprising: (a) a proximal display 902 which is worn on the dorsal half-circumference of a person's wrist or forearm 901 and has a centroid which is a first distance from the person's elbow; (b) a distal display 903 which is worn on the dorsal half-circumference of the person's wrist or forearm 901 and has a centroid which is a second distance from the person's elbow, wherein the second distance is greater than the first distance; and (c) a band 904 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter has an undulating proximal edge 905, an undulating distal edge 906, a straight right edge 907, and a straight left edge 908.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the middle portion of the dorsal band perimeter laterally spans the entire dorsal half-circumference of the person's wrist or forearm, but the proximal and distal portions of the dorsal band perimeter do not span the entire dorsal half-circumference. In an example, the band can have a greatest proximal-to-distal length along an axis which includes the centroids of the proximal and distal displays. In this example, the undulating proximal edge is sinusoidal, the undulating distal edge is sinusoidal, and the proximal and distal edges are symmetrically reflected around a central right-to-left axis of the band. In this example, the undulating proximal edge is sinusoidal, the undulating distal edge is sinusoidal, and the sinusoidal curves of the proximal and distal edges are 180-degrees out-of-phase with each other. In an example, there can be one or more holes in the band. In an example, there can be one hole to the right of an axis connecting the centroids of the displays and one hole to the left of this axis. Relevant example variations discussed in other places in this disclosure or in priority-linked disclosures can also be applied to this example.

FIG. #10 shows an example of how this invention can be embodied in a smart watch with dual displays comprising: (a) a proximal display 1002 which is worn on the dorsal half-circumference of a person's wrist or forearm 1001 and has a centroid which is a first distance from the person's elbow; (b) a distal display 1003 which is worn on the dorsal half-circumference of the person's wrist or forearm 1001 and has a centroid which is a second distance from the person's elbow, wherein the second distance is greater than the first distance; and (c) a band 1004 which holds the proximal and distal displays; wherein the dorsal band perimeter is the perimeter of the portion of the band which spans the dorsal half-circumference of the person's wrist or forearm as seen from a top-down perspective (e.g. perpendicular to the center of the dorsal half-circumference); wherein the dorsal band perimeter has an undulating proximal edge 1005, an undulating distal edge 1006, a straight right edge 1007, and a straight left edge 1008; and wherein there is at least one hole 1009 in the portion of the band which spans the dorsal half-circumference of the person's wrist or forearm.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, undulating proximal and distal edges are sinusoidal. In this example, undulating proximal and distal edges are symmetrically reflected around a central right-to-left axis of the band. In this example, sinusoidal undulations of the proximal and distal edges are 180-degrees out-of-phase with each other. In this example, there is an elliptical hole (interrupted or overlapped by the displays) in the center of the dorsal portion of the band. If one subtracts from the elliptical hole the area which is overlapped by the displays, then this separates the elliptical hole into two (right side and left side) holes which are each shaped like a gingko tree leaf. Relevant example variations discussed in other places in this disclosure or in priority-linked disclosures can also be applied to this example.

FIG. #11 shows an example of how this invention can be embodied in a smart watch with dual displays comprising: (a) a proximal display 1102 which is worn on the dorsal half-circumference of a person's wrist or forearm 1101 and has a centroid which is a first distance from the person's elbow; (b) a distal display 1103 which is worn on the dorsal half-circumference of the person's wrist or forearm 1101 and has a centroid which is a second distance from the person's elbow, wherein the second distance is greater than the first distance; and (c) a band 1104 which holds the proximal and distal displays; wherein the dorsal band perimeter is the perimeter of the portion of the band which spans the dorsal half-circumference of the person's wrist or forearm as seen from a top-down perspective (e.g. perpendicular to the center of the dorsal half-circumference); wherein the dorsal band perimeter has an undulating proximal edge 1105, an undulating distal edge 1106, a straight right edge 1107, and a straight left edge 1108; wherein there is an arcuate hole 1109 in the portion of the band which spans the dorsal half-circumference of the person's wrist or forearm; and wherein there is an arcuate band segment 1110 within the arcuate hole which connects the proximal and distal displays.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the undulating proximal and distal edges are sinusoidal. In this example, the undulating proximal and distal edges are symmetrically reflected around a central right-to-left axis of the band. In this example, sinusoidal undulations of the proximal and distal edges are 180-degrees out-of-phase with each other. In this example, the arcuate hole is circular or elliptical shaped (as interrupted or overlapped by the displays). In this example, the arcuate hole and the arcuate band segment within this hole are nested and concentric. In an example, the band segment within the arcuate hole can be rectangular instead of arcuate. Relevant example variations discussed in other places in this disclosure or in priority-linked disclosures can also be applied to this example.

FIG. #12 shows an example of how this invention can be embodied in a smart watch with dual displays comprising: (a) a proximal display 1202 which is worn on the dorsal half-circumference of a person's wrist or forearm 1201 and has a centroid which is a first distance from the person's elbow; (b) a distal display 1203 which is worn on the dorsal half-circumference of the person's wrist or forearm 1201 and has a centroid which is a second distance from the person's elbow, wherein the second distance is greater than the first distance; and (c) a band 1204 which holds the proximal and distal displays; wherein the dorsal band perimeter is the perimeter of the portion of the band which spans the dorsal half-circumference of the person's wrist or forearm as seen from a top-down perspective (e.g. perpendicular to the center of the dorsal half-circumference); wherein the dorsal band perimeter has an undulating proximal edge 1205, an undulating distal edge 1206, a straight right edge 1207, and a straight left edge 1208; wherein there is a hole 1209 with multiple vertexes which is located in the portion of the band which spans the dorsal half-circumference of the person's wrist or forearm.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the undulating proximal and distal edges of the dorsal band perimeter are sinusoidal. In this example, the undulating proximal and distal edges are symmetrically reflected around a central right-to-left axis of the band. In this example, sinusoidal undulations of the proximal and distal edges are 180-degrees out-of-phase with each other. In this example, there are right side and left side holes in the distal portion of the band, wherein each of these holes has at least three vertexes. Relevant example variations discussed in other places in this disclosure or in priority-linked disclosures can also be applied to this example.

FIG. #13 shows an example of how this invention can be embodied in a smart watch with dual displays comprising: (a) a proximal display 1302 which is worn on the dorsal half-circumference of a person's wrist or forearm 1301 and has a centroid which is a first distance from the person's elbow; (b) a distal display 1303 which is worn on the dorsal half-circumference of the person's wrist or forearm 1301 and has a centroid which is a second distance from the person's elbow, wherein the second distance is greater than the first distance; and (c) a bifurcating band, wherein the dorsal part of the bifurcating band is the part of the bifurcating band which spans the dorsal half-circumference of the person's wrist or forearm, as seen from a top-down perspective; wherein the dorsal part further comprises a right-side segment 1304 whose right portion is a single band and whose left portion bifurcates and attaches to the right sides of the displays; and wherein the dorsal part further comprises a left-side segment 1305 whose left portion is a single band and whose right portion bifurcates and attaches to the left sides of the displays.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, the right-side segment attaches to the proximal display between the 1 o'clock and 5 o'clock locations on the display's circumference and attaches to the distal display between the 1 o'clock and 5 o'clock locations on the display's circumference. In an example, the left-side segment attaches to the proximal display between the 7 o'clock and 11 o'clock locations on the display's circumference and attaches to the distal display between the 7 o'clock and 11 o'clock locations on the display's circumference. In an example, a right-side and/or left-side segment can have a shape selected from the group consisting of: mathematical "less than" sign; leftward-opening chevron; mathematical "greater than" sign; rightward-opening chevron; text bracket; and whale tale. In an example, a gap between the band and the displays can have a shape selected from the group consisting of: diamond shape, kite shape, Eagle Ray shape, gingko leaf shape, and Pittsburgh Steelers star shape. Relevant example variations discussed in other places in this disclosure or in priority-linked disclosures can also be applied to this example.

FIG. #14 shows an example of how this invention can be embodied in a smart watch with dual displays comprising: (a) a proximal display 1402 which is worn on the dorsal half-circumference of a person's wrist or forearm 1401 and has a centroid which is a first distance from the person's elbow; (b) a distal display 1403 which is worn on the dorsal half-circumference of the person's wrist or forearm 1401 and has a centroid which is a second distance from the person's elbow, wherein the second distance is greater than the first distance; and (c) a bifurcating band, wherein the dorsal part of the bifurcating band is the part of the bifurcating band which spans the dorsal half-circumference of the person's wrist or forearm, as seen from a top-down perspective; wherein the dorsal part further comprises a right-side segment 1404 whose right portion is a single band and whose left portion bifurcates and attaches to the displays; and wherein the dorsal part further comprises a left-side segment 1405 whose left portion is a single band and whose right portion bifurcates and attaches to the displays.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, the right-side segment attaches to the proximal display between the 2 o'clock and 6 o'clock locations on the display's circumference and attaches to the distal display between the 12 o'clock and 4 o'clock locations on the display's circumference. In an example, the left-side segment attaches to the proximal display between the 6 o'clock and 10 o'clock locations on the display's circumference and attaches to the distal display between the 8 o'clock and 12 o'clock locations on the display's circumference. In an example, a right-side and/or left-side segment can have a shape selected from the group consisting of: mathematical "less than" sign; leftward-opening chevron; mathematical "greater than" sign; rightward-opening chevron; text bracket; and whale tale. In an example, a gap between the band and the displays can have a shape selected from the group consisting of: diamond shape, kite shape, Eagle Ray shape, gingko leaf shape, and Pittsburgh Steelers star shape. Relevant example variations discussed in other places in this disclosure or in priority-linked disclosures can also be applied to this example.

FIG. #15 shows an example of how this invention can be embodied in a smart watch with dual displays comprising: (a) a proximal display 1502 which is worn on the dorsal half-circumference of a person's wrist or forearm 1501 and has a centroid which is a first distance from the person's elbow; (b) a distal display 1503 which is worn on the dorsal half-circumference of the person's wrist or forearm 1501 and has a centroid which is a second distance from the person's elbow, wherein the second distance is greater than the first distance; and (c) a band which holds the proximal and distal displays, wherein the dorsal band perimeter is the perimeter of the portion of the band which spans the dorsal half-circumference of the person's wrist or forearm, as seen from a top-down perspective, wherein the right half 1504 of the dorsal band perimeter is concave and the left half 1505 of the dorsal band perimeter is convex. In an alternative example, the right half can be convex and the left half can be concave. If you rotate the watch 90-degrees, it looks like Greedo.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group. Relevant example variations discussed in other places in this disclosure or in priority-linked disclosures can also be applied to this example.

FIG. #16 shows an example of how this invention can be embodied in a smart watch with dual displays comprising: (a) a proximal display 1602 which is worn on the dorsal half-circumference of a person's wrist or forearm 1601 and has a centroid which is a first distance from the person's elbow; (b) a distal display 1603 which is worn on the dorsal half-circumference of the person's wrist or forearm 1601 and has a centroid which is a second distance from the person's elbow, wherein the second distance is greater than the first distance; and (c) a proximal left-side band 1605, wherein the proximal left-side band spans the left side of the dorsal half-circumference of the person's wrist or forearm and is attached to the left side of the proximal display; (d) a distal left-side band 1606, wherein the distal left-side band spans the left side of the dorsal half-circumference of the person's wrist or forearm and is attached to the left side of the distal display, and wherein there is a gap between the proximal left-side band and the distal left-side band; and (e) a right-side band 1604, wherein the right-side band spans the right side of the dorsal half-circumference of the person's wrist or forearm and is attached to the right sides of the proximal and distal displays.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the proximal left-side band has a convex proximal edge and the distal left-side band has a convex distal edge. In this example, the right-side band has a concave shape. In an example, the right-side band can have a shape selected from the group consisting of: duck foot shape, Eagle Ray shape, and gingko leaf shape. In an example, right and left sides can be reversed from the above configuration. Relevant example variations discussed in other places in this disclosure or in priority-linked disclosures can also be applied to this example.

FIG. #17 shows an example of how this invention can be embodied in a smart watch with dual displays comprising: (a) a proximal display 1702 which is worn on the dorsal half-circumference of a person's wrist or forearm 1701 and has a centroid which is a first distance from the person's elbow; (b) a distal display 1703 which is worn on the dorsal half-circumference of the person's wrist or forearm 1701 and has a centroid which is a second distance from the person's elbow, wherein the second distance is greater than the first distance; and (c) a right-side proximal band 1704 which spans the right side of the dorsal half-circumference of the person's wrist or forearm, wherein the right-side proximal band is attached to the right side of the proximal display, and wherein the right-side proximal band has a first width; (d) a left-side proximal band 1706 which spans the left side of the dorsal half-circumference of the person's wrist or forearm, wherein the left-side proximal band is attached to the left side of the proximal display, wherein the left-side proximal band has a second width, and wherein the second width is greater than the first width; (e) a right-side distal band 1705 which spans the right side of the dorsal half-circumference of the person's wrist or forearm, wherein the right-side distal band is attached to the right side of the distal display, and wherein the right-side distal band has a third width; and (f) a left-side distal band 1707 which spans the left side of the dorsal half-circumference of the person's wrist or forearm, wherein the left-side distal band is attached to the left side of the distal display, wherein the left-side distal band has a fourth width, and wherein the fourth width is greater than the third width.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, proximal and distal bands can remain separate around the entire circumference of a person's wrist or forearm. In an example, proximal and distal bands can merge on the right and/or left sides of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #18 shows an example of how this invention can be embodied in a smart watch with dual displays comprising: (a) a proximal display 1802 which is worn on the dorsal half-circumference of a person's wrist or forearm 1801 and has a centroid which is a first distance from the person's elbow; (b) a distal display 1803 which is worn on the dorsal half-circumference of the person's wrist or forearm 1801 and has a centroid which is a second distance from the person's elbow, wherein the second distance is greater than the first distance; and (c) a band which holds the proximal display and the distal display on the person's wrist or forearm, wherein the dorsal portion of the band spans the dorsal half-circumference of the person's wrist or forearm, wherein the dorsal portion of the band further comprises a right-side "C" shape portion (which opens to the right) and a left-side reverse "C" shape portion (which opens to the left).

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, a "C" shape can be a longitudinal half perimeter of an oval, ellipse, or circle. In an example, a "C" shape can be a longitudinal three-quarters perimeter of an oval, ellipse, or circle. In an example, a "C" shape can comprise between 50% to 75% of the perimeter of an oval, ellipse, or circle. In this example, the left portion of the right-side "C" shape portion and the right portion of the left-side reverse "C" shape portion overlap. In this example, the right-side "C" shape portion and the left-side reverse "C" shape portion are two portions of a single continuous band. In an example, the right-side "C" shape portion and the left-side reverse "C" shape portion may not overlap. In an example, there can be a gap between the right-side "C" shape portion and the left-side reverse "C" shape portions. In an example, proximal and distal "C" arms can merge on the right and/or left sides of a person's wrist or forearm. In an example, proximal and distal "C" arms can merge on the ventral half-circumference of a person's wrist or forearm. Relevant example variations discussed in other places in this disclosure or in priority-linked disclosures can also be applied to this example.

FIG. #18 also shows an example of how this invention can be embodied in a smart watch with dual displays comprising: (a) a proximal display 1802 which is worn on the dorsal half-circumference of a person's wrist or forearm 1801 and has a centroid which is a first distance from the person's elbow; (b) a distal display 1803 which is worn on the dorsal half-circumference of the person's wrist or forearm 1801 and has a centroid which is a second distance from the person's elbow, wherein the second distance is greater than the first distance; and (c) a band which holds the proximal display and the distal display on the wrist or forearm, wherein the dorsal portion of the band spans the dorsal half-circumference of the person's wrist or forearm, wherein the dorsal portion of the band has a concave right half and a concave left half.

FIG. #18 also shows an example of how this invention can be embodied in a smart watch with dual displays comprising: (a) a proximal display 1802 which is worn on the dorsal half-circumference of a person's wrist or forearm 1801 and has a centroid which is a first distance from the person's elbow; (b) a distal display 1803 which is worn on the dorsal half-circumference of the person's wrist or forearm 1801 and has a centroid which is a second distance from the person's elbow, wherein the second distance is greater than the first distance; and (c) a band which holds the proximal display and the distal display on the wrist or forearm, wherein the dorsal portion of the band spans the dorsal half-circumference of the person's wrist or forearm, wherein the dorsal portion of the band has a half-oval (or half-ellipse) gap in its right half and half-oval (or half-ellipse) gap in its left half.

FIG. #19 shows an example of how this invention can be embodied in a smart watch with dual displays comprising: (a) a proximal display 1902, which is worn on the dorsal half-circumference of a person's wrist or forearm 1901; (b) a distal display 1903 which is worn on the dorsal half-circumference of the person's wrist or forearm 1901, wherein proximal means closer to the person's elbow and distal means farther from the person's elbow; and (c) a proximal right-side band 1904 which spans the right-side of the dorsal half-circumference of the person's wrist or forearm, which is attached to the right side of the proximal display, and whose proximal side is convex (i.e. curved in a proximal direction); (d) a proximal left-side band 1906 which spans the left-side of the dorsal half-circumference of the person's wrist or forearm, which is attached to the left side of the proximal display, and whose proximal side is convex (i.e. curved in a proximal direction); (e) a distal right-side band 1905 which spans the right-side of the dorsal half-circumference of the person's wrist or forearm, which is attached to the right side of the distal display, and whose distal side is convex (i.e. curved in a distal direction); (f) a distal left-side band 1907 which spans the left-side of the dorsal half-circumference of the person's wrist or forearm, which is attached to the left side of the distal display, and whose distal side is convex (i.e. curved in a distal direction); and (g) a central band 1908 which connects the proximal display and the distal display.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, proximal and distal bands can remain separate around the entire circumference of a person's wrist or forearm. In an example, proximal and distal bands can merge on the right and/or left sides of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #20 shows an example of how this invention can be embodied in a smart watch with dual displays comprising: (a) a proximal display 2002 which is worn on the dorsal half-circumference of a person's wrist or forearm 2001 and has a centroid which is a first distance from the person's elbow; (b) a distal display 2003 which is worn on the dorsal half-circumference of the person's wrist or forearm 2001 and has a centroid which is a second distance from the person's elbow, wherein the second distance is greater than the first distance; and (c) a right-side "C" shape band (which opens to the right) on the right half of the dorsal half-circumference of the person's wrist or forearm which is attached to the displays; and (d) a left-side reverse "C" shape band (which opens to the left) on the left half of the dorsal half-circumference of the person's wrist or forearm which is attached to the displays.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, a "C" shape can be a longitudinal half perimeter of an oval, ellipse, or circle. In an example, a "C" shape can be a longitudinal three-quarters perimeter of an oval, ellipse, or circle. In an example, a "C" shape can comprise between 50% to 75% of the perimeter of an oval, ellipse, or circle. In this example, the right-side "C" shape band and the left-side reverse "C" shape band do not overlap on the dorsal side of the person's wrist or forearm. In this example, there is a gap between the right-side "C" shape band and the left-side reverse "C" shape bands. In an example, proximal and distal bands and/or "C" arms can merge on the right and/or left sides of a person's wrist or forearm. In an example, proximal and distal bands and/or "C" arms can merge on the ventral half-circumference of a person's wrist or forearm. Relevant example variations discussed in other places in this disclosure or in priority-linked disclosures can also be applied to this example.

FIG. #21 shows an example of how this invention can be embodied in a smart watch with dual displays comprising: (a) a proximal display 2102 which is worn on the dorsal half-circumference of a person's wrist or forearm 2101; (b) a distal display 2103 which is worn on the dorsal half-circumference of the person's wrist or forearm 2101, wherein proximal means closer to the person's elbow and distal means farther from the person's elbow; and (c) a proximal left-side band 2105 on the left half of the dorsal half-circumference of the person's wrist or forearm, wherein this proximal left-side band is attached to the left side of the proximal display; (d) a distal left-side band 2106 on the left half of the dorsal half-circumference of the person's wrist or forearm, wherein this distal left-side band is attached to the left side of the distal display, and wherein there is a gap between the proximal left-side band and the distal left-side band; and (e) an arcuate right-side band 2104 on the right half of the dorsal half-circumference of the person's wrist or forearm, wherein the proximal end of this arcuate right-side band is attached to the right side of the proximal display and the distal end of this arcuate right-side band is attached to the right side of the distal display.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, an arcuate right-side band can have a conic section shape. In an example, an arcuate right-side band can be a section of a circle, ellipse, or oval. In an example, an arcuate right-side band can bifurcate from right to left. In an example, if one draws lines on the displays in order to virtually connect the (perimeters of the) proximal left-side band, the distal left-side band, and the arcuate right-side band—then their combined (perimeter) shape looks like an arch which has been rotated 90-degrees clockwise. In an example, proximal and distal left-side bands can merge on the side of a person's wrist or forearm. In an example, proximal and distal left-side bands can merge on the ventral half-circumference of a person's wrist or forearm. Relevant example variations discussed in other places in this disclosure or in priority-linked disclosures can also be applied to this example.

Expressing this example in other words, FIG. #21 shows a smart watch with dual displays comprising: (a) a proximal display 2102 which is worn on the dorsal half-circumference of a person's wrist or forearm 2101; (b) a distal display 2103 which is worn on the dorsal half-circumference of the person's wrist or forearm 2101, wherein proximal is closer to the person's elbow and distal is farther from the person's elbow; and (c) a proximal left-side band 2105 on the left half of the dorsal half-circumference of the person's wrist or forearm, wherein this proximal left-side band is attached to the left side of the proximal display; (d) a distal left-side band 2106 on the left half of the dorsal half-circumference of the person's wrist or forearm, wherein this distal left-side band is attached to the left side of the distal display, and wherein there is a gap between the proximal left-side band and the distal left-side band; and (e) a bifurcated right-side band 2104 on the right half of the dorsal half-circumference of the person's wrist or forearm, wherein the proximal end of this bifurcated right-side band is attached to the right side of the proximal display and the distal end of this bifurcated right-side band is attached to the right side of the distal display.

FIG. #22 shows an example of how this invention can be embodied in a smart watch with dual displays comprising: (a) a proximal display 2202 which is worn on the dorsal half-circumference of a person's wrist or forearm 2201; (b) a distal display 2203 which is worn on the dorsal half-circumference of the person's wrist or forearm 2201, wherein proximal means closer to the person's elbow and distal means farther from the person's elbow; and (c) a proximal right-side band 2204 on the right half of the dorsal half-circumference of the person's wrist or forearm, wherein this proximal right-side band is attached to the right side of the proximal display; (d) a distal right-side band 2205 on the right half of the dorsal half-circumference of the person's wrist or forearm, wherein this distal right-side band is attached to the right side of the distal display, and wherein there is a gap between the proximal right-side band and the distal right-side band; and (e) an arcuate left-side band 2206 with a central lateral portion (e.g. stub) 2207 on the left half of the dorsal half-circumference of the person's wrist or forearm, wherein the proximal end of this arcuate left-side band is attached to the left side of the proximal display, wherein the distal end of this arcuate left-side band is attached to the left side of the distal display, and wherein the arcuate left-side band converges, in a right-to-left direction, into a central lateral portion (e.g. stub) which extends around the side of the person's wrist or forearm.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, an arcuate right-side band can have a conic section shape with a left-extending central lateral portion (e.g. stub). In an example, an arcuate right-side band can be a section of a circle, ellipse, or oval with a left-extending central lateral portion (e.g. stub). Looking at this design another way, the dorsal portion of the band which holds the two displays looks like a left-to-right-oriented tuning fork. In an example, the configuration of this device can be reflected (exchanging left vs. right) across a central proximal-to-distal axis. In an example, proximal and distal bands can merge on the side of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #23 shows an example of how this invention can be embodied in a smart watch with dual displays comprising: (a) a proximal display 2302 which is worn on the dorsal half-circumference of a person's wrist or forearm 2301; (b) a distal display 2303 which is worn on the dorsal half-circumference of the person's wrist or forearm 2301, wherein proximal means closer to the person's elbow and distal means farther from the person's elbow; and (c) a proximal right-side band 2304 on the right half of the dorsal half-circumference of the person's wrist or forearm, wherein this proximal right-side band is attached to the right side of the proximal display; (d) a distal right-side band 2305 on the right half of the dorsal half-circumference of the person's wrist or forearm, wherein this distal right-side band is attached to the right side of the distal display; (e) a proximal left-side band 2306 on the left half of the dorsal half-circumference of the person's wrist or forearm, wherein this proximal left-side band is attached to the left side of the proximal display; (f) a distal left-side band 2307 on the left half of the dorsal half-circumference of the person's wrist or forearm, wherein this distal left-side band is attached to the left side of the distal display; (g) an arcuate right-side band 2308 on the right half of the dorsal half-circumference of the person's wrist or forearm which is attached to the proximal display and to the distal display; and (h) an arcuate left-side band 2309 on the right half of the dorsal half-circumference of the person's wrist or forearm which is attached to the proximal display and to the distal display.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, if you draw virtual lines over the displays to virtually connect the perimeters of the arcuate left-side band, arcuate right-side band, distal left-side band, distal right-side band, proximal left-side band, and proximal right-side band, then you get a shape which looks like two overlapping arches. Specifically, this resulting shape is what you get when you: take a first arch, create a second arch duplicate on top of the first arch, reflect the second arch across a central horizontal axis, and then rotate both arches 90-degrees. In this example, the overlapping or intersecting tops of the two arches form a central oval, elliptical, circular, or football shape. In an example, proximal and distal bands can merge on the side of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #24 shows an example of how this invention can be embodied in a smart watch with dual displays comprising: (a) a proximal display 2402 which is worn on the dorsal half-circumference of a person's wrist or forearm 2401; (b) a distal display 2403 which is worn on the dorsal half-circumference of the person's wrist or forearm 2401, wherein proximal means closer to the person's elbow and distal means farther from the person's elbow; and (c) a right-opening arch-shaped band 2404 which holds the proximal display and the distal display; and (d) a left-opening arch-shaped band 2405, where the right-opening arch-shaped band and the left-opening arch-shaped band intersect and/or overlap each other.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, the right-opening arch-shaped band spans portions of both the right and left sides of the dorsal half-circumference of a person's wrist or forearm, but the left-opening arch-shaped band only spans a portion of the left side of the dorsal half-circumference of the person's wrist or forearm. In an example, both the right-opening arch-shaped band and the left-opening arch-shaped band can span portions of both the right and left sides of the dorsal half-circumference of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #25 shows an example of how this invention can be embodied in a smart watch with dual displays comprising: (a) a proximal display 2502 which is worn on the dorsal half-circumference of a person's wrist or forearm 2501; (b) a distal display 2503 which is worn on the dorsal half-circumference of the person's wrist or forearm 2501, wherein proximal means closer to the person's elbow and distal means farther from the person's elbow; and (c) a right-side proximal arcuate band 2504 on the dorsal surface of the person's wrist and/or forearm which connects to the right side of the proximal display; (d) a right-side distal arcuate band 2505 on the dorsal surface of the person's wrist and/or forearm which connects to the right side of the distal display; and (e) two left-side bands (2506 and 2507) on the dorsal surface of the person's wrist and/or forearm, wherein the two left-side bands intersect and/or overlap each other and connect to the left sides of the proximal and distal displays.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

Expressing this design in a different way, FIG. #25 shows a smart watch with dual displays comprising: (a) a proximal display 2502 which is worn on the dorsal half-circumference of a person's wrist or forearm 2501; (b) a distal display 2503 which is worn on the dorsal half-circumference of the person's wrist or forearm 2501, wherein proximal means closer to the person's elbow and distal means farther from the person's elbow; and (c) a first sinusoidal band (comprising segments 2504 and 2507) which spans the dorsal half-circumference of the person's wrist and/or forearm and holds the proximal display in place; (d) a second sinusoidal band (comprising segments 2505 and 2506) which spans the dorsal half-circumference of the person's wrist and/or forearm and holds the distal display in place, wherein the first sinusoidal band and the second sinusoidal band intersect and/or overlap on the left side of the dorsal half-circumference of the person's wrist and/or forearm but not on the right side of the dorsal half-circumference of the person's wrist and/or forearm. Relevant example variations discussed in other places in this disclosure or in priority-linked disclosures can also be applied to this example.

FIG. #26 shows an example of how this invention can be embodied in a smart watch with dual displays comprising: (a) a proximal display 2602 which is worn on the dorsal half-circumference of a person's wrist or forearm 2601; (b) a distal display 2603 which is worn on the dorsal half-circumference of the person's wrist or forearm 2601, wherein proximal means closer to the person's elbow and distal means farther from the person's elbow; and (c) a proximal sinusoidal band 2604 which spans the dorsal half-circumference of the person's wrist and/or forearm, wherein a distal peak of the proximal sinusoidal band curves around the distal perimeter of the proximal display; and (d) a distal sinusoidal band 2605 which spans the dorsal half-circumference of the person's wrist and/or forearm, wherein a proximal valley of the distal sinusoidal band curves around the proximal perimeter of the distal display.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, the proximal sinusoidal band curves around the perimeter of the proximal display clockwise between the 8 o'clock and 4 o'clock positions on the circumference of the display. In an example, the proximal sinusoidal band curves around the perimeter of the proximal display clockwise between the 9 o'clock and 3 o'clock positions on the circumference of the display. In an example, the distal sinusoidal band curves around the perimeter of the distal display clockwise between the 2 o'clock and 10 o'clock positions on the circumference of the display. In an example, the distal sinusoidal band curves around the perimeter of the distal display clockwise between the 3 o'clock and 9 o'clock positions on the circumference of the display.

In an example, the most proximal portion of a proximal sinusoidal band is more proximal than the most proximal portion of a proximal display. In an example, the most distal portion of a distal sinusoidal band is more distal than the most distal portion of a distal display. In an example, the proximal sinusoidal band and the distal sinusoidal band can be symmetric to each other across a central right-to-left axis of the device. In an example, this design can look like a stylized version of a scarab (or other insect), but with only four legs instead of six. Relevant example variations discussed in other places in this disclosure or in priority-linked disclosures can also be applied to this example.

FIG. #27 shows an example of how this invention can be embodied in a smart watch with dual displays comprising: (a) a proximal display 2702 which is worn on the dorsal half-circumference of a person's wrist or forearm 2701; (b) a distal display 2703 which is worn on the dorsal half-circumference of the person's wrist or forearm 2701, wherein proximal means closer to the person's elbow and distal means farther from the person's elbow; and (c) a first right-side arcuate band 2704 which connects to the distal display; (d) a second right-side distal arcuate band 2705 which connects to the proximal display, wherein the first and second right-side arcuate bands intersect and/or overlap on the right side of the dorsal half-circumference of the person's wrist or forearm; (e) a first left-side arcuate band 2706 which connects to the distal display; and (f) a second left-side distal arcuate band 2707 which connects to the proximal display, wherein the first and second left-side arcuate bands intersect and/or overlap on the left side of the dorsal half-circumference of the person's wrist or forearm.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

Expressing this design in a different way, FIG. #27 shows a smart watch with dual displays comprising: (a) a proximal display 2702 which is worn on the dorsal half-circumference of a person's wrist or forearm 2701; (b) a distal display 2703 which is worn on the dorsal half-circumference of the person's wrist or forearm 2701, wherein proximal means closer to the person's elbow and distal means farther from the person's elbow; and (c) a first sinusoidal band (comprising segments 2704 and 2706) which spans the dorsal half-circumference of the person's wrist and/or forearm and holds the distal display in place; (d) a second sinusoidal band (comprising segments 2705 and 2707) which spans the dorsal half-circumference of the person's wrist and/or forearm and holds the proximal display in place, wherein the first sinusoidal band and the second sinusoidal band intersect and/or overlap each other on both the right and left sides of the dorsal half-circumference of the person's wrist and/or forearm.

Expressing this design in a different way, FIG. #27 shows a smart watch with dual displays comprising: (a) a proximal display 2702 which is worn on the dorsal half-circumference of a person's wrist or forearm 2701; (b) a distal display 2703 which is worn on the dorsal half-circumference of the person's wrist or forearm 2701, wherein proximal means closer to the person's elbow and distal means farther from the person's elbow; and (c) a first sinusoidal band (comprising segments 2704 and 2706) which spans the dorsal half-circumference of the person's wrist and/or forearm; and (d) a second sinusoidal band (comprising segments 2705 and 2707) which spans the dorsal half-circumference of the person's wrist and/or forearm, wherein the first and second sinusoidal bands are symmetric to each other across (e.g. that is, horizontally reflected across) a shared central longitudinal (e.g. right-to-left) axis.

Expressing this design in a different way, FIG. #27 shows a smart watch with dual displays comprising: (a) a proximal display 2702 which is worn on the dorsal half-circumference of a person's wrist or forearm 2701; (b) a distal display 2703 which is worn on the dorsal half-circumference of the person's wrist or forearm 2701, wherein proximal means closer to the person's elbow and distal means farther from the person's elbow; and (c) a first sinusoidal band (comprising segments 2704 and 2706) which spans the dorsal half-circumference of the person's wrist and/or forearm, wherein the distal display is attached to a peak of the first sinusoidal band; and (d) a second sinusoidal band (comprising segments 2705 and 2707) which spans the dorsal half-circumference of the person's wrist and/or forearm, wherein the proximal display is attached to a valley of the second sinusoidal band.

Expressing this design in a different way, FIG. #27 shows a smart watch with dual displays comprising: (a) a proximal display 2702 which is worn on the dorsal half-circumference of a person's wrist or forearm 2701; (b) a distal display 2703 which is worn on the dorsal half-circumference of the person's wrist or forearm 2701, wherein proximal means closer to the person's elbow and distal means farther from the person's elbow; and (c) a first undulating band (comprising segments 2704 and 2706) which spans the dorsal half-circumference of the person's wrist and/or forearm, wherein the distal display is attached to a distal undulation of the first undulating band; and (d) a second undulating band (comprising segments 2705 and 2707) which spans the dorsal half-circumference of the person's wrist and/or forearm, wherein the proximal display is attached to proximal undulation of the second undulating band. Relevant example variations discussed in other places in this disclosure or in priority-linked disclosures can also be applied to this example.

FIG. #28 shows an example of how this invention can be embodied in a smart watch with dual displays comprising: (a) a proximal display 2802 which is worn on the dorsal half-circumference of a person's wrist or forearm 2801; (b) a distal display 2803 which is worn on the dorsal half-circumference of the person's wrist or forearm 2801, wherein proximal means closer to the person's elbow and distal means farther from the person's elbow; and (c) a first sinusoidal band 2804 which spans the dorsal half-circumference of the person's wrist and/or forearm; (d) a second sinusoidal band 2805 which spans the dorsal half-circumference of the person's wrist and/or forearm; (e) a third sinusoidal band 2806 which spans the dorsal half-circumference of the person's wrist and/or forearm; and (f) a fourth sinusoidal band 2807 which spans the dorsal half-circumference of the person's wrist and/or forearm.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In this example, four sinusoidal bands hold the proximal and distal displays in place on the dorsal surface of a person's wrist or forearm. In this example, sinusoidal bands intersect and/or overlap each other on the dorsal surface of the person's wrist or forearm. In this example, the first and third sinusoidal bands are parallel to each other. In this example, the first and second sinusoidal bands are symmetric relative to each other (e.g. horizontally reflected relative to each other) across a right-to-left axis. Relevant example variations discussed in other places in this disclosure or in priority-linked disclosures can also be applied to this example.

FIG. #29 shows an example of how this invention can be embodied in a smart watch with dual displays comprising: (a) a proximal display 2902 which is worn on the dorsal half-circumference of a person's wrist or forearm 2901; (b) a distal display 2903 which is worn on the dorsal half-circumference of the person's wrist or forearm 2901, wherein proximal means closer to the person's elbow and distal means farther from the person's elbow; and (c) a serpentine band 2904, wherein this serpentine band holds the proximal and distal displays, and wherein this serpentine band when followed from right to left across the dorsal half-circumference of the person's wrist or forearm: enters the dorsal half-circumference in a proximally-to-distally-central position, then curves in a counter-clockwise manner around a distal portion of the perimeter of the distal display, then curves a in a counter-clockwise manner around a proximal portion of the distal display, then curves in a clockwise manner around a distal portion of the perimeter of the proximal display, then curves in a clockwise manner around a proximal portion of the perimeter of the proximal display, and then leaves the dorsal half-circumference in a proximally-to-distally-central position.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, a laterally-central portion of the serpentine band can have a letter "S" shape. In an example, the two displays can be located on (or within) the loops of the "S" shape. In an example, this design can be reversed with respect to its right-vs.-left orientation. In an example, this design can be reflected vertically across a central proximal-to-distal axis. Relevant example variations discussed in other places in this disclosure or in priority-linked disclosures can also be applied to this example.

FIG. #30 shows an example of how this invention can be embodied in a smart watch with dual displays comprising: (a) a proximal display 3002 which is worn on the dorsal half-circumference of a person's wrist or forearm 3001; (b) a distal display 3003 which is worn on the dorsal half-circumference of the person's wrist or forearm 3001, wherein proximal means closer to the person's elbow and distal means farther from the person's elbow; and (c) a first serpentine band 3004, wherein this first serpentine band holds the proximal and distal displays, and wherein this serpentine band when followed from right to left across the dorsal half-circumference of the person's wrist or forearm: curves in a counter-clockwise manner around a distal portion of the perimeter of the distal display, then curves a in a counter-clockwise manner around a proximal portion of the distal display, then curves in a clockwise manner around a distal portion of the perimeter of the proximal display, and then curves in a clockwise manner around a proximal portion of the perimeter of the proximal display; and (d) a second serpentine band 3005, wherein this second serpentine band is symmetric with respect to the first serpentine band, being reflected vertically from the first serpentine band across a central proximal-to-distal axis.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, a laterally-central portion of a serpentine band can have a letter "S" shape. In an example, the two displays can be located on (or within) the loops of the "S" shape. In an example, the two serpentine bands can overlap. In an example, the two serpentine bands can weave together. In an example, the two serpentine bands can be merged together. In an example, the second serpentine band when followed from right to left across the dorsal half-circumference of the person's wrist or forearm: curves in a clockwise manner around a proximal portion of the perimeter of the proximal display, then curves a in a clockwise manner around a distal portion of the proximal display, then curves in a counter-clockwise manner around a proximal portion of the perimeter of the distal display, and then curves in a counter-clockwise manner around a distal portion of the perimeter of the distal display. Relevant example variations discussed in other places in this disclosure or in priority-linked disclosures can also be applied to this example.

FIG. #31 shows an example of how this invention can be embodied in a smart watch with dual displays comprising: (a) a proximal display 3102 which is worn on the dorsal half-circumference of a person's wrist or forearm 3101; (b) a distal display 3103 which is worn on the dorsal half-circumference of the person's wrist or forearm 3101, wherein proximal means closer to the person's elbow and distal means farther from the person's elbow; and (c) an undulating band 3104, wherein this undulating band holds the proximal and distal displays, and wherein this undulating band when followed from right to left across the dorsal half-circumference of the person's wrist or forearm: enters the dorsal half-circumference in a proximally-to-distally-central position, then connects to the right side of the proximal display; then connects the distal side of the proximal display to the proximal side of the distal display; then connects to the left side of the distal display; and then leaves the dorsal half-circumference in a proximally-to-distally-central position. In an example, this is pretty ugly and will probably never see the light of day.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group. Relevant example variations discussed in other places in this disclosure or in priority-linked disclosures can also be applied to this example.

FIG. #32 shows an example of how this invention can be embodied in a smart watch with dual displays comprising: (a) a proximal display 3202 which is worn on the dorsal half-circumference of a person's wrist or forearm 3201; (b) a distal display 3203 which is worn on the dorsal half-circumference of the person's wrist or forearm 3201, wherein proximal means closer to the person's elbow and distal means farther from the person's elbow; and (c) a right-side bifurcated band 3204, wherein the proximal and distal ends of the bifurcated portion of this right-side bifurcated band connect to the proximal display and to the distal display, respectively; (d) a left-side bifurcated band 3205, wherein the proximal and distal ends of the bifurcated portion of this left-side bifurcated band connect to the proximal display and to the distal display, respectively; and (e) a central band 3206 which connects a distal portion of the perimeter of the proximal display with a proximal portion of the perimeter of the distal display.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group.

In an example, a right-side or left-side bifurcated bands can have a shape selected from the group consisting of: "whale tail" shape; "1" arcuate bracket shape; and sideways "Y" shape. In an example, right-side and left-side bifurcated bands can be symmetric relative to each other (e.g. vertically reflected across a central proximal-to-distal axis). Relevant example variations discussed in other places in this disclosure or in priority-linked disclosures can also be applied to this example.

FIG. #33 shows an example of how this invention can be embodied in a smart watch with dual displays comprising: (a) a proximal display 3302 which is worn on the dorsal half-circumference of a person's wrist or forearm 3301; (b) a distal display 3303 which is worn on the dorsal half-circumference of the person's wrist or forearm 3301, wherein proximal means closer to the person's elbow and distal means farther from the person's elbow; and (c) a proximal watch band 3304 attached to the proximal display, wherein this proximal watch band has a curve in a proximal direction to one side (e.g. right or left) of the proximal display and a curve in a distal direction to the other side (e.g. left or right) of the proximal display; and (d) a distal watch band 3305 attached to the distal display, wherein this distal watch band has a curve in a proximal direction to one side (e.g. right or left) of the distal display and a curve in a distal direction to the other side (e.g. left or right) of the distal display. In an example, the proximal and distal watch bands can merge and/or be connected to each other on the sides or ventral half-circumference of the person's wrist or forearm.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group. Relevant example variations discussed in other places in this disclosure or in priority-linked disclosures can also be applied to this example.

FIG. #34 shows an example of how this invention can be embodied in a smart watch with dual displays comprising: (a) a proximal display 3402 which is worn on the dorsal half-circumference of a person's wrist or forearm 3401; (b) a distal display 3403 which is worn on the dorsal half-circumference of the person's wrist or forearm 3401, wherein proximal means closer to the person's elbow and distal means farther from the person's elbow; and (c) a helical watch band 3404 which is attached to the left side of the proximal display and to the right side of the distal display. In this example, the displays are located on ends of the helical watch band. In this example, the helical watch band is attached to the right side of the proximal display and to the left side of the distal display. In this example, the helical watch band comprise a helix with a single loop. In an example, a helical watch band can comprise a helix with multiple loops.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group. Relevant example variations discussed in other places in this disclosure or in priority-linked disclosures can also be applied to this example.

FIG. #35 shows an example of how this invention can be embodied in a smart watch with dual displays comprising: (a) a proximal display 3502 which is worn on the dorsal half-circumference of a person's wrist or forearm 3501; (b) a distal display 3503 which is worn on the dorsal half-circumference of the person's wrist or forearm 3501, wherein proximal means closer to the person's elbow and distal means farther from the person's elbow; and (c) a watch band 3504 which curves in a proximal direction on one side (e.g. right or left) relative to the displays and curves in a distal direction on the other side (e.g. left or right) relative to the displays. In an example, the watch band can be reflected around a central proximal-to-distal axis, changing the relative positions of right vs. left in the design.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group. Relevant example variations discussed in other places in this disclosure or in priority-linked disclosures can also be applied to this example.

FIG. #36 shows an example of how this invention can be embodied in a smart watch with dual displays comprising: (a) a proximal display 3602 which is worn on the dorsal half-circumference of a person's wrist or forearm 3601; (b) a distal display 3603 which is worn on the dorsal half-circumference of the person's wrist or forearm 3601, wherein proximal means closer to the person's elbow and distal means farther from the person's elbow; and (c) an arcuate watch band 3604 with a convex proximal edge and a concave distal edge. In another example, the arcuate watch band can have a concave distal edge and a concave proximal edge.

In an example, the proximal display and the distal display can be selected from the group consisting of: electronic display, computer display, digital display, and electronic touch screen. In an example, the proximal display and/or the distal display can display information selected from the group consisting of: the time; notifications or messages; steps, heart rate, blood pressure, glucose level, or other biometric information; temperature, weather, location, directions, or other environmental information; and pictures, icons, or other digital images. In an example, the proximal display and the distal display can display different types of information selected from this group. Relevant example variations discussed in other places in this disclosure or in priority-linked disclosures can also be applied to this example.

FIG. #37 shows an example of how this invention can be embodied in a smart watch with dual displays comprising: (a) a proximal display 3702 which is worn on the dorsal half-circumference of a person's wrist or forearm 3701 and has a centroid which is a first distance from the person's elbow; (b) a distal display 3703 which is worn on the dorsal half-circumference of the person's wrist or forearm 3701 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 3704 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter has a straight proximal side 3705, a straight distal side 3706, a concave (left-curved) right side 3707, and a concave (right-curved) left side 3708.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. For example, the orientation of the analog and electronic displays can be rotated 90-degrees in either direction. In an example, the relative proximal and distal locations of the analog and electronic displays can be switched.

In this example, the dorsal band perimeter has a shape which looks like a concave lens, but with thick vertexes which connect to two bands which extend onto the ventral half-circumference of the person's wrist or forearm. In this example, the dorsal band perimeter has a shape which also looks like a rectangle with longitudinally-symmetric concave cut-outs from its right and left sides. In this example, the concave cut-outs are conic sections. In an alternative example, the proximal and distal edges of the dorsal band perimeter could be concave instead of straight. In an alternative example, the proximal and distal edges of the dorsal band perimeter could be convex instead of straight.

In this example, the proximal edge of the dorsal band perimeter is more proximal than the proximal edge of the proximal display and the distal edge of the dorsal band perimeter is more distal than the distal edge of the distal display. In this example, the left-most portion of the right edge of the dorsal band perimeter is farther right than the right edges of the displays and the right-most portion of the left edge of the dorsal band perimeter is farther left than the left edges of the displays. In this example, the proximal and distal portions of the dorsal band perimeter laterally span the entire dorsal half-circumference of the person's wrist or forearm, but the middle portion of the dorsal band perimeter laterally spans between 40% and 80% of the dorsal half-circumference.

In this example, a display has a circular shape. In an example, a display can have an oval, elliptical, or rounded-quadrilateral shape. In this example, proximal and distal displays are the same size. In this example, the centroids of proximal and distal displays are aligned along the same proximal-to-distal axis of the band.

The ventral half-circumference of the person's wrist or forearm is not shown in this figure, but the band can be assumed to extend onto the ventral half-circumference. In an example, the band can extend onto the ventral half-circumference in the form of two band segments which remain separate from each other on the ventral half-circumference. In an example, the band can extend onto the ventral half-circumference in the form of two band segments which merge together on the ventral half-circumference. In an example, the band can extend onto the ventral half-circumference in the form of one or more band segments with ends which attach to each other by one or more mechanisms selected from the group consisting of: buckle, clasp, clip, pin, hook, snap, and hook-and-eye fabric. In an example, the band can be flexible, stretchable, and/or expandable. Relevant example variations discussed in other places in this disclosure or in priority-linked disclosures can also be applied to this example.

FIG. #38 shows an example of how this invention can be embodied in a smart watch with dual displays comprising: (a) a proximal display 3802 which is worn on the dorsal half-circumference of a person's wrist or forearm 3801 and has a centroid which is a first distance from the person's elbow; (b) a distal display 3803 which is worn on the dorsal half-circumference of the person's wrist or forearm 3801 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 3804 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter has a straight proximal side 3805, a straight distal side 3806, a concave (left-curved) right side 3807 interrupted (or overlapped) by the displays, and a concave (right-curved) left side 3808 interrupted (or overlapped) by the displays.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, the dorsal band perimeter has a shape which looks like the cross-section of a metal "I-Beam." In this example, the dorsal band perimeter has a shape which also looks like a rectangle with longitudinally-symmetric concave cut-outs from its right and left sides, wherein the cut-outs are interrupted (or overlapped) by the displays. In this example, the concave cut-outs are conic sections. In an alternative example, the proximal and distal edges of the dorsal band perimeter could be concave instead of straight. In an alternative example, the proximal and distal edges of the dorsal band perimeter could be convex instead of straight.

In this example, the proximal edge of the dorsal band perimeter is more proximal than the proximal edge of the proximal display and the distal edge of the dorsal band perimeter is more distal than the distal edge of the distal display. In this example, the left-most portion of the right edge of the dorsal band perimeter is farther left than the right edges of the displays and the right-most portion of the left edge of the dorsal band perimeter is farther right than the left edges of the displays. In this example, the proximal and distal portions of the dorsal band perimeter laterally span the entire dorsal half-circumference of the person's wrist or forearm, but the middle portion of the dorsal band perimeter laterally spans between 10% and 50% of the dorsal half-circumference. Relevant example variations discussed in other places in this disclosure or in priority-linked disclosures can also be applied to this example.

FIG. #39 shows an example of how this invention can be embodied in a smart watch with dual displays comprising: (a) a proximal display 3902 which is worn on the dorsal half-circumference of a person's wrist or forearm 3901 and has a centroid which is a first distance from the person's elbow; (b) a distal display 3903 which is worn on the dorsal half-circumference of the person's wrist or forearm 3901 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 3904 which holds the proximal and distal displays; wherein the dorsal band perimeter is the perimeter of the portion of the band which spans the dorsal half-circumference of the person's wrist or forearm as seen from a top-down perspective (e.g. perpendicular to the center of the dorsal half-circumference); wherein the dorsal band perimeter has a straight proximal side 3905, a straight distal side 3906, a concave (left-curved) right side 3907 interrupted (or overlapped) by the displays, and a concave (right-curved) left side 3908 interrupted (or overlapped) by the displays; and wherein there is at least one hole 3909 in the portion of the band which spans the dorsal half-circumference of the person's wrist or forearm.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, the dorsal band perimeter has a shape which looks like a concave lens, but with thick vertexes which connect to two bands which extend onto the ventral half-circumference of the person's wrist or forearm. In this example, the dorsal band perimeter has a shape which also looks like a rectangle with longitudinally-symmetric concave cut-outs from its right and left sides. In this example, the concave cut-outs are conic sections. In an alternative example, the proximal and distal edges of the dorsal band perimeter could be concave instead of straight. In an alternative example, the proximal and distal edges of the dorsal band perimeter could be convex instead of straight. In an example, the at least one hole in the band can be centrally located between the displays.

In this example, the proximal edge of the dorsal band perimeter is more proximal than the proximal edge of the proximal display and the distal edge of the dorsal band perimeter is more distal than the distal edge of the distal display. In this example, the left-most portion of the right edge of the dorsal band perimeter is farther left than the right edges of the displays and the right-most portion of the left edge of the dorsal band perimeter is farther right than the left edges of the displays. In this example, the proximal and distal portions of the dorsal band perimeter laterally spans the entire dorsal half-circumference of the person's wrist or forearm, but the middle portion of the dorsal band perimeter laterally spans between 10% and 50% of the dorsal half-circumference. Relevant example variations discussed in other places in this disclosure or in priority-linked disclosures can also be applied to this example.

FIG. #40 shows an example of how this invention can be embodied in a smart watch with dual displays comprising: (a) a proximal display 4002 which is worn on the dorsal half-circumference of a person's wrist or forearm 4001 and has a centroid which is a first distance from the person's elbow; (b) a distal display 4003 which is worn on the dorsal half-circumference of the person's wrist or forearm 4001 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 4004 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter is shaped like a circle (or ellipse).

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, the dorsal band perimeter is shaped like a circle (or ellipse) wherein a portion of its right side appears to be "sliced off" (along a right-side proximal-to-distal line) and a portion of its left side appears to be "sliced off" (along a left-side proximal-to-distal line). Please remember that the dorsal band perimeter is defined as the perimeter of the band on the dorsal half-circumference as seen from a perpendicular top-down perspective. The right and left sides of the circle (or ellipse) may actually extend around onto the ventral half-circumference of the person's wrist or forearm, but appear to be "sliced off" because they are not visible from this top-down perspective. In this example, the right-side proximal-to-distal line of the apparent "slicing" is parallel to the left-side proximal-to-distal line of the apparent "slicing."

In this example, the dorsal band perimeter has a convex proximal edge 4005, a convex distal edge 4006, a straight right edge 4007, and a straight left edge 4008. In this example, the middle portion of the dorsal band perimeter laterally spans the entire dorsal half-circumference of the person's wrist or forearm, but the proximal and distal portions of the dorsal band perimeter do not span the entire dorsal half-circumference. Relevant example variations discussed in other places in this disclosure or in priority-linked disclosures can also be applied to this example.

FIG. #41 shows an example of how this invention can be embodied in a smart watch with dual displays comprising: (a) a proximal display 4102 which is worn on the dorsal half-circumference of a person's wrist or forearm 4101 and has a centroid which is a first distance from the person's elbow; (b) a distal display 4103 which is worn on the dorsal half-circumference of the person's wrist or forearm 4101 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 4104 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter is shaped like a proximal-to-dorsal ring which is interrupted (or overlapped) by the displays.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, the dorsal band perimeter is shaped like a proximal-to-dorsal ring wherein a portion of its right side appears to be "sliced off" (along a right-side proximal-to-distal line) and a portion of its left side appears to be "sliced off" (along a left-side proximal-to-distal line). Please remember that the dorsal band perimeter is defined as the perimeter of the band on the dorsal half-circumference as seen from a perpendicular top-down perspective. The right and left sides of the ring may actually extend around onto the ventral half-circumference of the person's wrist or forearm, but appear to be "sliced off" because they are not visible from this top-down perspective. In this example, the right-side proximal-to-distal line of the apparent "slicing" is parallel to the left-side proximal-to-distal line of the apparent "slicing."

In this example, the dorsal band perimeter has a convex proximal side 4105, a convex distal side 4106, a straight right side 4107, and a straight left side 4108. In this example, the proximal display connects to (or overlaps) the ring between the 2 o'clock and 10 o'clock positions on the display's circumference and the distal display connects to (or overlaps) the ring between the 8 o'clock and 4 o'clock positions on the display's circumference. In this example, the middle portion of the dorsal band perimeter laterally spans the entire dorsal half-circumference of the person's wrist or forearm, but the proximal and distal portions of the dorsal band perimeter do not span the entire dorsal half-circumference. Relevant example variations discussed in other places in this disclosure or in priority-linked disclosures can also be applied to this example.

FIG. #42 shows an example of how this invention can be embodied in a smart watch with dual displays comprising: (a) a proximal display 4202 which is worn on the dorsal half-circumference of a person's wrist or forearm 4201 and has a centroid which is a first distance from the person's elbow; (b) a distal display 4203 which is worn on the dorsal half-circumference of the person's wrist or forearm 4201 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 4204 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter is shaped like a bull's eye target which is interrupted (or overlapped) by the displays.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, the dorsal band perimeter is shaped like bull's eye target comprising an outer ring and an inner circle. In this example, a portion of the right side of the outer ring appears to be "sliced off" (along a right-side proximal-to-distal line) and a portion of the left side of the outer rings appears to be "sliced off" (along a left-side proximal-to-distal line). Please remember that the dorsal band perimeter is defined as the perimeter of the band on the dorsal half-circumference as seen from a perpendicular top-down perspective. The right and left sides of the outer ring may actually extend around onto the ventral half-circumference of the person's wrist or forearm, but appear to be "sliced off" because they are not visible from this top-down perspective. In this example, the right-side proximal-to-distal line of the apparent "slicing" is parallel to the left-side proximal-to-distal line of the apparent "slicing."

In this example, the dorsal band perimeter has a convex proximal side 4205, a convex distal side 4206, a straight right side 4207, and a straight left side 4208. In this example, the proximal display connects to (or overlaps) the ring between the 2 o'clock and 10 o'clock positions on the display's circumference and the distal display connects to (or overlaps) the ring between the 8 o'clock and 4 o'clock positions on the display's circumference. In this example, the proximal display connects to (or overlaps) the inner circle between the 4 o'clock and 8 o'clock positions on the display's circumference and the distal display connects to (or overlaps) the inner circle between the 10 o'clock and 2 o'clock positions on the display's circumference. In this example, the middle portion of the outer ring laterally spans the entire dorsal half-circumference of the person's wrist or forearm, but the proximal and distal portions of the outer ring do not span the entire dorsal half-circumference. Relevant example variations discussed in other places in this disclosure or in priority-linked disclosures can also be applied to this example.

FIG. #43 shows an example of how this invention can be embodied in a smart watch with dual displays comprising: (a) a proximal display 4302 which is worn on the dorsal half-circumference of a person's wrist or forearm 4301 and has a centroid which is a first distance from the person's elbow; (b) a distal display 4303 which is worn on the dorsal half-circumference of the person's wrist or forearm 4301 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a proximal band 4304 which spans the dorsal half-circumference of the person's wrist or forearm, wherein the proximal band is worn at a third average distance from the person's elbow, wherein the proximal band holds the proximal display, and wherein the proximal side of the proximal band is convex (i.e. curved in a proximal direction) as it spans the dorsal half-circumference of the person's wrist or fore arm; and (d) a distal band 4305 which spans the dorsal half-circumference of the person's wrist or forearm, wherein the distal band is worn at a fourth average distance from the person's elbow, wherein the fourth distance is greater than the third distance, wherein the distal band holds the distal display, and wherein the distal side of the distal band is convex (i.e. curved in a distal direction) as it spans the dorsal half-circumference of the person's wrist or fore arm.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, the right side of the proximal display can connect to (or overlap) the (right side segment of the) proximal band clockwise between the 12 o'clock and 6 o'clock positions on the display's circumference and the left right side of the proximal display can connect to (or overlap) the (left side segment of the) proximal band clockwise between the 6 o'clock and 12 o'clock positions on the display's circumference. In an example, the right side of the distal display can connect to (or overlap) the (right side segment of the) distal band clockwise between the 12 o'clock and 6 o'clock positions on the display's circumference and the left right side of the distal display can connect to (or overlap) the (left side segment of the) distal band clockwise between the 6 o'clock and 12 o'clock positions on the display's circumference.

In an example, the right side of the proximal display can connect to (or overlap) the (right side segment of the) proximal band clockwise between the 1 o'clock and 5 o'clock positions on the display's circumference and the left right side of the proximal display can connect to (or overlap) the (left side segment of the) proximal band clockwise between the 7 o'clock and 11 o'clock positions on the display's circumference. In an example, the right side of the distal display can connect to (or overlap) the (right side segment of the) distal band clockwise between the 1 o'clock and 5 o'clock positions on the display's circumference and the left right side of the distal display can connect to (or overlap) the (left side segment of the) distal band clockwise between the 7 o'clock and 11 o'clock positions on the display's circumference. In an example, the 12 o'clock position can be defined as the most distal position on a display.

In an example, proximal and distal bands can remain separate around the entire circumference of a person's wrist or forearm. In an example, proximal and distal bands can merge on the right and/or left sides of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #44 shows an example of how this invention can be embodied in a smart watch with dual displays comprising: (a) a proximal display 4402 which is worn on the dorsal half-circumference of a person's wrist or forearm 4401 and has a centroid which is a first distance from the person's elbow; (b) a distal display 4403 which is worn on the dorsal half-circumference of the person's wrist or forearm 4401 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band which further comprises: a right proximal-to-distal partial ring portion 4404 which is connected to the right sides of the proximal and distal displays, a left proximal-to-distal partial ring portion 4405 which is connected to the left sides of the proximal and distal displays, a right lateral band segment 4406 which is connected to the right side of the right proximal-to-distal partial ring portion, and a left lateral band segment 4407 which is connected to the left side of the left proximal-to-distal partial ring portion.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, the right side of the proximal display can connect to (or overlap) the right proximal-to-distal ring portion of the band clockwise between the 12 o'clock and 6 o'clock positions or between the 1 o'clock and 5 o'clock positions of the display's circumference. In an example, the right side of the distal display can connect to (or overlap) the right proximal-to-distal ring portion of the band clockwise between the 12 o'clock and 6 o'clock positions or between the 1 o'clock and 5 o'clock positions of the display's circumference.

In an example, the left side of the proximal display can connect to (or overlap) the left proximal-to-distal ring portion of the band clockwise between the 6 o'clock and 12 o'clock positions or between the 7 o'clock and 11 o'clock positions of the display's circumference. In an example, the left side of the distal display can connect to (or overlap) the left proximal-to-distal ring portion of the band clockwise between the 6 o'clock and 12 o'clock positions or between the 7 o'clock and 11 o'clock positions of the display's circumference. Relevant example variations discussed in other places in this disclosure or in priority-linked disclosures can also be applied to this example.

FIG. #45 shows an example of how this invention can be embodied in a smart watch with dual displays comprising: (a) a proximal display 4502 which is worn on the dorsal half-circumference of a person's wrist or forearm 4501 and has a centroid which is a first distance from the person's elbow; (b) a distal display 4503 which is worn on the dorsal half-circumference of the person's wrist or forearm 4501 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 4504 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter has an undulating proximal edge 4505, an undulating distal edge 4506, a straight right edge 4507, and a straight left edge 4508.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, the middle portion of the dorsal band perimeter laterally spans the entire dorsal half-circumference of the person's wrist or forearm, but the proximal and distal portions of the dorsal band perimeter do not span the entire dorsal half-circumference. In an example, the band can have a greatest proximal-to-distal length along an axis which includes the centroids of the proximal and distal displays. In this example, the undulating proximal edge is sinusoidal, the undulating distal edge is sinusoidal, and the proximal and distal edges are symmetrically reflected around a central right-to-left axis of the band. In this example, the undulating proximal edge is sinusoidal, the undulating distal edge is sinusoidal, and the sinusoidal curves of the proximal and distal edges are 180-degrees out-of-phase with each other. In an example, there can be one or more holes in the band. In an example, there can be one hole to the right of an axis connecting the centroids of the displays and one hole to the left of this axis. Relevant example variations discussed in other places in this disclosure or in priority-linked disclosures can also be applied to this example.

FIG. #46 shows an example of how this invention can be embodied in a smart watch with dual displays comprising: (a) a proximal display 4602 which is worn on the dorsal half-circumference of a person's wrist or forearm 4601 and has a centroid which is a first distance from the person's elbow; (b) a distal display 4603 which is worn on the dorsal half-circumference of the person's wrist or forearm 4601 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 4604 which holds the proximal and distal displays; wherein the dorsal band perimeter is the perimeter of the portion of the band which spans the dorsal half-circumference of the person's wrist or forearm as seen from a top-down perspective (e.g. perpendicular to the center of the dorsal half-circumference); wherein the dorsal band perimeter has an undulating proximal edge 4605, an undulating distal edge 4606, a straight right edge 4607, and a straight left edge 4608; and wherein there is at least one hole 4609 in the portion of the band which spans the dorsal half-circumference of the person's wrist or forearm.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, undulating proximal and distal edges are sinusoidal. In this example, undulating proximal and distal edges are symmetrically reflected around a central right-to-left axis of the band. In this example, sinusoidal undulations of the proximal and distal edges are 180-degrees out-of-phase with each other. In this example, there is an elliptical hole (interrupted or overlapped by the displays) in the center of the dorsal portion of the band. If one subtracts from the elliptical hole the area which is overlapped by the displays, then this separates the elliptical hole into two (right side and left side) holes which are each shaped like a gingko tree leaf. Relevant example variations discussed in other places in this disclosure or in priority-linked disclosures can also be applied to this example.

FIG. #47 shows an example of how this invention can be embodied in a smart watch with dual displays comprising: (a) a proximal display 4702 which is worn on the dorsal half-circumference of a person's wrist or forearm 4701 and has a centroid which is a first distance from the person's elbow; (b) a distal display 4703 which is worn on the dorsal half-circumference of the person's wrist or forearm 4701 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 4704 which holds the proximal and distal displays; wherein the dorsal band perimeter is the perimeter of the portion of the band which spans the dorsal half-circumference of the person's wrist or forearm as seen from a top-down perspective (e.g. perpendicular to the center of the dorsal half-circumference); wherein the dorsal band perimeter has an undulating proximal edge 4705, an undulating distal edge 4706, a straight right edge 4707, and a straight left edge 4708; wherein there is an arcuate hole 4709 in the portion of the band which spans the dorsal half-circumference of the person's wrist or forearm; and wherein there is an arcuate band segment 4710 within the arcuate hole which connects the proximal and distal displays.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, the undulating proximal and distal edges are sinusoidal. In this example, the undulating proximal and distal edges are symmetrically reflected around a central right-to-left axis of the band. In this example, sinusoidal undulations of the proximal and distal edges are 180-degrees out-of-phase with each other. In this example, the arcuate hole is circular or elliptical shaped (as interrupted or overlapped by the displays). In this example, the arcuate hole and the arcuate band segment within this hole are nested and concentric. In an example, the band segment within the arcuate hole can be rectangular instead of arcuate. Relevant example variations discussed in other places in this disclosure or in priority-linked disclosures can also be applied to this example.

FIG. #48 shows an example of how this invention can be embodied in a smart watch with dual displays comprising: (a) a proximal display 4802 which is worn on the dorsal half-circumference of a person's wrist or forearm 4801 and has a centroid which is a first distance from the person's elbow; (b) a distal display 4803 which is worn on the dorsal half-circumference of the person's wrist or forearm 4801 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 4804 which holds the proximal and distal displays; wherein the dorsal band perimeter is the perimeter of the portion of the band which spans the dorsal half-circumference of the person's wrist or forearm as seen from a top-down perspective (e.g. perpendicular to the center of the dorsal half-circumference); wherein the dorsal band perimeter has an undulating proximal edge 4805, an undulating distal edge 4806, a straight right edge 4807, and a straight left edge 4808; wherein there is a hole 4809 with multiple vertexes which is located in the portion of the band which spans the dorsal half-circumference of the person's wrist or forearm.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, the undulating proximal and distal edges of the dorsal band perimeter are sinusoidal. In this example, the undulating proximal and distal edges are symmetrically reflected around a central right-to-left axis of the band. In this example, sinusoidal undulations of the proximal and distal edges are 180-degrees out-of-phase with each other. In this example, there are right side and left side holes in the distal portion of the band, wherein each of these holes has at least three vertexes. Relevant example variations discussed in other places in this disclosure or in priority-linked disclosures can also be applied to this example.

FIG. #49 shows an example of how this invention can be embodied in a smart watch with dual displays comprising: (a) a proximal display 4902 which is worn on the dorsal half-circumference of a person's wrist or forearm 4901 and has a centroid which is a first distance from the person's elbow; (b) a distal display 4903 which is worn on the dorsal half-circumference of the person's wrist or forearm 4901 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a bifurcating band, wherein the dorsal part of the bifurcating band is the part of the bifurcating band which spans the dorsal half-circumference of the person's wrist or forearm, as seen from a top-down perspective; wherein the dorsal part further comprises a right-side segment 4904 whose right portion is a single band and whose left portion bifurcates and attaches to the right sides of the displays; and wherein the dorsal part further comprises a left-side segment 4905 whose left portion is a single band and whose right portion bifurcates and attaches to the left sides of the displays.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, the right-side segment attaches to the proximal display between the 1 o'clock and 5 o'clock locations on the display's circumference and attaches to the distal display between the 1 o'clock and 5 o'clock locations on the display's circumference. In an example, the left-side segment attaches to the proximal display between the 7 o'clock and 11 o'clock locations on the display's circumference and attaches to the distal display between the 7 o'clock and 11 o'clock locations on the display's circumference. In an example, a right-side and/or left-side segment can have a shape selected from the group consisting of: mathematical "less than" sign; leftward-opening chevron; mathematical "greater than" sign; rightward-opening chevron; text bracket; and whale tale. In an example, a gap between the band and the displays can have a shape selected from the group consisting of: diamond shape, kite shape, Eagle Ray shape, gingko leaf shape, and Pittsburgh Steelers star shape. Relevant example variations discussed in other places in this disclosure or in priority-linked disclosures can also be applied to this example.

FIG. #50 shows an example of how this invention can be embodied in a smart watch with dual displays comprising: (a) a proximal display 5002 which is worn on the dorsal half-circumference of a person's wrist or forearm 5001 and has a centroid which is a first distance from the person's elbow; (b) a distal display 5003 which is worn on the dorsal half-circumference of the person's wrist or forearm 5001 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a bifurcating band, wherein the dorsal part of the bifurcating band is the part of the bifurcating band which spans the dorsal half-circumference of the person's wrist or forearm, as seen from a top-down perspective; wherein the dorsal part further comprises a right-side segment 5004 whose right portion is a single band and whose left portion bifurcates and attaches to the displays; and wherein the dorsal part further comprises a left-side segment 5005 whose left portion is a single band and whose right portion bifurcates and attaches to the displays.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, the right-side segment attaches to the proximal display between the 2 o'clock and 6 o'clock locations on the display's circumference and attaches to the distal display between the 12 o'clock and 4 o'clock locations on the display's circumference. In an example, the left-side segment attaches to the proximal display between the 6 o'clock and 10 o'clock locations on the display's circumference and attaches to the distal display between the 8 o'clock and 12 o'clock locations on the display's circumference. In an example, a right-side and/or left-side segment can have a shape selected from the group consisting of: mathematical "less than" sign; leftward-opening chevron; mathematical "greater than" sign; rightward-opening chevron; text bracket; and whale tale. In an example, a gap between the band and the displays can have a shape selected from the group consisting of: diamond shape, kite shape, Eagle Ray shape, gingko leaf shape, and Pittsburgh Steelers star shape. Relevant example variations discussed in other places in this disclosure or in priority-linked disclosures can also be applied to this example.

FIG. #51 shows an example of how this invention can be embodied in a smart watch with dual displays comprising: (a) a proximal display 5102 which is worn on the dorsal half-circumference of a person's wrist or forearm 5101 and has a centroid which is a first distance from the person's elbow; (b) a distal display 5103 which is worn on the dorsal half-circumference of the person's wrist or forearm 5101 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band which holds the proximal and distal displays, wherein the dorsal band perimeter is the perimeter of the portion of the band which spans the dorsal half-circumference of the person's wrist or forearm, as seen from a top-down perspective, wherein the right half 5104 of the dorsal band perimeter is concave and the left half 5105 of the dorsal band perimeter is convex. In an alternative example, the right half can be convex and the left half can be concave. If you rotate the watch 90-degrees, it looks like Greedo.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched. Relevant example variations discussed in other places in this disclosure or in priority-linked disclosures can also be applied to this example.

FIG. #52 shows an example of how this invention can be embodied in a smart watch with dual displays comprising: (a) a proximal display 5202 which is worn on the dorsal half-circumference of a person's wrist or forearm 5201 and has a centroid which is a first distance from the person's elbow; (b) a distal display 5203 which is worn on the dorsal half-circumference of the person's wrist or forearm 5201 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a proximal left-side band 5205, wherein the proximal left-side band spans the left side of the dorsal half-circumference of the person's wrist or forearm and is attached to the left side of the proximal display; (d) a distal left-side band 5206, wherein the distal left-side band spans the left side of the dorsal half-circumference of the person's wrist or forearm and is attached to the left side of the distal display, and wherein there is a gap between the proximal left-side band and the distal left-side band; and (e) a right-side band 5204, wherein the right-side band spans the right side of the dorsal half-circumference of the person's wrist or forearm and is attached to the right sides of the proximal and distal displays.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, the proximal left-side band has a convex proximal edge and the distal left-side band has a convex distal edge. In this example, the right-side band has a concave shape. In an example, the right-side band can have a shape selected from the group consisting of: duck foot shape, Eagle Ray shape, and gingko leaf shape. In an example, right and left sides can be reversed from the above configuration. Relevant example variations discussed in other places in this disclosure or in priority-linked disclosures can also be applied to this example.

FIG. #53 shows an example of how this invention can be embodied in a smart watch with dual displays comprising: (a) a proximal display 5302 which is worn on the dorsal half-circumference of a person's wrist or forearm 5301 and has a centroid which is a first distance from the person's elbow; (b) a distal display 5303 which is worn on the dorsal half-circumference of the person's wrist or forearm 5301 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a right-side proximal band 5304 which spans the right side of the dorsal half-circumference of the person's wrist or forearm, wherein the right-side proximal band is attached to the right side of the proximal display, and wherein the right-side proximal band has a first width; (d) a left-side proximal band 5306 which spans the left side of the dorsal half-circumference of the person's wrist or forearm, wherein the left-side proximal band is attached to the left side of the proximal display, wherein the left-side proximal band has a second width, and wherein the second width is greater than the first width; (e) a right-side distal band 5305 which spans the right side of the dorsal half-circumference of the person's wrist or forearm, wherein the right-side distal band is attached to the right side of the distal display, and wherein the right-side distal band has a third width; and (f) a left-side distal band 5307 which spans the left side of the dorsal half-circumference of the person's wrist or forearm, wherein the left-side distal band is attached to the left side of the distal display, wherein the left-side distal band has a fourth width, and wherein the fourth width is greater than the third width.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, proximal and distal bands can remain separate around the entire circumference of a person's wrist or forearm. In an example, proximal and distal bands can merge on the right and/or left sides of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #54 shows an example of how this invention can be embodied in a smart watch with dual displays comprising: (a) a proximal display 5402 which is worn on the dorsal half-circumference of a person's wrist or forearm 5401 and has a centroid which is a first distance from the person's elbow; (b) a distal display 5403 which is worn on the dorsal half-circumference of the person's wrist or forearm 5401 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band which holds the proximal display and the distal display on the person's wrist or forearm, wherein the dorsal portion of the band spans the dorsal half-circumference of the person's wrist or forearm, wherein the dorsal portion of the band further comprises a right-side "C" shape portion (which opens to the right) and a left-side reverse "C" shape portion (which opens to the left).

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, a "C" shape can be a longitudinal half perimeter of an oval, ellipse, or circle. In an example, a "C" shape can be a longitudinal three-quarters perimeter of an oval, ellipse, or circle. In an example, a "C" shape can comprise between 50% to 75% of the perimeter of an oval, ellipse, or circle. In this example, the left portion of the right-side "C" shape portion and the right portion of the left-side reverse "C" shape portion overlap. In this example, the right-side "C" shape portion and the left-side reverse "C" shape portion are two portions of a single continuous band. In an example, the right-side "C" shape portion and the left-side reverse "C" shape portion may not overlap. In an example, there can be a gap between the right-side "C" shape portion and the left-side reverse "C" shape portions. In an example, proximal and distal "C" arms can merge on the right and/or left sides of a person's wrist or forearm. In an example, proximal and distal "C" arms can merge on the ventral half-circumference of a person's wrist or forearm. Relevant example variations discussed in other places in this disclosure or in priority-linked disclosures can also be applied to this example.

FIG. #54 also shows an example of how this invention can be embodied in a smart watch with dual displays comprising: (a) a proximal display 5402 which is worn on the dorsal half-circumference of a person's wrist or forearm 5401 and has a centroid which is a first distance from the person's elbow; (b) a distal display 5403 which is worn on the dorsal half-circumference of the person's wrist or forearm 5401 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band which holds the proximal display and the distal display on the wrist or forearm, wherein the dorsal portion of the band spans the dorsal half-circumference of the person's wrist or forearm, wherein the dorsal portion of the band has a concave right half and a concave left half.

FIG. #54 also shows an example of how this invention can be embodied in a smart watch with dual displays comprising: (a) a proximal display 5402 which is worn on the dorsal half-circumference of a person's wrist or forearm 5401 and has a centroid which is a first distance from the person's elbow; (b) a distal display 5403 which is worn on the dorsal half-circumference of the person's wrist or forearm 5401 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band which holds the proximal display and the distal display on the wrist or forearm, wherein the dorsal portion of the band spans the dorsal half-circumference of the person's wrist or forearm, wherein the dorsal portion of the band has a half-oval (or half-ellipse) gap in its right half and half-oval (or half-ellipse) gap in its left half.

FIG. #55 shows an example of how this invention can be embodied in a smart watch with dual displays comprising: (a) a proximal display 5502, which is worn on the dorsal half-circumference of a person's wrist or forearm 5501; (b) a distal display 5503 which is worn on the dorsal half-circumference of the person's wrist or forearm 5501, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a proximal right-side band 5504 which spans the right-side of the dorsal half-circumference of the person's wrist or forearm, which is attached to the right side of the proximal display, and whose proximal side is convex (i.e. curved in a proximal direction); (d) a proximal left-side band 5506 which spans the left-side of the dorsal half-circumference of the person's wrist or forearm, which is attached to the left side of the proximal display, and whose proximal side is convex (i.e. curved in a proximal direction); (e) a distal right-side band 5505 which spans the right-side of the dorsal half-circumference of the person's wrist or forearm, which is attached to the right side of the distal display, and whose distal side is convex (i.e. curved in a distal direction); (f) a distal left-side band 5507 which spans the left-side of the dorsal half-circumference of the person's wrist or forearm, which is attached to the left side of the distal display, and whose distal side is convex (i.e. curved in a distal direction); and (g) a central band 5508 which connects the proximal display and the distal display.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, proximal and distal bands can remain separate around the entire circumference of a person's wrist or forearm. In an example, proximal and distal bands can merge on the right and/or left sides of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #56 shows an example of how this invention can be embodied in a smart watch with dual displays comprising: (a) a proximal display 5602 which is worn on the dorsal half-circumference of a person's wrist or forearm 5601 and has a centroid which is a first distance from the person's elbow; (b) a distal display 5603 which is worn on the dorsal half-circumference of the person's wrist or forearm 5601 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a right-side "C" shape band (which opens to the right) on the right half of the dorsal half-circumference of the person's wrist or forearm which is attached to the displays; and (d) a left-side reverse "C" shape band (which opens to the left) on the left half of the dorsal half-circumference of the person's wrist or forearm which is attached to the displays.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, a "C" shape can be a longitudinal half perimeter of an oval, ellipse, or circle. In an example, a "C" shape can be a longitudinal three-quarters perimeter of an oval, ellipse, or circle. In an example, a "C" shape can comprise between 50% to 75% of the perimeter of an oval, ellipse, or circle. In this example, the right-side "C" shape band and the left-side reverse "C" shape band do not overlap on the dorsal side of the person's wrist or forearm. In this example, there is a gap between the right-side "C" shape band and the left-side reverse "C" shape bands. In an example, proximal and distal bands and/or "C" arms can merge on the right and/or left sides of a person's wrist or forearm. In an example, proximal and distal bands and/or "C" arms can merge on the ventral half-circumference of a person's wrist or forearm. Relevant example variations discussed in other places in this disclosure or in priority-linked disclosures can also be applied to this example.

FIG. #57 shows an example of how this invention can be embodied in a smart watch with dual displays comprising: (a) a proximal display 5702 which is worn on the dorsal half-circumference of a person's wrist or forearm 5701; (b) a distal display 5703 which is worn on the dorsal half-circumference of the person's wrist or forearm 5701, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a proximal left-side band 5705 on the left half of the dorsal half-circumference of the person's wrist or forearm, wherein this proximal left-side band is attached to the left side of the proximal display; (d) a distal left-side band 5706 on the left half of the dorsal half-circumference of the person's wrist or forearm, wherein this distal left-side band is attached to the left side of the distal display, and wherein there is a gap between the proximal left-side band and the distal left-side band; and (e) an arcuate right-side band 5704 on the right half of the dorsal half-circumference of the person's wrist or forearm, wherein the proximal end of this arcuate right-side band is attached to the right side of the proximal display and the distal end of this arcuate right-side band is attached to the right side of the distal display.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, an arcuate right-side band can have a conic section shape. In an example, an arcuate right-side band can be a section of a circle, ellipse, or oval. In an example, an arcuate right-side band can bifurcate from right to left. In an example, if one draws lines on the displays in order to virtually connect the (perimeters of the) proximal left-side band, the distal left-side band, and the arcuate right-side band—then their combined (perimeter) shape looks like an arch which has been rotated 90-degrees clockwise. In an example, proximal and distal left-side bands can merge on the side of a person's wrist or forearm. In an example, proximal and distal left-side bands can merge on the ventral half-circumference of a person's wrist or forearm. Relevant example variations discussed in other places in this disclosure or in priority-linked disclosures can also be applied to this example.

Expressing this example in other words, FIG. #57 shows a smart watch with dual displays comprising: (a) a proximal display 5702 which is worn on the dorsal half-circumference of a person's wrist or forearm 5701; (b) a distal display 5703 which is worn on the dorsal half-circumference of the person's wrist or forearm 5701, wherein proximal is closer to the person's elbow and distal is farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a proximal left-side band 5705 on the left half of the dorsal half-circumference of the person's wrist or forearm, wherein this proximal left-side band is attached to the left side of the proximal display; (d) a distal left-side band 5706 on the left half of the dorsal half-circumference of the person's wrist or forearm, wherein this distal left-side band is attached to the left side of the distal display, and wherein there is a gap between the proximal left-side band and the distal left-side band; and (e) a bifurcated right-side band 5704 on the right half of the dorsal half-circumference of the person's wrist or forearm, wherein the proximal end of this bifurcated right-side band is attached to the right side of the proximal display and the distal end of this bifurcated right-side band is attached to the right side of the distal display.

FIG. #58 shows an example of how this invention can be embodied in a smart watch with dual displays comprising: (a) a proximal display 5802 which is worn on the dorsal half-circumference of a person's wrist or forearm 5801; (b) a distal display 5803 which is worn on the dorsal half-circumference of the person's wrist or forearm 5801, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a proximal right-side band 5804 on the right half of the dorsal half-circumference of the person's wrist or forearm, wherein this proximal right-side band is attached to the right side of the proximal display; (d) a distal right-side band 5805 on the right half of the dorsal half-circumference of the person's wrist or forearm, wherein this distal right-side band is attached to the right side of the distal display, and wherein there is a gap between the proximal right-side band and the distal right-side band; and (e) an arcuate left-side band 5806 with a central lateral portion (e.g. stub) 5807 on the left half of the dorsal half-circumference of the person's wrist or forearm, wherein the proximal end of this arcuate left-side band is attached to the left side of the proximal display, wherein the distal end of this arcuate left-side band is attached to the left side of the distal display, and wherein the arcuate left-side band converges, in a right-to-left direction, into a central lateral portion (e.g. stub) which extends around the side of the person's wrist or forearm.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, an arcuate right-side band can have a conic section shape with a left-extending central lateral portion (e.g. stub). In an example, an arcuate right-side band can be a section of a circle, ellipse, or oval with a left-extending central lateral portion (e.g. stub). Looking at this design another way, the dorsal portion of the band which holds the two displays looks like a left-to-right-oriented tuning fork. In an example, the configuration of this device can be reflected (exchanging left vs. right) across a central proximal-to-distal axis. In an example, proximal and distal bands can merge on the side of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #59 shows an example of how this invention can be embodied in a smart watch with dual displays comprising: (a) a proximal display 5902 which is worn on the dorsal half-circumference of a person's wrist or forearm 5901; (b) a distal display 5903 which is worn on the dorsal half-circumference of the person's wrist or forearm 5901, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a proximal right-side band 5904 on the right half of the dorsal half-circumference of the person's wrist or forearm, wherein this proximal right-side band is attached to the right side of the proximal display; (d) a distal right-side band 5905 on the right half of the dorsal half-circumference of the person's wrist or forearm, wherein this distal right-side band is attached to the right side of the distal display; (e) a proximal left-side band 5906 on the left half of the dorsal half-circumference of the person's wrist or forearm, wherein this proximal left-side band is attached to the left side of the proximal display; (f) a distal left-side band 5907 on the left half of the dorsal half-circumference of the person's wrist or forearm, wherein this distal left-side band is attached to the left side of the distal display; (g) an arcuate right-side band 5908 on the right half of the dorsal half-circumference of the person's wrist or forearm which is attached to the proximal display and to the distal display; and (h) an arcuate left-side band 5909 on the right half of the dorsal half-circumference of the person's wrist or forearm which is attached to the proximal display and to the distal display.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, if you draw virtual lines over the displays to virtually connect the perimeters of the arcuate left-side band, arcuate right-side band, distal left-side band, distal right-side band, proximal left-side band, and proximal right-side band, then you get a shape which looks like two overlapping arches. Specifically, this resulting shape is what you get when you: take a first arch, create a second arch duplicate on top of the first arch, reflect the second arch across a central horizontal axis, and then rotate both arches 90-degrees. In this example, the overlapping or intersecting tops of the two arches form a central oval, elliptical, circular, or football shape. In an example, proximal and distal bands can merge on the side of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #60 shows an example of how this invention can be embodied in a smart watch with dual displays comprising: (a) a proximal display 6002 which is worn on the dorsal half-circumference of a person's wrist or forearm 6001; (b) a distal display 6003 which is worn on the dorsal half-circumference of the person's wrist or forearm 6001, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a right-opening arch-shaped band 6004 which holds the proximal display and the distal display; and (d) a left-opening arch-shaped band 6005, where the right-opening arch-shaped band and the left-opening arch-shaped band intersect and/or overlap each other.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, the right-opening arch-shaped band spans portions of both the right and left sides of the dorsal half-circumference of a person's wrist or forearm, but the left-opening arch-shaped band only spans a portion of the left side of the dorsal half-circumference of the person's wrist or forearm. In an example, both the right-opening arch-shaped band and the left-opening arch-shaped band can span portions of both the right and left sides of the dorsal half-circumference of a person's wrist or forearm. In an example, proximal and distal bands can merge on the ventral half-circumference of a person's wrist or forearm. Relevant example variations discussed in other places in this disclosure or in priority-linked disclosures can also be applied to this example.

FIG. #61 shows an example of how this invention can be embodied in a smart watch with dual displays comprising: (a) a proximal display 6102 which is worn on the dorsal half-circumference of a person's wrist or forearm 6101; (b) a distal display 6103 which is worn on the dorsal half-circumference of the person's wrist or forearm 6101, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a right-side proximal arcuate band 6104 on the dorsal surface of the person's wrist and/or forearm which connects to the right side of the proximal display; (d) a right-side distal arcuate band 6105 on the dorsal surface of the person's wrist and/or forearm which connects to the right side of the distal display; and (e) two left-side bands (6106 and 6107) on the dorsal surface of the person's wrist and/or forearm, wherein the two left-side bands intersect and/or overlap each other and connect to the left sides of the proximal and distal displays.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

Expressing this design in a different way, FIG. #61 shows a smart watch with dual displays comprising: (a) a proximal display 6102 which is worn on the dorsal half-circumference of a person's wrist or forearm 6101; (b) a distal display 6103 which is worn on the dorsal half-circumference of the person's wrist or forearm 6101, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a first sinusoidal band (comprising segments 6104 and 6107) which spans the dorsal half-circumference of the person's wrist and/or forearm and holds the proximal display in place; (d) a second sinusoidal band (comprising segments 6105 and 6106) which spans the dorsal half-circumference of the person's wrist and/or forearm and holds the distal display in place, wherein the first sinusoidal band and the second sinusoidal band intersect and/or overlap on the left side of the dorsal half-circumference of the person's wrist and/or forearm but not on the right side of the dorsal half-circumference of the person's wrist and/or forearm. Relevant example variations discussed in other places in this disclosure or in priority-linked disclosures can also be applied to this example.

FIG. #62 shows an example of how this invention can be embodied in a smart watch with dual displays comprising: (a) a proximal display 6202 which is worn on the dorsal half-circumference of a person's wrist or forearm 6201; (b) a distal display 6203 which is worn on the dorsal half-circumference of the person's wrist or forearm 6201, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a proximal sinusoidal band 6204 which spans the dorsal half-circumference of the person's wrist and/or forearm, wherein a distal peak of the proximal sinusoidal band curves around the distal perimeter of the proximal display; and (d) a distal sinusoidal band 6205 which spans the dorsal half-circumference of the person's wrist and/or forearm, wherein a proximal valley of the distal sinusoidal band curves around the proximal perimeter of the distal display.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, the proximal sinusoidal band curves around the perimeter of the proximal display clockwise between the 8 o'clock and 4 o'clock positions on the circumference of the display. In an example, the proximal sinusoidal band curves around the perimeter of the proximal display clockwise between the 9 o'clock and 3 o'clock positions on the circumference of the display. In an example, the distal sinusoidal band curves around the perimeter of the distal display clockwise between the 2 o'clock and 10 o'clock positions on the circumference of the display. In an example, the distal sinusoidal band curves around the perimeter of the distal display clockwise between the 3 o'clock and 9 o'clock positions on the circumference of the display.

In an example, the most proximal portion of a proximal sinusoidal band is more proximal than the most proximal portion of a proximal display. In an example, the most distal portion of a distal sinusoidal band is more distal than the most distal portion of a distal display. In an example, the proximal sinusoidal band and the distal sinusoidal band can be symmetric to each other across a central right-to-left axis of the device. In an example, this design can look like a stylized version of a scarab (or other insect), but with only four legs instead of six. Relevant example variations discussed in other places in this disclosure or in priority-linked disclosures can also be applied to this example.

FIG. #63 shows an example of how this invention can be embodied in a smart watch with dual displays comprising: (a) a proximal display 6302 which is worn on the dorsal half-circumference of a person's wrist or forearm 6301; (b) a distal display 6303 which is worn on the dorsal half-circumference of the person's wrist or forearm 6301, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a first right-side arcuate band 6304 which connects to the distal display; (d) a second right-side distal arcuate band 6305 which connects to the proximal display, wherein the first and second right-side arcuate bands intersect and/or overlap on the right side of the dorsal half-circumference of the person's wrist or forearm; (e) a first left-side arcuate band 6306 which connects to the distal display; and (f) a second left-side distal arcuate band 6307 which connects to the proximal display, wherein the first and second left-side arcuate bands intersect and/or overlap on the left side of the dorsal half-circumference of the person's wrist or forearm.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

Expressing this design in a different way, FIG. #63 shows a smart watch with dual displays comprising: (a) a proximal display 6302 which is worn on the dorsal half-circumference of a person's wrist or forearm 6301; (b) a distal display 6303 which is worn on the dorsal half-circumference of the person's wrist or forearm 6301, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a first sinusoidal band (comprising segments 6304 and 6306) which spans the dorsal half-circumference of the person's wrist and/or forearm and holds the distal display in place; (d)

a second sinusoidal band (comprising segments 6305 and 6307) which spans the dorsal half-circumference of the person's wrist and/or forearm and holds the proximal display in place, wherein the first sinusoidal band and the second sinusoidal band intersect and/or overlap each other on both the right and left sides of the dorsal half-circumference of the person's wrist and/or forearm.

Expressing this design in a different way, FIG. #63 shows a smart watch with dual displays comprising: (a) a proximal display 6302 which is worn on the dorsal half-circumference of a person's wrist or forearm 6301; (b) a distal display 6303 which is worn on the dorsal half-circumference of the person's wrist or forearm 6301, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a first sinusoidal band (comprising segments 6304 and 6306) which spans the dorsal half-circumference of the person's wrist and/or forearm; and (d) a second sinusoidal band (comprising segments 6305 and 6307) which spans the dorsal half-circumference of the person's wrist and/or forearm, wherein the first and second sinusoidal bands are symmetric to each other across (e.g. that is, horizontally reflected across) a shared central longitudinal (e.g. right-to-left) axis.

Expressing this design in a different way, FIG. #63 shows a smart watch with dual displays comprising: (a) a proximal display 6302 which is worn on the dorsal half-circumference of a person's wrist or forearm 6301; (b) a distal display 6303 which is worn on the dorsal half-circumference of the person's wrist or forearm 6301, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a first sinusoidal band (comprising segments 6304 and 6306) which spans the dorsal half-circumference of the person's wrist and/or forearm, wherein the distal display is attached to a peak of the first sinusoidal band; and (d) a second sinusoidal band (comprising segments 6305 and 6307) which spans the dorsal half-circumference of the person's wrist and/or forearm, wherein the proximal display is attached to a valley of the second sinusoidal band.

Expressing this design in a different way, FIG. #63 shows a smart watch with dual displays comprising: (a) a proximal display 6302 which is worn on the dorsal half-circumference of a person's wrist or forearm 6301; (b) a distal display 6303 which is worn on the dorsal half-circumference of the person's wrist or forearm 6301, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a first undulating band (comprising segments 6304 and 6306) which spans the dorsal half-circumference of the person's wrist and/or forearm, wherein the distal display is attached to a distal undulation of the first undulating band; and (d) a second undulating band (comprising segments 6305 and 6307) which spans the dorsal half-circumference of the person's wrist and/or forearm, wherein the proximal display is attached to proximal undulation of the second undulating band. Relevant example variations discussed in other places in this disclosure or in priority-linked disclosures can also be applied to this example.

FIG. #64 shows an example of how this invention can be embodied in a smart watch with dual displays comprising: (a) a proximal display 6402 which is worn on the dorsal half-circumference of a person's wrist or forearm 6401; (b) a distal display 6403 which is worn on the dorsal half-circumference of the person's wrist or forearm 6401, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a first sinusoidal band 6404 which spans the dorsal half-circumference of the person's wrist and/or forearm; (d) a second sinusoidal band 6405 which spans the dorsal half-circumference of the person's wrist and/or forearm; (e) a third sinusoidal band 6406 which spans the dorsal half-circumference of the person's wrist and/or forearm; and (f) a fourth sinusoidal band 6407 which spans the dorsal half-circumference of the person's wrist and/or forearm.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In this example, four sinusoidal bands hold the proximal and distal displays in place on the dorsal surface of a person's wrist or forearm. In this example, sinusoidal bands intersect and/or overlap each other on the dorsal surface of the person's wrist or forearm. In this example, the first and third sinusoidal bands are parallel to each other. In this example, the first and second sinusoidal bands are symmetric relative to each other (e.g. horizontally reflected relative to each other) across a right-to-left axis. Relevant example variations discussed in other places in this disclosure or in priority-linked disclosures can also be applied to this example.

FIG. #65 shows an example of how this invention can be embodied in a smart watch with dual displays comprising: (a) a proximal display 6502 which is worn on the dorsal half-circumference of a person's wrist or forearm 6501; (b) a distal display 6503 which is worn on the dorsal half-circumference of the person's wrist or forearm 6501, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a serpentine band 6504, wherein this serpentine band holds the proximal and distal displays, and wherein this serpentine band when followed from right to left across the dorsal half-circumference of the person's wrist or forearm: enters the dorsal half-circumference in a proximally-to-distally-central position, then curves in a counter-clockwise manner around a distal portion of the perimeter of the distal display, then curves a in a counter-clockwise manner around a proximal portion of the distal display, then curves in a clockwise manner around a distal portion of the perimeter of the proximal display, then curves in a clockwise manner around a proximal portion of the perimeter of the proximal display, and then leaves the dorsal half-circumference in a proximally-to-distally-central position.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, a laterally-central portion of the serpentine band can have a letter "S" shape. In an example, the two displays can be located on (or within) the loops of the "S" shape. In an example, this design can be reversed with respect to its right-vs.-left orientation. In an example, this design can be reflected vertically across a central proximal-to-distal axis. Relevant example variations discussed in other places in this disclosure or in priority-linked disclosures can also be applied to this example.

FIG. #66 shows an example of how this invention can be embodied in a smart watch with dual displays comprising: (a) a proximal display 6602 which is worn on the dorsal half-circumference of a person's wrist or forearm 6601; (b) a distal display 6603 which is worn on the dorsal half-circumference of the person's wrist or forearm 6601, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a first serpentine band 6604, wherein this first serpentine band holds the proximal and distal displays, and wherein this serpentine band when followed from right to left across the dorsal half-circumference of the person's wrist or forearm: curves in a counter-clockwise manner around a distal portion of the perimeter of the distal display, then curves a in a counter-clockwise manner around a proximal portion of the distal display, then curves in a clockwise manner around a distal portion of the perimeter of the proximal display, and then curves in a clockwise manner around a proximal portion of the perimeter of the proximal display; and (d) a second serpentine band 6605, wherein this second serpentine band is symmetric with respect to the first serpentine band, being reflected vertically from the first serpentine band across a central proximal-to-distal axis.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched.

In an example, a laterally-central portion of a serpentine band can have a letter "S" shape. In an example, the two displays can be located on (or within) the loops of the "S" shape. In an example, the two serpentine bands can overlap. In an example, the two serpentine bands can weave together. In an example, the two serpentine bands can be merged together. In an example, the second serpentine band when followed from right to left across the dorsal half-circumference of the person's wrist or forearm: curves in a clockwise manner around a proximal portion of the perimeter of the proximal display, then curves a in a clockwise manner around a distal portion of the proximal display, then curves in a counter-clockwise manner around a proximal portion of the perimeter of the distal display, and then curves in a counter-clockwise manner around a distal portion of the perimeter of the distal display. Relevant example variations discussed in other places in this disclosure or in priority-linked disclosures can also be applied to this example.

FIG. #67 shows an example of how this invention can be embodied in a smart watch with dual displays comprising: (a) a proximal display 6702 which is worn on the dorsal half-circumference of a person's wrist or forearm 6701; (b) a distal display 6703 which is worn on the dorsal half-circumference of the person's wrist or forearm 6701, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) an undulating band 6704, wherein this undulating band holds the proximal and distal displays, and wherein this undulating band when followed from right to left across the dorsal half-circumference of the person's wrist or forearm: enters the dorsal half-circumference in a proximally-to-distally-central position, then connects to the right side of the proximal display; then connects the distal side of the proximal display to the proximal side of the distal display; then connects to the left side of the distal display; and then leaves the dorsal half-circumference in a proximally-to-distally-central position.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched. In an example, this is pretty ugly and will probably never see the light of day. Relevant example variations discussed in other places in this disclosure or in priority-linked disclosures can also be applied to this example.

FIG. #68 shows an example of how this invention can be embodied in a smart watch with dual displays comprising: (a) a proximal display 6802 which is worn on the dorsal half-circumference of a person's wrist or forearm 6801; (b) a distal display 6803 which is worn on the dorsal half-circumference of the person's wrist or forearm 6801, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a right-side bifurcated band 6804, wherein the proximal and distal ends of the bifurcated portion of this right-side bifurcated band connect to the proximal display and to the distal display, respectively; (d) a left-side bifurcated band 6805, wherein the proximal and distal ends of the bifurcated portion of this left-side bifurcated band connect to the proximal display and to the distal display, respectively; and (e) a central band 6806 which connects a distal portion of the perimeter of the proximal display with a proximal portion of the perimeter of the distal display.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched. In an example, a right-side or left-side bifurcated bands can have a shape selected from the group consisting of: "whale tail" shape; "1" arcuate bracket shape; and sideways "Y" shape. In an example, right-side and left-side bifurcated bands can be symmetric relative to each other (e.g. vertically reflected across a central proximal-to-distal axis). Relevant example variations discussed in other places in this disclosure or in priority-linked disclosures can also be applied to this example.

FIG. #69 shows an example of how this invention can be embodied in a smart watch with dual displays comprising: (a) a proximal display 6902 which is worn on the dorsal half-circumference of a person's wrist or forearm 6901; (b) a distal display 6903 which is worn on the dorsal half-circumference of the person's wrist or forearm 6901, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a proximal watch band 6904 attached to the proximal display, wherein this proximal watch band has a curve in a proximal direction to one side (e.g. right or left) of the proximal display and a curve in a distal direction to the other side (e.g. left or right) of the proximal display; and (d) a distal watch band 6905 attached to the distal display, wherein this distal watch band has a curve in a proximal direction to one side (e.g. right or left) of the distal display and a curve in a distal direction to the other side (e.g. left or right) of the distal display. In an example, the proximal and distal watch bands can merge and/or be connected to each other on the sides or ventral half-circumference of the person's wrist or forearm.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched. Relevant example variations discussed in other places in this disclosure or in priority-linked disclosures can also be applied to this example.

FIG. #70 shows an example of how this invention can be embodied in a smart watch with dual displays comprising: (a) a proximal display 7002 which is worn on the dorsal half-circumference of a person's wrist or forearm 7001; (b) a distal display 7003 which is worn on the dorsal half-circumference of the person's wrist or forearm 7001, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a helical watch band 7004 which is attached to the left side of the proximal display and to the right side of the distal display. In this example, the displays are located on ends of the helical watch band. In this example, the helical watch band is attached to the right side of the proximal display and to the left side of the distal display. In this example, the helical watch band comprise a helix with a single loop. In an example, a helical watch band can comprise a helix with multiple loops.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched. Relevant example variations discussed in other places in this disclosure or in priority-linked disclosures can also be applied to this example.

FIG. #71 shows an example of how this invention can be embodied in a smart watch with dual displays comprising: (a) a proximal display 7102 which is worn on the dorsal half-circumference of a person's wrist or forearm 7101; (b) a distal display 7103 which is worn on the dorsal half-circumference of the person's wrist or forearm 7101, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a watch band 7104 which curves in a proximal direction on one side (e.g. right or left) relative to the displays and curves in a distal direction on the other side (e.g. left or right) relative to the displays. In an example, the watch band can be reflected around a central proximal-to-distal axis, changing the relative positions of right vs. left in the design.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched. Relevant example variations discussed in other places in this disclosure or in priority-linked disclosures can also be applied to this example.

FIG. #72 shows an example of how this invention can be embodied in a smart watch with dual displays comprising: (a) a proximal display 7202 which is worn on the dorsal half-circumference of a person's wrist or forearm 7201; (b) a distal display 7203 which is worn on the dorsal half-circumference of the person's wrist or forearm 7201, wherein proximal means closer to the person's elbow and distal means farther from the person's elbow, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) an arcuate watch band 7204 with a convex proximal edge and a concave distal edge.

In an example, the first display (the analog display) can be a watch face which displays the time via mechanically-moving watch hands and the second display (the electronic display) can be a computer screen which displays digital information selected from the group consisting of: notifications or messages; steps, heart rate, blood pressure, glucose level, or other biometric information; temperature, weather, location, directions, or other environmental information; and pictures, icons, or other digital images. In an example, the analog and electronic displays can have different orientations than the one shown in this figure. In an example, the relative proximal and distal locations of the analog and electronic displays can be switched. In another example, the arcuate watch band can have a concave distal edge and a concave proximal edge. Relevant example variations discussed in other places in this disclosure or in priority-linked disclosures can also be applied to this example.

The example shown in FIG. #73 is like the one shown in FIG. #37 except that the orientations of the displays have been rotated 90-degrees clockwise. FIG. #73 shows an example of how this invention can be embodied in a smart watch with dual displays comprising: (a) a proximal display 7302 which is worn on the dorsal half-circumference of a person's wrist or forearm 7301 and has a centroid which is a first distance from the person's elbow; (b) a distal display 7303 which is worn on the dorsal half-circumference of the person's wrist or forearm 7301 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 7304 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter has a straight proximal side 7305, a straight distal side 7306, a concave (left-curved) right side 7307, and a concave (right-curved) left side 7308. Relevant example variations discussed in other places in this disclosure or in priority-linked disclosures can also be applied to this example.

The example shown in FIG. #74 is like the one shown in FIG. #37 except that the orientations of the displays have been rotated 90-degrees counter-clockwise. FIG. #74 shows an example of how this invention can be embodied in a smart watch with dual displays comprising: (a) a proximal display 7402 which is worn on the dorsal half-circumference of a person's wrist or forearm 7401 and has a centroid which is a first distance from the person's elbow; (b) a distal display 7403 which is worn on the dorsal half-circumference of the person's wrist or forearm 7401 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 7404 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter has a straight proximal side 7405, a straight distal side 7406, a concave (left-curved) right side 7407, and a concave (right-curved) left side 7408. Relevant example variations discussed in other places in this disclosure or in priority-linked disclosures can also be applied to this example.

The example shown in FIG. #75 is like the one shown in FIG. #37 except that the relative proximal and distal locations of the displays have been switched. FIG. #75 shows an example of how this invention can be embodied in a smart watch with dual displays comprising: (a) a proximal display 7502 which is worn on the dorsal half-circumference of a person's wrist or forearm 7501 and has a centroid which is a first distance from the person's elbow; (b) a distal display 7503 which is worn on the dorsal half-circumference of the person's wrist or forearm 7501 and has a centroid which is a second distance from the person's elbow, wherein the second distance is greater than the first distance, wherein a first display is selected from the group consisting of the proximal display and the distal display, wherein a second display is the remaining non-selected display from the group consisting of the proximal display and the distal display, wherein the first display is an analog display comprising moving watch hands (3709 and 3710), and wherein the second display is an electronic display, digital display, and/or computer screen; and (c) a band 7504 which holds the proximal and distal displays, wherein the dorsal band perimeter is the perimeter of the portion of the band which spans the dorsal half-circumference of the person's wrist or forearm as seen from a top-down perspective (e.g. perpendicular to the center of the dorsal half-circumference), wherein the dorsal band perimeter has a straight proximal side 7505, a straight distal side 7506, a concave (left-curved) right side 7507, and a concave (right-curved) left side 7508. Relevant example variations discussed in other places in this disclosure or in priority-linked disclosures can also be applied to this example.

I claim:

1. A smart watch with dual displays comprising:
   a proximal display which is worn on the dorsal half-circumference of a person's wrist or forearm and has a centroid which is a first distance from the person's elbow;
   a distal display which is worn on the dorsal half-circumference of the person's wrist or forearm and has a centroid which is a second distance from the person's elbow, wherein the second distance is greater than the first distance; and
   a bifurcating band, wherein the dorsal part of the bifurcating band is the part of the bifurcating band which spans the dorsal half-circumference of the person's wrist or forearm, as seen from a top-down perspective; wherein the dorsal part further comprises a right-side segment whose right portion is a single band and whose left portion bifurcates and attaches to the right sides of the displays; wherein the right-side segment attaches to the proximal display between the 1 o'clock and 5 o'clock locations on the proximal display's circumference and attaches to the distal display between the 1 o'clock and 5 o'clock locations on the distal display's circumference; wherein the dorsal part further comprises a left-side segment whose left portion is a single band and whose right portion bifurcates and attaches to the left sides of the displays; and wherein the left-side segment attaches to the proximal display between the 7 o'clock and 11 o'clock locations on the proximal display's circumference and attaches to the distal display between the 7 o'clock and 11 o'clock locations on the distal display's circumference.

2. The smart watch in claim 1 wherein the proximal display and the distal display are selected from the group consisting of: electronic display, computer display, digital display, and electronic touch screen.

3. The smart watch in claim 1 wherein the proximal display and/or the distal display show information selected from the group consisting of: the time; notifications or messages; steps, heart rate, blood pressure, glucose level, or other biometric information; temperature, weather, location, directions, or other environmental information; and pictures, icons, or other digital images.

4. The smart watch in claim 3 wherein the proximal display and the distal display show different types of information selected from the group consisting of: the time; notifications or messages; steps, heart rate, blood pressure, glucose level, or other biometric information; temperature, weather, location, directions, or other environmental information; and pictures, icons, or other digital images.

5. A smart watch with dual displays comprising:
   a proximal display which is worn on the dorsal half-circumference of a person's wrist or forearm and has a centroid which is a first distance from the person's elbow;
   a distal display which is worn on the dorsal half-circumference of the person's wrist or forearm and has a centroid which is a second distance from the person's elbow, wherein the second distance is greater than the first distance; and
   a bifurcating band; wherein the dorsal part of the bifurcating band is the part of the bifurcating band which spans the dorsal half-circumference of the person's wrist or forearm, as seen from a top-down perspective; wherein the dorsal part further comprises a right-side segment whose right portion is a single band and whose left portion bifurcates and attaches to the right sides of the displays; wherein the right-side segment has a leftward-opening chevron or whale tail shape; wherein the dorsal part further comprises a left-side segment whose left portion is a single band and whose right portion bifurcates and attaches to the left sides of the displays; and wherein the left-side segment has a rightward-opening chevron or whale tail shape.

6. The smart watch in claim 5 wherein the proximal display and the distal display are selected from the group consisting of: electronic display, computer display, digital display, and electronic touch screen.

7. The smart watch in claim 5 wherein the proximal display and/or the distal show display information selected from the group consisting of: the time; notifications or messages; steps, heart rate, blood pressure, glucose level, or other biometric information; temperature, weather, location, directions, or other environmental information; and pictures, icons, or other digital images.

8. The smart watch in claim 7 wherein the proximal display and the distal display show different types of information selected from the group consisting of: the time; notifications or messages; steps, heart rate, blood pressure, glucose level, or other biometric information; temperature, weather, location, directions, or other environmental information; and pictures, icons, or other digital images.

* * * * *